US009583791B2

United States Patent
Kawashima et al.

(10) Patent No.: US 9,583,791 B2
(45) Date of Patent: Feb. 28, 2017

(54) ELECTROLYTIC SOLUTION AND BATTERY

(75) Inventors: Atsumichi Kawashima, Fukushima (JP); Masayuki Ihara, Fukushima (JP); Hiroyuki Yamaguchi, Fukushima (JP); Hiroshi Horiuchi, Fukushima (JP); Tadahiko Kubota, Kanagawa (JP); Akira Yamaguchi, Fukushima (JP); Kumiko Takagi, Fukushima (JP)

(73) Assignee: SONY CORPORATION, Tokyo (JP)

( * ) Notice: Subject to any disclaimer, the term of this patent is extended or adjusted under 35 U.S.C. 154(b) by 1602 days.

(21) Appl. No.: 11/278,977

(22) Filed: Apr. 7, 2006

(65) Prior Publication Data

US 2006/0228626 A1  Oct. 12, 2006

(30) Foreign Application Priority Data

Apr. 8, 2005 (JP) ................ P2005-112052
Apr. 13, 2005 (JP) ................ P2005-116187
Feb. 15, 2006 (JP) ................. P2006-37698

(51) Int. Cl.
*H01M 4/13* (2010.01)
*H01M 10/0568* (2010.01)
(Continued)

(52) U.S. Cl.
CPC ......... *H01M 10/0568* (2013.01); *H01M 4/38* (2013.01); *H01M 4/386* (2013.01); *H01M 4/387* (2013.01); *H01M 10/052* (2013.01); *H01M 10/0569* (2013.01); *H01M 10/4235* (2013.01); *H01M 4/505* (2013.01); *H01M 4/525* (2013.01);
(Continued)

(58) Field of Classification Search
USPC ....................................... 429/323
See application file for complete search history.

(56) References Cited

U.S. PATENT DOCUMENTS 5,021,308 A    6/1991 Armand et al.
5,652,072 A *  7/1997 Lamanna et al. ............. 429/307
(Continued)

FOREIGN PATENT DOCUMENTS

JP   01-501822    6/1989
JP   08-241733    9/1996
(Continued)

OTHER PUBLICATIONS

"Lithium Batteries", edited by GABANO, Jean-Paul, (Academic Press, 1983, London, New York), Library of Congress Record, 1 page.

(Continued)

*Primary Examiner* — Jacob Marks
(74) *Attorney, Agent, or Firm* — Dentons US LLP

(57) ABSTRACT

An electrolytic solution and a battery capable of improving cycle characteristics are provided. A separator is impregnated with an electrolytic solution. The electrolytic solution includes a cyclic carbonate derivative having a halogen atom such as 4-fluoro-1,3-dioxolane-2-one or 4-chloro-1,3-dioxolane-2-one and a cyclic imide salt such as 1,1,2,2,3,3-hexafluoropropane-1,3-disulfonimide lithium. Thereby, the decomposition reaction of the electrolytic solution can be inhibited, and the cycle characteristics can be improved.

13 Claims, 7 Drawing Sheets

(51) Int. Cl.
*H01M 4/38* (2006.01)
*H01M 10/052* (2010.01)
*H01M 10/0569* (2010.01)
*H01M 10/42* (2006.01)
H01M 4/505 (2010.01)
H01M 4/525 (2010.01)
*H01M 10/0587* (2010.01)

(52) U.S. Cl.
CPC .. *H01M 10/0587* (2013.01); *H01M 2300/004* (2013.01); *Y02E 60/122* (2013.01)

(56) References Cited

U.S. PATENT DOCUMENTS

| | | | | |
|---|---|---|---|---|
| 5,691,081 | A | * | 11/1997 | Krause et al. ................ 429/307 |
| 6,632,564 | B1 | * | 10/2003 | Takahashi et al. ........... 429/188 |
| 6,670,078 | B1 | * | 12/2003 | Sato et al. .................... 429/340 |
| 2001/0008736 | A1 | | 7/2001 | Fanta et al. |
| 2004/0002002 | A1 | * | 1/2004 | Mizuta et al. ................ 429/188 |
| 2004/0142247 | A1 | * | 7/2004 | Yoshimura et al. .......... 429/333 |
| 2004/0146786 | A1 | * | 7/2004 | Sato et al. .................... 429/326 |
| 2004/0197667 | A1 | * | 10/2004 | Noh et al. ..................... 429/326 |
| 2004/0262571 | A1 | * | 12/2004 | Barker et al. ............... 252/182.1 |
| 2005/0118512 | A1 | * | 6/2005 | Onuki et al. .................. 429/326 |
| 2005/0164094 | A1 | * | 7/2005 | Kotato et al. ................. 429/331 |

FOREIGN PATENT DOCUMENTS

| | | |
|---|---|---|
| JP | 11-512563 | 10/1999 |
| JP | 2003-532619 | 11/2003 |
| JP | 2004-253296 | 9/2004 |
| JP | 2004-363086 | 12/2004 |
| WO | 01/22519 A1 | 3/2001 |
| WO | 01/31724 A1 | 5/2001 |
| WO | 01/041248 | 6/2001 |

OTHER PUBLICATIONS

Japanese Office Action issued on Sep. 6, 2011 in connection with counterpart JP Application No. 2006-037698.

* cited by examiner

ELECTROLYTIC SOLUTION AND BATTERY

CROSS REFERENCES TO RELATED APPLICATIONS

The present invention contains subject matter related to Japanese Patent Application JP 2005-112052 filed in the Japanese Patent Office on Apr. 8, 2005, Japanese Patent Application JP 2005-116187 filed in the Japanese Patent Office on Apr. 13, 2005, and Japanese Patent Application JP 2006-37698 filed in the Japanese Patent Office on Feb. 15, 2006, the entire contents of which being incorporated herein by references.

BACKGROUND OF THE INVENTION

1. Field of the Invention

The present invention relates to an electrolytic solution including an electrolyte salt and a battery using the electrolytic solution.

2. Description of the Related Art

In recent years, a large number of portable electronic devices such as camcorders, digital still cameras, cellular phones, personal digital assistants and laptop computers have been emerged, and an attempt to reduce the size and the weight of them has been made. Research and development aimed at improving the energy densities of batteries used as portable power sources of the electronic devices, specifically secondary batteries have been actively promoted. Among the batteries, a lithium-ion secondary battery using a carbon material for an anode, a composite material of lithium (Li) and a transition metal for a cathode and a carbonate for an electrolytic solution can obtain a high energy density, compared to a lead-acid battery and a nickel cadmium battery in related arts, so the lithium-ion secondary battery has been widely put into practical use.

Moreover, recently a further improvement in capacity has been desired according to enhancement of performance of portable electronic devices, and the use of tin (Sn) or silicon (Si) as an anode active material instead of the carbon material has been studied. It is because the theoretical capacities of tin and silicon are 994 mAh/g and 4199 mAh/g, respectively, which are much larger than the theoretical capacity of graphite of 372 mAh/g, therefore, an improvement in capacity can be expected. In particular, it is reported that in an anode formed through forming a thin film of tin or silicon on a current collector, the anode active material is not pulverized by insertion and extraction of lithium, and a relatively large discharge capacity can be maintained (for example, refer to the pamphlet of International Publication No. WO01/031724).

Further, as a secondary battery capable of obtaining a high energy density, there is a lithium metal secondary battery using lithium metal for an anode and using only precipitation and dissolution reactions of lithium metal for an anode reaction. The lithium metal has a theoretical electrochemical equivalent of 2054 mAh/cm$^3$, which is 2.5 times larger than that of graphite, so the lithium metal secondary battery holds promise of improving the capacity. A large number of researchers have been conducting research and development aimed at putting the lithium metal secondary battery to practical use (for example, refer to "Lithium Batteries" Edited by Jean-Paul Gabano, Academic Press, 1983, London, New York).

Further, a secondary battery in which the capacity of an anode includes a capacity component by insertion and extraction of lithium and a capacity component by precipitation and dissolution of lithium, and is represented by the sum of them has been developed recently (for example, refer to the pamphlet of International Publication No. WO01/22519). In the secondary battery, a carbon material capable of inserting and extracting lithium is used for an anode, and lithium is precipitated on a surface of the carbon material during charge. The secondary battery holds promise of achieving a high energy density as in the case of the lithium metal secondary battery.

SUMMARY OF THE INVENTION

However, in a battery using tin, silicon or lithium metal for an anode in such a manner, the activity is higher than a battery using a carbon material for an anode in related arts, so there is an issue that when a carbonate, lithium hexafluorophosphate or the like which is used for an electrolytic solution in related arts is used, it is decomposed, and lithium is inactivated. Therefore, when charge and discharge are repeated, charge-discharge efficiency declines, thereby it is difficult to obtain sufficient cycle characteristics.

It is known that even in the case where a carbon material is used as an anode active material, when a battery voltage is increased, a discharge capacity is improved; however, even in this case, there is an issue that an electrolytic solution is easily decomposed, so charge-discharge efficiency declines, and cycle characteristics declines.

In view of the foregoing, it is desirable to provide an electrolytic solution capable of improving cycle characteristics, and a battery using the electrolytic solution.

According to an embodiment of the present invention, there is provided an electrolytic solution including: a cyclic imide salt; and a cyclic carbonate derivative having a halogen atom.

According to a first embodiment of the present invention, there is provided a battery including: a cathode; an anode; and an electrolytic solution, wherein the anode includes a material which is capable of inserting and extracting an electrode reactant, and includes at least one kind selected from the group consisting of metal elements and metalloid elements as an element, and the electrolytic solution includes a cyclic imide salt.

According to a second embodiment of the present invention, there is provided a battery including: a cathode; an anode; and an electrolytic solution, wherein an open circuit voltage per a pair of the cathode and the anode in a full charge state is 4.25 V or more, and the electrolytic solution includes a cyclic imide salt.

According to a third embodiment of the present invention, there is provided a battery including: a cathode; an anode; and an electrolytic solution, wherein lithium metal is used as an anode active material, and the electrolytic solution includes a cyclic imide salt and a cyclic carbonate derivative having a halogen atom.

According to a fourth embodiment of the present invention, there is provided a battery including: a cathode; an anode; an electrolytic solution, wherein the capacity of the anode includes a capacity component by insertion and extraction of light metal and a capacity component by precipitation and dissolution of light metal, and is represented by the sum of them, and the electrolytic solution includes a cyclic imide salt and a cyclic carbonate derivative having a halogen atom.

In the electrolytic solution according to the embodiment of the invention, the cyclic imide salt is included, so the decomposition reaction of the electrolytic solution can be inhibited, and the cyclic carbonate derivative having a halogen atom is further included, so a higher effect can be obtained.

In the batteries according to the first and the second embodiments of the invention, the cyclic imide salt is included, so the decomposition reaction of the electrolytic solution can be inhibited, and cycle characteristics can be improved. Moreover, when the cyclic carbonate derivative having a halogen atom is further included, the decomposition reaction of the electrolytic solution can be further inhibited, and the cycle characteristics can be further improved.

In the batteries according to the third and the fourth embodiments of the invention, the cyclic imide salt and the cyclic carbonate derivative having a halogen atom are included, so the decomposition reaction of the electrolytic solution can be inhibited, and the cycle characteristics can be improved.

In particular, when the content of the imide salt in the electrolytic solution is within a range from 0.1 wt % to 31 wt % inclusive, a higher effect can be obtained.

Moreover, when the electrolytic solution includes at least one kind selected from the group consisting of cyclic carbonates having an unsaturated bond and sultones, cycle characteristics at high temperature conditions can be improved.

Other and further objects, features and advantages of the invention will appear more fully from the following description.

DETAILED DESCRIPTION OF THE PREFERRED EMBODIMENTS

Figure 1:
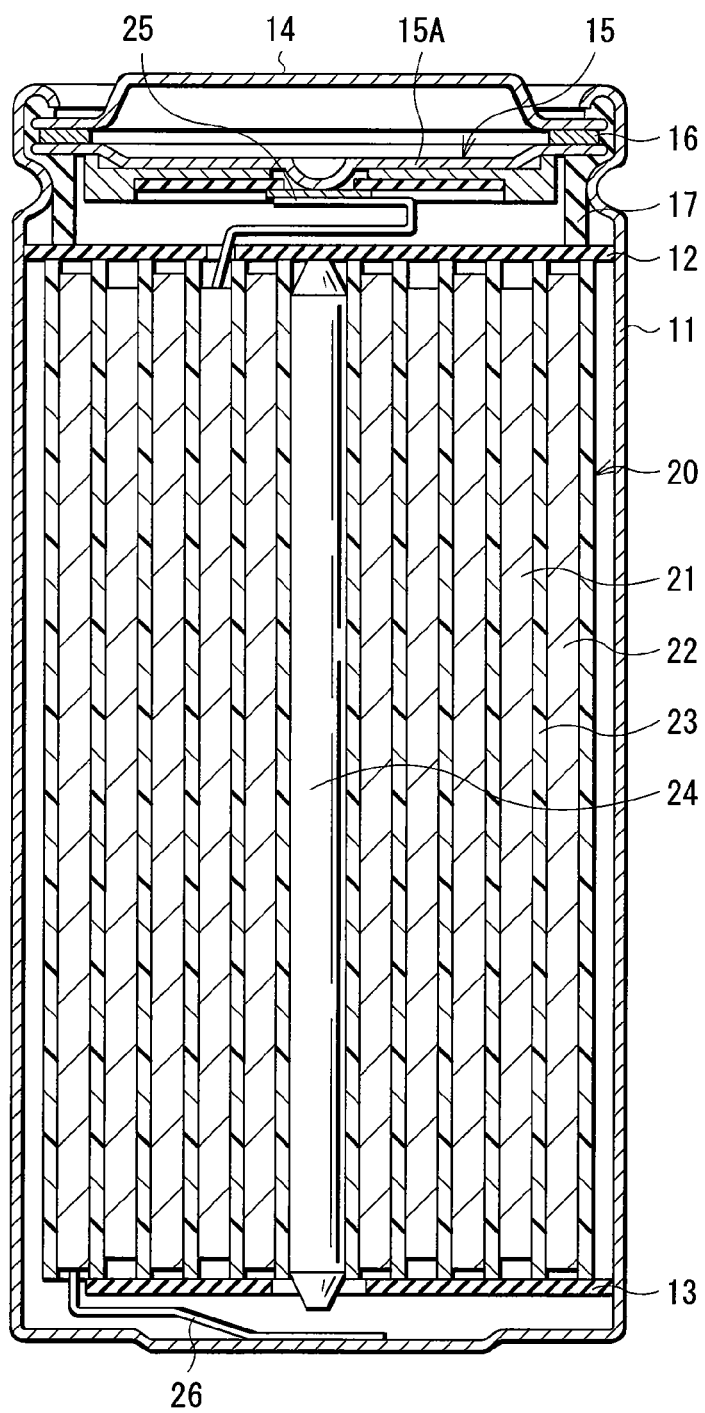
FIG. 1 is a sectional view of a first secondary battery using an electrolytic solution according to an embodiment of the invention.

Preferred embodiments will be described in detail below referring to the accompanying drawings.

An electrolytic solution according to an embodiment of the invention includes, for example, a solvent and an electrolyte salt dissolved in the solvent.

The solvent includes a high permittivity solvent with a relative permittivity of 30 or more, because the number of lithium ions can be increased by the high permittivity solvent.

Examples of the high permittivity solvent include ethylene carbonate, propylene carbonate, butylene carbonate, cyclic carbonates such as 1,3-dioxol-2-one and 4-vinyl-1,3-dioxolane-2-one, carbonate derivatives in which a part of hydrogen in the cyclic carbonates is substituted with halogen, lactones such as γ-butyrolactone and γ-valerolactone, lactams such as N-methyl-2-pyrrolidone, cyclic carbamates such as 3-methyl-2-oxazolidinone, sulfone compounds such as tetramethylene sulfone and sultones. One kind or a mixture including two or more kinds selected from them may be used as the high permittivity solvent.

Among them, a cyclic carbonate derivative having a halogen atom is preferable, because the decomposition reaction of the solvent can be inhibited. As such a carbonate derivative, for example, a carbonate derivative shown in Chemical Formula 1 is cited, and more specifically carbonate derivatives shown in Chemical Formulas 2(1) through 2(26) are cited. Among them, 4-fluoro-1,3-dioxolane-2-one shown in Chemical Formula 2(1) or 4-chloro-1,3-dioxolane-2-one shown in Chemical Formula 2(2) is preferable, and in particular, 4-fluoro-1,3-dioxolane-2-one is desirable, because a higher effect can be obtained.

[Chemical Formula 1]

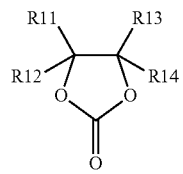

where R11, R12, R13 and R14 each represent hydrogen, fluorine, chlorine, bromine, a methyl group, an ethyl group or a group in which a part of hydrogen in a methyl group or an ethyl group is substituted with fluorine, chlorine and bromine, and at least one of R11, R12, R13 and R14 is a group having halogen, and they may be the same as or different from one another.

[Chemical Formulas 2]

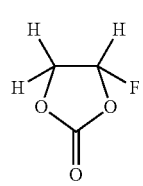

(1)

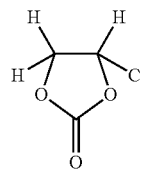

(2)

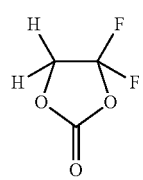

(3)

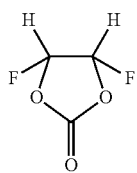 (4)
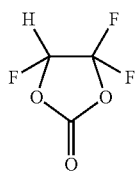 (5)
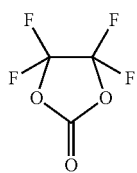 (6)
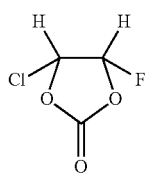 (7)
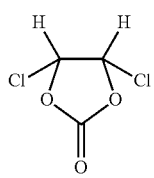 (8)
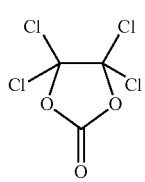 (9)
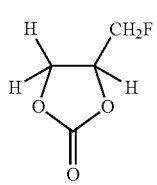 (10)
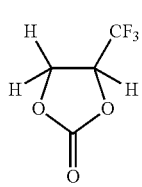 (11)
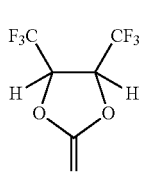 (12)
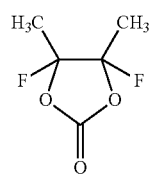 (13)
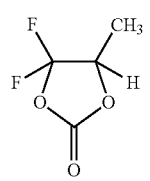 (14)
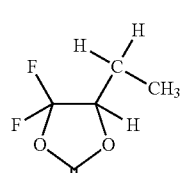 (15)
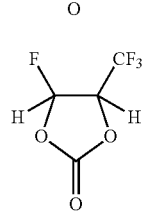 (16)
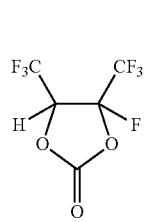 (17)
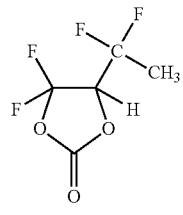 (18)
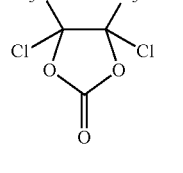 (19)
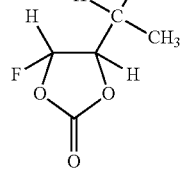 (20)

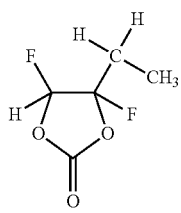 (21)

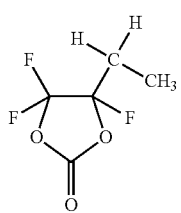 (22)

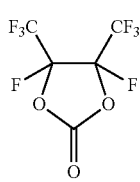 (23)

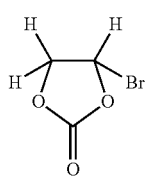 (24)

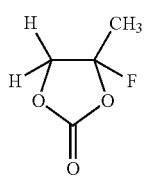 (25)

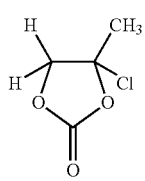 (26)

Moreover, a cyclic carbonate having an unsaturated bond such as 1,3-dioxol-2-one shown in Chemical Formula 3(1) or 4-vinyl-1,3-dioxolane-2-one shown in Chemical Formula 3(2), or a sultone such as 1,3-propane sultone shown in Chemical Formula 4(1) or 3-propene sultone shown in Chemical Formula 4(2) is preferable, because the decomposition reaction of the solvent can be inhibited, and a high effect can be obtained under high temperature conditions. In the case where the cyclic carbonate having an unsaturated bond is included in an electrolytic solution, the content of the cyclic carbonate is preferably within a range from 0.05 wt % to 20 wt % inclusive. Moreover, in the case where the sultone is included in the electrolytic solution, the content of the sultone is preferably within a range from 0.01 wt % to 5 wt % inclusive. It is because a high effect can be obtained in these ranges.

[Chemical Formulas 3]

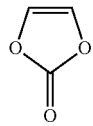 (1)

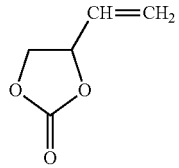 (2)

[Chemical Formulas 4]

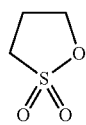 (1)

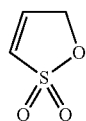 (2)

Moreover, a low viscosity solvent with a viscosity of 1 mPa·s or less is preferably mixed and used with the high-permittivity solvent, because higher ionic conductivity can be obtained through the use of the low viscosity solvent. Examples of the low viscosity solvent include chain carbonates such as dimethyl carbonate, diethyl carbonate, ethyl methyl carbonate and methyl propyl carbonate, chain carboxylates such as methyl acetate, ethyl acetate, methyl propionate, ethyl propionate, methyl butyrate, methyl isobutyrate, methyl trimethylacetate and ethyl trimethylacetate, ketones such as pinacolin, ethers such as 1,2-dimethoxy-ethane, tetrahydrofuran, 2-methyltetrahydrofuran, tetrahydropyran, 1,3-dioxolane, 4-methyl-1,3-dioxolane, 1,3-dioxane and 1,4-dioxane, chain amides such as N,N-dimethylacetamide and N,N-dimethylformamide, and chain carbamates such as methyl-N,N-dimethylcarbamate, methyl-N,N-diethylcarbamate and ethyl-N,N-diethylcarbamate. One kind or a mixture including two or more kinds selected from them may be used as the low-viscosity solvent.

As the electrolyte salt, a cyclic imide salt is included, because the cyclic imide salt has not only a function as an electrolyte salt but also a function of inhibiting the decomposition reaction of the electrolytic solution. Examples of the cyclic imide salt include compounds shown in Chemical Formulas 5(1) through 5(6). In Chemical Formulas 5(1) through 5(6), alkali metal salts are shown; however, an alkali earth metal salt or an aluminum metal salt which have similar properties can be used.

[Chemical Formulas 5]

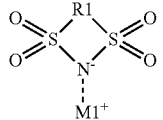 (1)

-continued

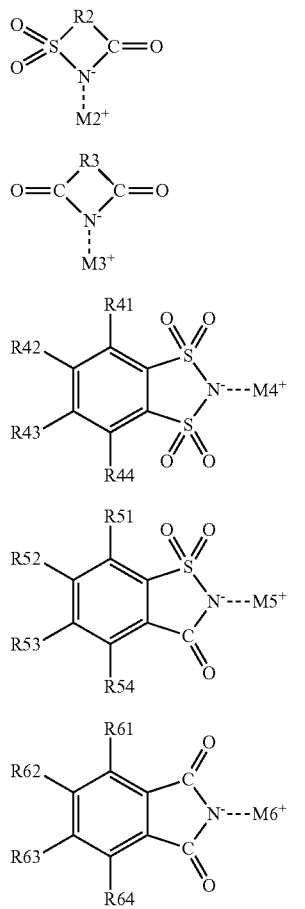

where M1, M2, M3, M4, M5 and M6 each represent alkali metal, R1, R2 and R3 each represent a straight-chain or branched alkylene group having 2 to 5 carbon atoms or a group in which a part of hydrogen in the alkylene group is substituted with fluorine, R41, R42, R43, R44, R51, R52, R53, R54, R61, R62, R63 and R64 each represent hydrogen, an alkyl group having 1 to 4 carbon atoms or a group in which a part of hydrogen in the alkyl group is substituted with fluorine, and R41, R42, R43, R44, R51, R52, R53, R54, R61, R62, R63 and R64 may be the same as or different from one another.

More specifically, examples of the cyclic imide salt include 1,1,2,2,3,3-hexafluoropropane-1,3-disulfonimide lithium shown in Chemical Formula 6(1), 2,2,3,3,4,4-hexafluoroglutarimide lithium shown in Chemical Formula 6(2), lithium ortho-sulphobenzimide shown in Chemical Formula 6(3), 1,1,2,2,3,3-hexafluoropropane-1,3-disulfonimide sodium, 2,2,3,3,4,4-hexafluoroglutarimide sodium, sodium ortho-sulphobenzimide, 1,1,2,2,3,3 hexafluoropropane-1,3-disulfonimide potassium, 2,2,3,3,4,4-hexafluoroglutarimide potassium, potassium ortho-sulphobenzimide, 1,1,2,2-tetrafluoroethane-1,3-disulfonimide lithium shown in Chemical Formula 6(4), 1-trifluoromethyl-1,2,2,3,3-pentafluoropropane-1,3-disulfonimide lithium shown in Chemical Formula 6(5), and 1,1,2,2,3,3,4,4-octafluorobutyl-1,3-disulfonimide lithium shown in Chemical Formula 6(6). Among them, 1,1,2,2,3,3-hexafluoropropane-1,3-disulfonimide lithium, 2,2,3,3,4,4-hexafluoroglutarimide lithium, lithium ortho-sulphobenzimide, 1,1,2,2-tetrafluoroethane-1, 3-disulfonimide lithium, or 1,1,2,2,3,3,4,4-octafluorobutyl-1,3-disulfonimide lithium is preferable, because a higher effect can be obtained.

[Chemical Formulas 6]

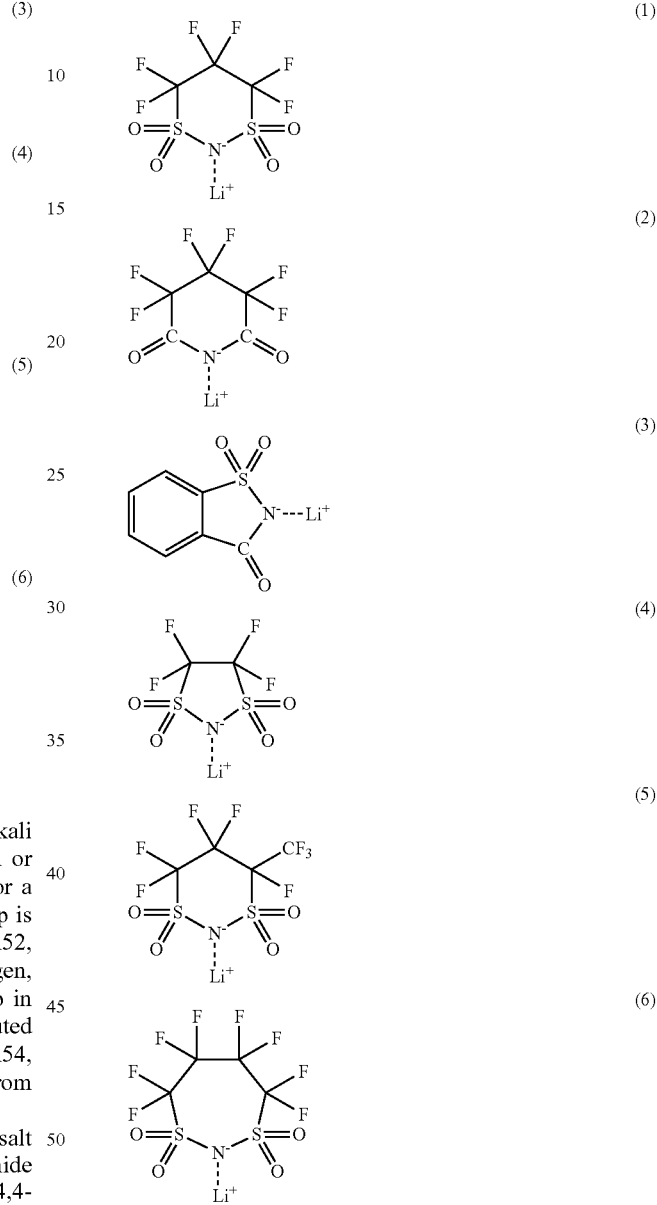

The content of the cyclic imide salt in the whole electrolytic solution is preferably within a range from 0.1 wt % to 31 wt % inclusive, because a higher effect can be obtained in the range. One kind or a mixture including two or more kinds selected from them may be used as the cyclic imide salt.

The electrolyte salt may include only the cyclic imide salt, or may include a mixture of the cyclic imide salt and one kind or two or more kinds of other salts. Examples of the other salts include lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium hexafluorosilicate ($LiSiF_6$), lithium perchlorate (Li- ClO$_4$), lithium tetrachloroaluminate (LiAlCl$_4$), lihtium chloride (LiCl), lithium bromide (LiBr), lithium bis(oxalato) borate (LiB(C$_2$O$_4$)$_2$), lithium tetraphenylborate (LiB(C$_6$H$_5$)$_4$), lithium tetrakis(trifluoroacetoxy) borate (LiB (OCOCF$_3$)$_4$), lithium tetrakis(pentafluoropropioxy) borate (LiB(OCOC$_2$F$_5$)$_4$), lithium methanesulfonate (LiCH$_3$SO$_3$), lithium trifluoromethanesulfonate (LiCF$_3$SO$_3$), a lithium salt shown in Chemical Formula 7(1) such as lithium bis(trifluoromethanesulfone)imide(LiN(CF$_3$SO$_2$)$_2$), lithium bis(pentafluoroethanesulfone)imide(LiN(C$_2$F$_5$SO$_2$)$_2$) or lithium (nonafluorobutanesulfone)(trifluoromethanesulfone)imide(LiN(C$_4$F$_9$SO$_2$)(CF$_3$SO$_2$)) and a lithium salt shown in Chemical Formula 7(2) such as lithium tris(trifluoromethanesulfone)methide((CF$_3$SO$_2$)$_3$CLi).

[Chemical Formulas 7]

$$\text{LiN}(C_mF_{2m+1}SO_2)(C_nF_{2n+1}SO_2) \quad (1)$$

$$\text{LiC}(C_pF_{2p+1}SO_2)(C_qF_{2q+1}SO_2)(C_rF_{2r+1}SO_2) \quad (2)$$

where m, n, p, q and r each are an integer of 1 or more.

In particular, at least one kind selected from the group consisting of lithium hexafluorophosphate, lithium tetrafluoroborate, lithium bis(oxalato) borate, LiB(OCOCF$_3$)$_4$, LiB (OCOC$_2$F$_5$)$_4$, lithium perchlorate, lithium hexafluoroarsenate and the lithium salts shown in Chemical Formulas 7 is preferably mixed and used with the cyclic imide salt, because a higher effect can be obtained, and high conductivity can be obtained. Among them, it is more preferable that at least lithium hexafluorophosphate is mixed and used with the cyclic imide salt.

The electrolytic solution is used in a secondary battery as described below.

(First Secondary Battery)

FIG. 1 shows a sectional view of a first secondary battery using the electrolytic solution according to the embodiment. The secondary battery is a so-called lithium-ion secondary battery in which the capacity of an anode is represented by a capacity component by insertion and extraction of lithium as an electrode reactant. The secondary battery is a so-called cylindrical type battery, and includes a spirally wound electrode body 20 which includes a cathodes 21 and an anode 22 spirally wound with a separator 23 in between in a substantially hollow cylindrical-shaped battery can 11. The battery can 11 is made of, for example, nickel (Ni)-plated iron (Fe). An end portion of the battery can 11 is closed, and the other end portion thereof is opened. In the battery can 11, a pair of insulating plates 12 and 13 are disposed such that the spirally wound electrode body 20 is sandwiched therebetween in a direction perpendicular to a peripheral winding surface.

In the opened end portion of the battery can 11, a battery cover 14, and a safety valve mechanism 15 and a positive temperature coefficient device (PTC device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when an internal pressure in the battery increases to higher than a certain extent due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation by a large current. The gasket 17 is made of, for example, an insulating material, and its surface is coated with asphalt.

A center pin 24 is inserted into the center of the spirally wound electrode body 20. A cathode lead 25 made of aluminum (Al) or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
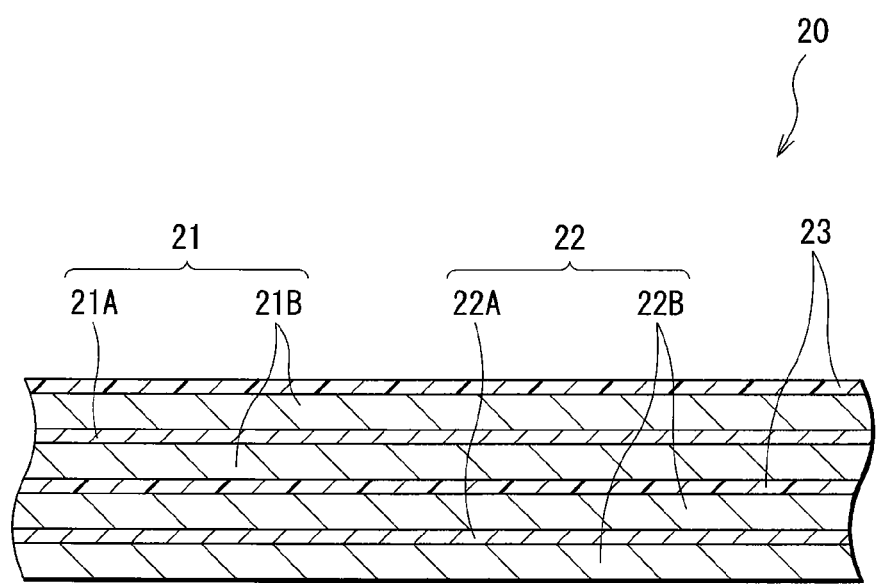
FIG. 2 is an enlarged sectional view of a part of a spirally wound electrode body in the secondary battery shown in FIG. 1.

FIG. 2 shows an enlarged view of a part of the spirally wound electrode body 20. The cathode 21 includes a cathode current collector 21A having a pair of facing surfaces and a cathode active material layer 21B which is disposed on both sides of a cathode current collector 21A. The cathode current collector 21A is made of, for example, a metal material such as aluminum, nickel or stainless. The cathode active material layer 21B includes one kind or two or more kinds of cathode materials capable of inserting and extracting lithium as an electrode reactant, and may include an electrical conductor such as a carbon material and a binder such as polyvinylidene fluoride, if necessary.

As the cathode material capable of inserting and extracting lithium, for example, lithium cobalt oxide, lithium nickel oxide, a solid solution including lithium cobalt oxide and lithium nickel oxide (Li(Ni$_x$Co$_y$Mn$_z$)O$_2$))(the values of x, y and z are 0<x<1, 0<y<1, 0<z<1, x+y+z=1), lithium complex oxide such as lithium manganese oxide (LiMn$_2$O$_4$) with a spinel structure or a solid solution thereof (Li(Mn$_{2-v}$Ni$_v$)O$_4$) (the value of v is v<2), or a phosphate compound with an olivine structure such as lithium iron phosphate (LiFePO$_4$) is preferable, because a high energy density can be obtained. Moreover, Examples of the cathode material capable of inserting and extracting lithium include oxides such as titanium oxide, vanadium oxide and manganese dioxide, bisulfides such as iron bisulfide, titanium bisulfide and molybdenum sulfide, sulfur, and conductive macromolecules such as polyaniline and polythiophene.

The anode 22 has a structure in which an anode active material layer 22B is disposed on both sides of an anode current collector 22A having a pair of facing surfaces. The anode current collector 22A is made of, for example, a metal material such as copper (Cu), nickel or stainless.

The anode active material layer 22B includes one kind or two or more kinds of anode materials capable of inserting and extracting lithium, and may include an electrical conductor, a binder or the like if necessary. As the anode material capable of inserting and extracting lithium, for example, a material which can insert and extract lithium and includes at least one kind selected from the group consisting of metal elements and metalloid elements as an element is cited. Such an anode material is preferably used, because a high energy density can be obtained. The anode material may be made of the simple substance, an alloy or a compound of a metal element or a metalloid element, and a phase of one kind or two or more kinds selected from them may be included at least in a part of the anode material. In the invention, the alloy includes an alloy including one or more kinds of metal elements and one or more kinds of metalloid elements in addition to an alloy including two or more kinds of metal elements. Further, the alloy may include a nonmetal element. As the texture of the alloy, a solid solution, a eutectic (eutectic mixture), an intermetallic compound or the coexistence of two or more kinds selected from them is cited.

Examples of the metal elements or the metalloid elements included in the anode material include metal elements and metalloid elements capable of forming an alloy with lithium. More specifically, magnesium (Mg), boron (B), aluminum (Al), gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like is included. Among them, silicon or tin is specifically preferable, becaue silicon and tin have a large capability to insert and extract lithium, so a high energy density can be obtained.

As such an anode material, for example, an anode material including tin as a first element, a second element and a third element is preferable. The second element includes at least one kind selected from the group consisting of cobalt (Co), iron, magnesium, titanium (Ti), vanadium (V), chromium (Cr), manganese (Mn), nickel, copper, zinc, gallium, zirconium, niobium (Nb), molybdenum (Mo), silver, indium, cerium (Ce), hafnium, tantalum (Ta), tungsten (W), bismuth and silicon. The third element includes at least one kind selected from the group consisting of boron, carbon (C), aluminum and phosphorus (P). When the second element and the third element are included, cycle characteristics can be improved.

Among them, as the anode material, a CoSnC-containing material in which tin, cobalt and carbon are included as elements, and the carbon content is within a range from 9.9 wt % to 29.7 wt % inclusive, and the ratio of cobalt to the total of tin and cobalt Co/(Sn+Co) is within a range from 30 wt % to 70 wt % inclusive is preferable, because a high energy density and superior cycle characteristics can be obtained within such a composition range.

The CoSnC-containing material may include any other element if necessary. As the element, for example, silicon, iron, nickel, chromium, indium, niobium, germanium, titanium, molybdenum, aluminum, phosphorus, gallium or bismuth is preferable, and two or more kinds of them may be included. It is because the capacity and the cycle characteristics can be further improved.

The CoSnC-containing material includes a phase including tin, cobalt and carbon, and the phase preferably has a low crystalline structure or an amorphous structure. Moreover, in the CoSnC-containing material, at least a part of carbon as an element is preferably bonded to a metal element or a metalloid element as another element. It is considered that a decline in the cycle characteristics is caused by cohesion or crystallization of tin or the like, and when carbon is bonded to another element, such cohesion or crystallization can be inhibited.

As a measuring method for checking the bonding state of an element, for example, X-ray photoelectron spectroscopy (XPS) is used. In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated through analyzing the waveform through the use of, for example, commercially available software. In the analysis of the waveform, the position of a main peak existing on a lowest binding energy side is used as an energy reference (284.8 eV).

As the anode material capable of inserting and extracting lithium, for example, a carbon material such as graphite, non-graphitizable carbon or graphitizable carbon may be used, and the carbon material and the above-described anode material may be used together. In the carbon material, a change in crystal structure according to insertion and extraction of lithium is very small, so the carbon material is preferably used together with the above-described anode material, because a high energy density and superior cycle characteristics can be obtained, and the carbon material also functions as an electrical conductor.

In the secondary battery, the amounts of the cathode active material and the anode material capable of inserting and extracting lithium are adjusted so that a charging capacity by the anode material capable of inserting and extracting lithium becomes larger than a charging capacity by the cathode active material, thereby lithium metal is not precipitated on the anode 22 even at the time of full charge.

The separator 23 isolates between the cathode 21 and the anode 22 so as to pass lithium ions through while preventing a short circuit of a current due to contact between the cathode 21 and the anode 22. The separator 23 is made of, for example, a porous film of a synthetic resin such as polytetrafluoroethylene, polypropylene or polyethylene, or a porous film of ceramic, and the separator 23 may have a structure in which two or more kinds of the porous films are laminated.

The separator 23 is impregnated with the electrolytic solution according to the embodiment of the invention.

The secondary battery can be manufactured through the following steps, for example.

At first, for example, the cathode active material layer 21B is formed on the cathode current collector 21A so as to form the cathode 21. The cathode active material layer 21B is formed through the following steps. After cathode active material powder, the electrical conductor and the binder are mixed to form a cathode mixture, the cathode mixture is dispersed in a solvent such as N-methyl-2-pyrrolidone to form paste-form cathode mixture slurry, and the cathode mixture slurry is applied to the cathode current collector 21A, and the cathode mixture slurry is dried and compression molded, thereby the cathode active material layer 21B is formed. Moreover, for example, as in the case of the cathode 21, the anode active material layer 22B is formed on the anode current collector 22A so as to form the anode 22.

Next, the cathode lead 25 is attached to the cathode current collector 21A by welding or the like, and the anode lead 26 is attached to the anode current collector 22A by welting or the like. Then, the cathode 21 and the anode 22 are spirally wound with the separator 23 in between, and a front end portion of the cathode lead 25 is welded to the safety valve mechanism 15, and a front end portion of the anode lead 26 is welded to the battery can 11. Next, the cathode 21 and the anode 22 which are spirally wound are sandwiched between the pair of insulating plates 12 and 13, and they are contained in the battery can 11. After the cathode 21 and the anode 22 are contained in the battery can 11, the electrolytic solution is injected into the battery can 11 so as to impregnate the separator 23 with the electrolytic solution. After that, the battery cover 14, the safety valve mechanism 15 and the PTC device 16 are fixed in an opened end portion of the battery can 11 through caulking by the gasket 17. Thereby, the secondary battery shown in FIGS. 1 and 2 is completed.

When the secondary battery is charged, lithium ions are extracted from the cathode 21, and are inserted into the anode 22 through the electrolytic solution. On the other hand, when the secondary battery is discharged, the lithium ions are extracted from the anode 22 and are inserted into the cathode 21 through the electrolytic solution. At this time, as the cyclic imide salt is included in the electrolytic solution, the decomposition reaction of the electrolytic solution can be inhibited.

Thus, in the secondary battery, the cyclic imide salt is included, so the decomposition reaction of the electrolytic solution can be inhibited, and the cycle characteristics can be improved. Moreover, when the cyclic carbonate derivative having a halogen atom is included, the decomposition reaction of the electrolytic solution can be further inhibited, and the cycle characteristics can be further improved.

In particular, in the case where a material which is capable of inserting and extracting lithium, and includes at least one kind selected from the group consisting of metal elements and metalloid elements as an element is used, the activity of the anode 22 is high, and the electrolytic solution is easily decomposed, so a higher effect can be obtained.

Moreover, when the content of the cyclic imide salt in the electrolytic solution is within a range from 0.1 wt % to 31 wt % inclusive, a higher effect can be obtained.

Further, when the electrolytic solution includes at least one kind selected from the group consisting of the cyclic carbonates having an unsaturated bond and sultones, cycle characteristics under high temperature conditions can be improved.

(Second Secondary Battery)

A second secondary battery has the same structure, functions and effects as those of the first secondary battery, except for the structure of an anode is different, and the second secondary battery can be formed by the same method. Therefore, the second secondary battery will be described referring to FIGS. 1 and 2, and like components are denoted by like numerals as of the first secondary battery, and will not be further described.

The anode 22 has a structure in which the anode active material layer 22B is disposed on both sides of the anode current collector 22A as in the case of the first secondary battery. The anode active material layer 22B includes, for example, an anode active material including tin or silicon as an element. More specifically, for example, the anode active material includes the simple substance, an alloy or a compound of tin, or the simple substance, an alloy or a compound of silicon, and the anode active material may include two or more kinds selected from them.

Moreover, the anode active material layer 22B is formed by, for example, a vapor-phase method, a liquid-phase method, a spraying method or a firing method, or a combination of two or more methods selected from them, and the anode active material layer 22B and the anode current collector 22A are preferably alloyed in at least a part of an interface therebetween. More specifically, in the interface, an element of the anode current collector 22A is preferably diffused into the anode active material layer 22B, or an element of the anode active material is preferably diffused into the anode current collector 22A, or they are preferably diffused into each other, because a fracture of the anode active material layer 22B due to expansion and shrinkage thereof according to charge and discharge can be inhibited, and the electronic conductivity between the anode active material layer 22B and the anode current collector 22A can be improved.

As the vapor-phase method, for example, a physical deposition method or a chemical deposition method can be used, and more specifically, a vacuum deposition method, a sputtering method, an ion plating method, a laser ablation method, a thermal CVD (chemical vapor deposition) method, a plasma chemical vapor deposition method or the like can be used. As the liquid-phase method, a known technique such as electrolytic plating or electroless plating can be used. In the firing method, for example, a particulate anode active material is mixed with a binder or the like to form a mixture, and the mixture is dispersed in a solvent, and is applied, and then the mixture is heated at a higher temperature than the melting point of the binder or the like. As the firing method, a known technique such as, for example, an atmosphere firing method, a reaction firing method or a hot press firing method can be used.

(Third Secondary Battery)

A third secondary battery is a so-called lithium metal secondary battery in which the capacity of the anode 22 is represented by a capacity component by precipitation and dissolution of lithium. The secondary battery has the same structure as that of the first secondary battery, except that the anode active material layer 22B is made of lithium metal, and the secondary battery can be manufactured by the same method. Therefore, the third secondary battery will be described referring to FIGS. 1 and 2, and like components are denoted by like numerals as of the first secondary battery, and will not be further described.

In other words, the secondary battery uses lithium metal as the anode active material, so a higher energy density can be obtained. The anode active material layer 22B may exist at the time of assembling, or may not exist at the time of assembling, and may be formed of lithium metal precipitated at the time of charge. Moreover, the anode active material layer 22B may be used also as a current collector, and the anode current collector 22A may be removed.

In the secondary battery, the electrolytic solution preferably includes the cyclic imide salt and the cyclic carbonate derivative having a halogen atom, and may further include the above-described other component, because when the electrolytic solution includes them, compared to the case where the electrolytic solution includes only either of them, an effect of inhibiting the decomposition reaction of the solvent can be remarkably improved. In this case, the content of the cyclic carbonate derivative having a halogen atom in the solvent is preferably 50 vol % or less, because a higher effect can be obtained.

When the secondary battery is charged, lithium ions are extracted from the cathode 21, and are the lithium ions are precipitated on the surface of the anode current collector 22A as lithium metal through the electrolytic solution. When the secondary battery is discharged, the lithium metal is dissolved from the anode active material layer 22B as lithium ions, and the lithium ions are inserted into the cathode 21 through the electrolytic solution. Thus, the precipitation and dissolution of lithium metal are repeated in the anode 22 according to charge and discharge, and the activity of the anode 22 becomes very high. However, in the secondary battery, the electrolytic solution includes the cyclic imide salt and the cyclic carbonate derivative having a halogen atom, so the decomposition reaction of the electrolytic solution in the anode 22 can be inhibited. Therefore, the charge-discharge efficiency of lithium in the anode 22 can be improved.

Thus, in the secondary battery, the electrolytic solution includes the cyclic imide salt and the cyclic carbonate derivative having a halogen atom, so the decomposition reaction of the electrolytic solution in the anode 22 can be inhibited. Therefore, the charge-discharge efficiency in the anode 22 can be improved, and the cycle characteristics can be improved.

(Fourth Secondary Battery)

In a fourth secondary battery, the capacity of the anode includes a capacity component by insertion and extraction of lithium as an electrode reactant and a capacity component by precipitation and dissolution of lithium, and is represented by the sum of them. The secondary battery has the same structure as that of the first secondary battery, except that the structure of the anode active material layer 22B is different, and the secondary battery can be manufactured by the same method. Therefore, the fourth secondary battery will be described referring to FIGS. 1 and 2, and like components are denoted by like numerals as of the first secondary battery, and will not be further described.

The anode active material layer 22B includes one kind or two or more kinds of anode materials capable of inserting and extracting lithium as anode active materials, and may include a binder if necessary. Examples of such an anode material include the carbon material described in the first embodiment and a material including a metal element or a metalloid element capable of forming an alloy with lithium. Among them, the carbon material is preferably used, because superior cycle characteristics can be obtained.

The amount of the anode material capable of inserting and extracting lithium is adjusted so that the charging capacity by the anode material becomes smaller than the charging capacity of the cathode 21. Thereby, in the secondary battery, in a charging process, lithium metal starts to be precipitated on the anode 22 at the time when an open circuit voltage (that is, a battery voltage) is lower than an overcharge voltage.

The overcharge voltage means an open circuit voltage at the time when the battery turns to an overcharge state, and indicates, for example, a voltage higher than the open circuit voltage of a battery "fully charged" described in and defined by "Guideline for safety assessment of lithium secondary batteries" (SBA G1101) which is one of guidelines drawn up by Japan Storage Battery industries Incorporated (Battery Association of Japan). In other words, the overcharge voltage indicates a higher voltage than an open circuit voltage after charge by using a charging method used when a nominal capacity of each battery is determined, a standard charging method or a recommended charging method. More specifically, the secondary battery is fully charged, for example, at an open circuit voltage of 4.2 V, and the lithium metal is precipitated on a surface of the anode material capable of inserting and extracting lithium in a part of the range of the open circuit voltage from 0 V to 4.2 V. Therefore, in the secondary battery, the anode material capable of inserting and extracting lithium and lithium metal function as anode active materials, and the anode material capable of inserting and extracting lithium is a base when lithium metal is precipitated. Thereby, in the secondary battery, a high energy density can be obtained, and the cycle characteristics and quick charge characteristics can be improved.

Moreover, in the secondary battery, as in the case of the third secondary battery, the cycle carbonate derivative having a halogen atom is preferably included in the electrolytic solution together with the cyclic imide salt, and the above-described other component may be further included. Compared to the case where either of them is included, the obtained effects can be remarkably improved. In this case, the content of the cyclic carbonate derivative having a halogen atom in the solvent is preferably 50 vol % or less, because a higher effect can be obtained.

When the secondary battery is charged, lithium ions are extracted from the cathode 21, and are inserted into the anode material capable of inserting and extracting lithium included in the anode 22 through the electrolytic solution. When the secondary battery is further charged, lithium metal starts to be precipitated on the surface of the anode material capable of inserting and extracting lithium in a state in which the open circuit voltage is lower than the overcharge voltage. After that, until the charge is completed, precipitation of lithium metal on the anode 22 continues. Next, when the secondary battery is discharged, the lithium metal precipitated on the anode 22 is dissolved as lithium ions, and the lithium ions are inserted into the cathode 21 through the electrolytic solution. When the secondary battery is further discharged, lithium ions are extracted from the anode material capable of inserting and extracting lithium in the anode 22, and are inserted into the cathode 21 through the electrolytic solution. Thus, in the secondary battery, the precipitation and dissolution of lithium metal are repeated in the anode 22, so the activity of the anode 22 becomes very high. However, in the secondary battery, the electrolytic solution includes the cyclic imide salt and the cyclic carbonate derivative having a halogen atom, so the decomposition reaction of the electrolytic solution in the anode 22 can be inhibited. Therefore, the charge-discharge efficiency of lithium in the anode 22 can be improved.

Thus, in the secondary battery, the electrolytic solution includes the cyclic imide salt and the cyclic carbonate derivative having a halogen atom, so the decomposition reaction of the electrolytic solution in the anode 22 can be inhibited. Therefore, the charge-discharge efficiency in the anode 22 can be improved, and the cycle characteristics can be improved.

(Fifth Secondary Battery)

Figure 3:
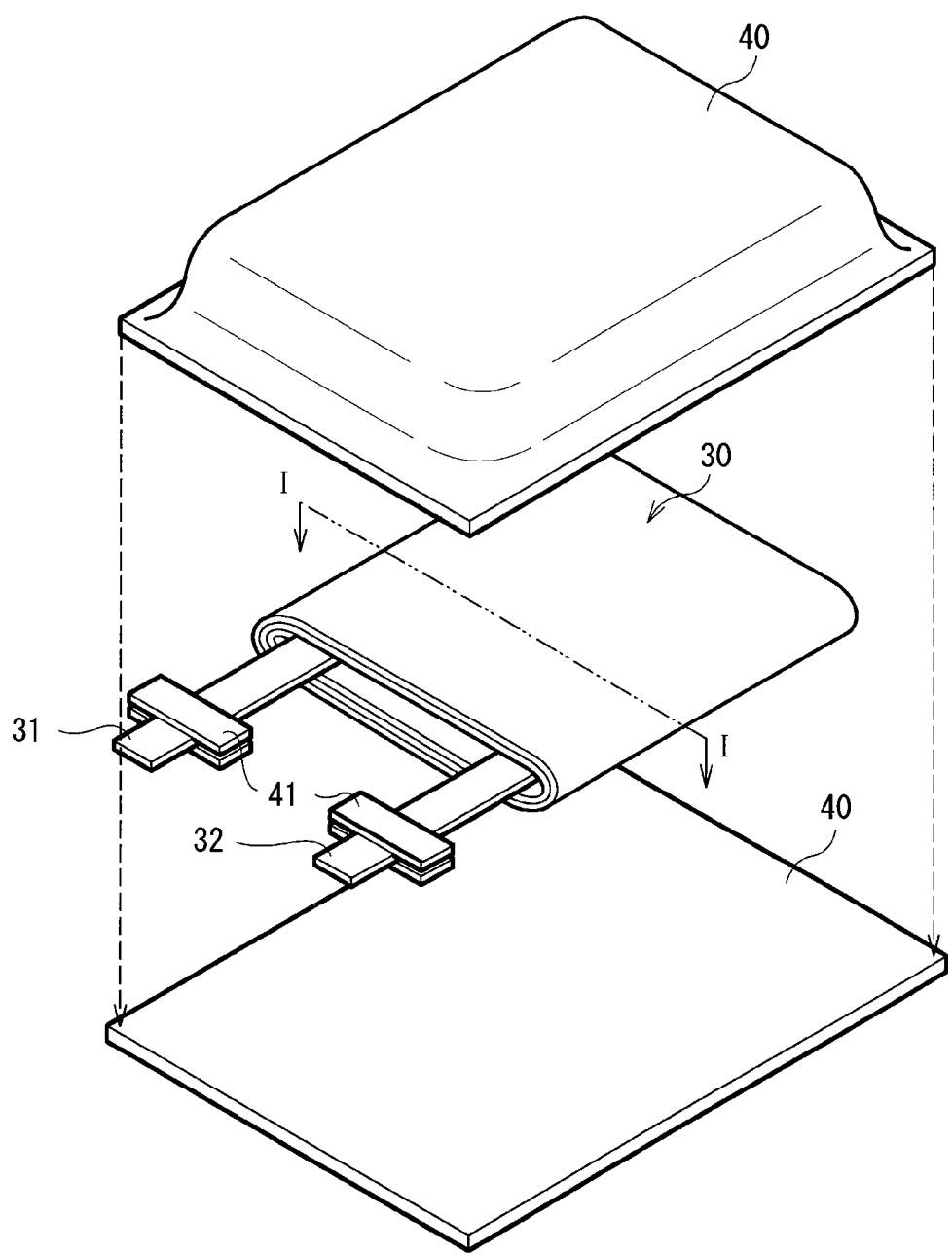
FIG. 3 is an exploded perspective view of a fifth secondary battery using the electrolytic solution according to the embodiment of the invention.

FIG. 3 shows the structure of a fifth secondary battery. The secondary battery is a so-called laminate film type, and in the secondary battery, a spirally wound electrode body 30 to which a cathode lead 31 and an anode lead 32 are attached is contained in film-shaped package members 40.

The cathode lead 31 and the anode lead 32 are drawn from the interiors of the package members 40 to outside, for example, in the same direction. The cathode lead 31 and the anode lead 32 are made of, for example, a metal material such as aluminum, copper, nickel or stainless in a sheet shape or a mesh shape.

The package members 40 are made of, for example, a rectangular aluminum laminate film including a nylon film, aluminum foil and a polyethylene film which are bonded in this order. The package members 40 are disposed so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other structure, a high molecular weight film such as polypropylene or a metal film instead of the above-described aluminum laminate film.

Figure 4:
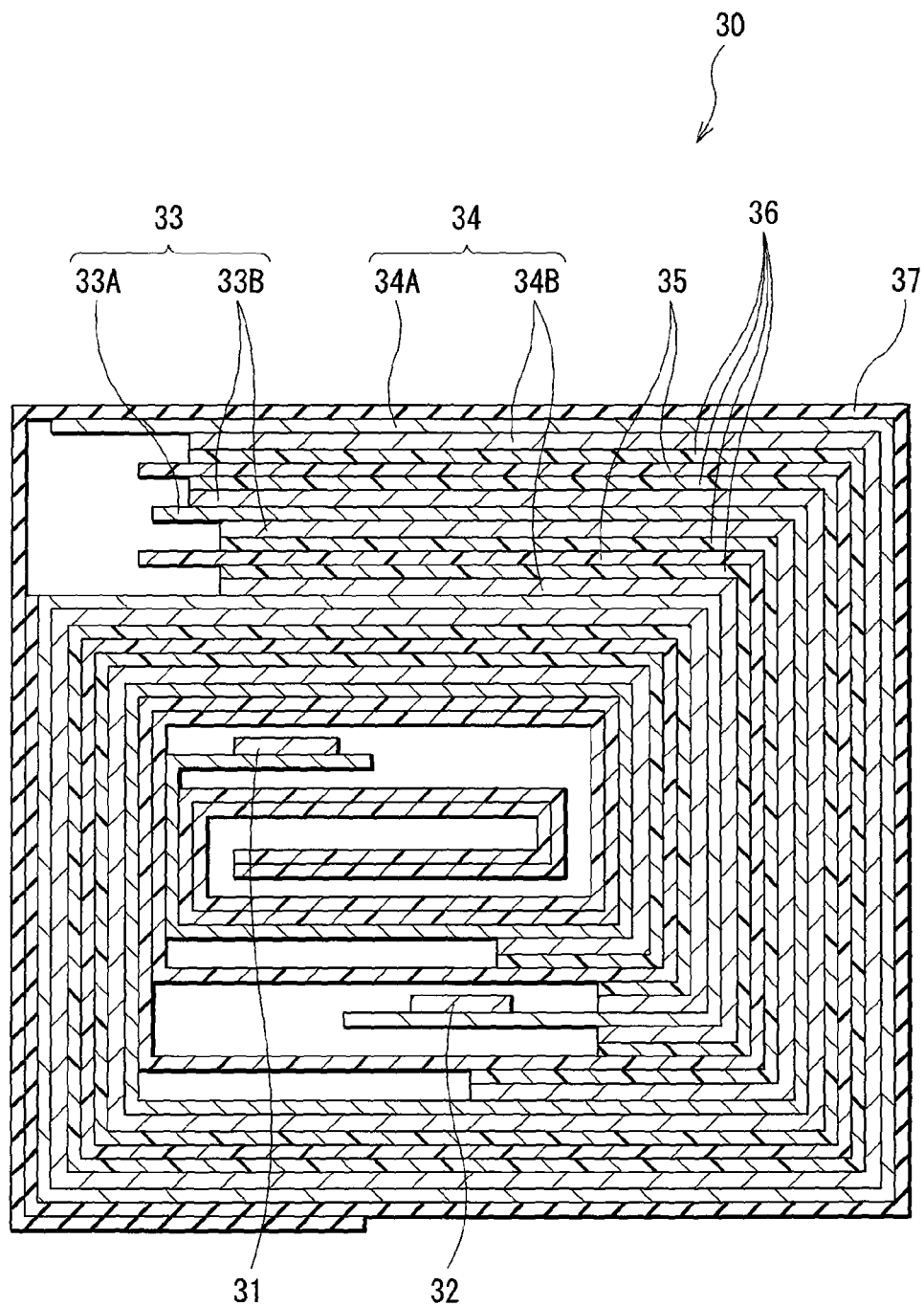
FIG. 4 is a sectional view of the spirally wound electrode body taken along a line I-I of FIG. 3.

FIG. 4 shows a sectional view of the spirally wound electrode body 30 taken along a line I-I of FIG. 3. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a structure in which a cathode active material layer 33B is disposed on both sides of a cathode current collector 33A. The anode 34 has a structure in which an anode active material layer 34B is disposed on both sides of an anode current collector 34A, and the anode 34 is disposed so that the anode active material layer 34B faces the cathode active material layer 33B. The structures of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 in the above-described first, second, third and fourth secondary batteries, respectively.

The electrolyte layer 36 includes the electrolytic solution according to the embodiment and a high molecular weight compound as a holding body which holds the electrolytic solution, and is a so-called gel electrolyte. The gel electrolyte is preferable, because the gel electrolyte can obtain high ionic conductivity, and can prevent leakage of the battery. As the high molecular weight compound, for example, an ether-based high molecular weight compound such as polyethylene oxide or a cross-link including polyethylene oxide, an ester-based high molecular weight compound such as polymethacrylate or an acrylate-based high molecular weight compound, or polyvinylidene fluoride, or a polymer of vinylidene fluoride such as a copolymer of vinylidene fluoride and hexafluoropropylene, and one kind or a mixture including two or more kinds selected from them is used. More specifically, in terms of stability of oxidation-reduction, the flurorine-based high molecular weight compound is preferable.

The secondary battery can be manufactured through the following steps, for example.

At first, the electrolyte layer 36 is formed through applying a precursor solution including the electrolytic solution, the high molecular weight compound and a mixed solvent to the cathode 33 and the anode 34, and volatilizing the mixed solvent. Next, the cathode lead 31 is attached to the cathode current collector 33A, and the anode lead 32 is attached to the anode current collector 34A. Next, after the cathode 33 on which the electrolyte layer 36 is formed and the anode 34 on which the electrolyte layer 36 is formed is laminated with the separator 35 in between to form a laminate, the laminate is spirally wound in a longitudinal direction, and the protective tape 37 is bonded to an outermost portion of the laminate so as to form the spirally wound electrode body 30. After that, for example, the spirally wound electrode body 30 is sandwiched between the package members 40, and edge portions of the package members 40 are adhered to each other through thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 3 and 4 is completed.

Moreover, the battery may be manufactured through the following steps. At first, as described above, the cathode 33 and the anode 34 are formed, and the cathode lead 31 and the anode lead 32 are attached to the cathode 33 and the anode 34, respectively. Then, the cathode 33 and the anode 34 are laminated with the separator 35 in between to form a laminate, and the laminate is spirally wound. The protective tape 37 is bonded to an outermost portion of the spirally wound laminate so as to form a spirally wound body as a precursor body of the spirally wound electrode body 30. Next, the spirally wound body is sandwiched between the package members 40, and the edge portions of the package members 40 except for one side are adhered through thermal fusion bonding to form a pouched package, thereby the spirally wound body is contained in the package members 40. Components for an electrolyte which includes the electrolytic solution, monomers as materials of a high molecular weight compound and a polymerization initiator and, if necessary, any other material such as a polymerization inhibitor are injected in the package members 40, and then an opened portion of the package members 40 are sealed through thermal fusion bonding. After that, the monomers are polymerized through applying heat to form the high molecular weight compound, thereby the gel electrolyte layer 36 is formed so as to assemble the secondary battery shown in FIGS. 3 and 4.

The functions and effects of the secondary battery is the same as those of the above-described first, second, third and fourth secondary batteries.

(Sixth Secondary Battery)

A sixth secondary battery has the same structure as those of the first through the fifth secondary batteries, except that the amounts of the cathode active material and the anode active material are adjusted so that the open circuit voltage (that is, the battery voltage) at the time of full charge per a pair of the cathode and the anode is within a range from 4.25 V to 6.00 V inclusive, and the sixth secondary battery can be formed by the same method.

In the secondary battery, even the same cathode active material is used, the amount of extracted lithium per unit mass is larger than that in a battery in which the open circuit voltage at the time of full charge is 4.20 V, so according to this, the amounts of the cathode active material and the anode active material are adjusted, thereby a higher energy density can be obtained.

As the anode active material, lithium metal or a carbon material capable of inserting and extracting lithium is preferable, because lithium metal and the carbon material have a low charge-discharge potential, so the energy density of the battery can be easily improved.

When the secondary battery is charged, for example, lithium ions are extracted from the cathode 21, and are inserted into the anode 22 through the electrolytic solution. On the other hand, when the secondary battery is discharged, for example, lithium ions are extracted from the anode 22, and are inserted into the cathode 21 through the electrolytic solution. In this case, the battery voltage at the time of charge is 4.25 V or more, so the electrolytic solution is easily decomposed. However, the cyclic imide salt is included as described above, so the decomposition reaction of the electrolytic solution can be inhibited.

The effects of the secondary battery are the same as those of the first through the fifth secondary batteries.

EXAMPLES

Specific examples of the invention will be described in detail below.

Examples 1-1 to 1-5

Figure 5:
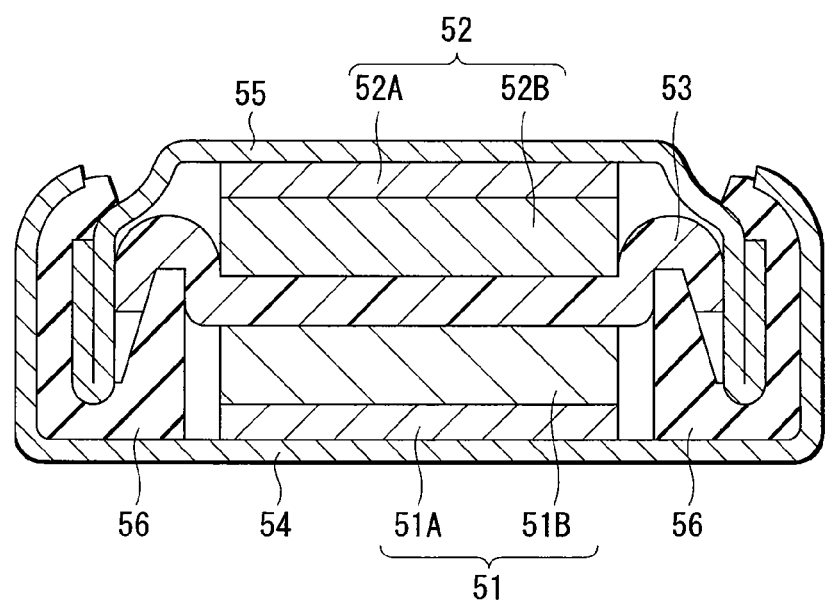
FIG. 5 is a sectional view of a secondary battery formed in an example.

Coin-type secondary batteries shown in FIG. 5 were formed. The secondary batteries were formed through the following steps. A cathode 51 and an anode 52 were laminated with a separator 53 impregnated with the electrolytic solution in between, and they were sandwiched between a package can 54 and a package cup 55. Then, the package can 54 and the package cup 55 were caulked by a gasket 56 so as to form the secondary batteries. At first, 94 parts by weight of lithium cobalt complex oxide ($LiCoO_2$) as a cathode active material, 3 parts by weight of graphite as an electrical conductor and 3 parts by weight of polyvinylidene fluoride as a binder were mixed to form a mixture, and N-methyl-2-pyrrolidone as a solvent was added to the mixture to form cathode mixture slurry. Next, the obtained cathode mixture slurry was uniformly applied to a cathode current collector 51A made of aluminum foil with a thickness of 20 μm, and was dried to form a cathode active material layer 51B with a thickness of 70 μm. After that, the cathode current collector 51A on which the cathode active material layer 51B was formed was stamped into a circular shape with a diameter of 15 mm to form the cathode 51.

Moreover, silicon was used as an anode active material, and an anode active material layer 52B made of silicon with a thickness of 5 μm was formed on an anode current collector 52A made of copper foil with a thickness of 15 μm by sputtering. After that, the anode current collector 52A on which the anode active material layer 52B was formed was stamped into a circular shape with a diameter of 16 mm to form the anode 52. At that time, the filling amounts of the cathode active material and the anode active material were adjusted so that the open circuit voltage (that is, the battery voltage) at the time of full charge became 4.20 V, and the precipitation of lithium metal on the anode 52 during charge was prevented, thereby the capacity of the anode 52 was represented by a capacity component by insertion and extraction of lithium.

Next, after the cathode 51 and the anode 52 were laminated with the separator 53 made of a microporous polypropylene film with a thickness of 25 μm, 0.1 g of the electrolytic solution was injected into the separator 53. Then, they were contained in the package cup 55 and the package can 54 which were made of stainless, and the package cup 55 and the package can 54 were caulked so as to obtain the secondary battery shown in FIG. 5. In Example 1-1, the electrolytic solution was formed through mixing ethylene carbonate (EC) and dimethyl carbonate (DMC) as solvents and lithium hexafluorophosphate as an electrolyte salt at a weight ratio of ethylene carbonate:dimethyl carbonate:lithium hexafluorophosphate=42:42:15, and adding 1 wt % of a cyclic imide salt. In Example 1-2, the electrolytic solution was formed through mixing 4-chloro-1,3-dioxolane-2-one (ClEC) which was a cyclic carbonate derivative having a halogen atom and dimethyl carbonate as solvents and lithium hexafluorophosphate as an electrolyte salt at a weight ratio of 4-chloro-1,3-dioxolane-2-one:dimethyl carbonate:lithium hexafluorophosphate 42:42:15, and adding 1 wt % of a cyclic imide salt. In Examples 1-3 and 1-5, the electrolytic solution was formed through mixing 4-fluoro-1,3-dioxolane-2-one (FEC) which was a cyclic carbonate derivative having a halogen atom and dimethyl carbonate (DMC) as solvents and lithium hexafluorophosphate as an electrolyte salt at a volume ratio of 4-fluoro-1,3-dioxolane-2-one:dimethyl carbonate:lithium hexafluorophosphate 42:42:15, and adding 1 wt % of a cyclic imide salt. The cyclic imide salt was 1,1,2,2,3,3-hexafluoropropane-1,3-disulfonimide lithium shown in Chemical Formula 6(1) in Examples 1-1 through 1-3 and 2,2,3,3,4,4-hexafluoroglutarimide lithium shown in Chemical Formula 6(2) in Example 1-4, and lithium ortho-sulphobenzimide shown in Chemical Formula 6(3) in Example 1-5.

As Comparative Examples 1-1 through 1-3 relative to Examples 1-1 through 1-5, secondary batteries were formed as in the case of Examples 1-1 through 1-5, except that the cyclic imide salt was not added. More specifically, the electrolytic solution was a mixture including ethylene carbonate, dimethyl carbonate and lithium hexafluorophosphate at a weight ratio of ethylene carbonate:dimethyl carbonate:lithium hexafluorophosphate=42:42:15 in Comparative Example 1-1, a mixture including 4-chloro-1,3-dioxolane-2-one, dimethyl carbonate and lithium hexafluorophosphate at a weight ratio of 4-chloro-1,3-dioxolane-2-one:dimethyl carbonate:lithium hexafluorophosphate=42:42:15 in Comparative Example 1-2, and a mixture including 4-fluoro-1,3-dioxolane-2-one, dimethyl carbonate and lithium hexafluorophosphate at a weight ratio of 4-fluoro-1,3-dioxolane-2-one:dimethyl carbonate:lithium hexafluorophosphate=42:42:15 in Comparative Example 1-3.

As a charge-discharge cycle, the obtained secondary batteries of Examples 1-1 through 1-5 and Comparative Examples 1-1 through 1-3 were charged at 1.77 mA at 25° C. for 12 hours under condition that a maximum voltage was 4.2 V, and then after a 10-minute interval, the secondary batteries were discharged at 1.77 mA until reacing 2.5 V, and the charge-discharge cycle was repeated to determine the discharge capacity retention ratio in the 50th cycle. The discharge capacity retention ratio in the 50th cycle was calculated by (discharge capacity in the 50th cycle/initial capacity)×100(%). The results are shown in Table 1.

TABLE 1

Battery shape: coin type
Maximum charging voltage: 4.20 V

| | ANODE ACTIVE MATERIAL | SOLVENT | CYCLIC IMIDE SALT | DISCHARGE CAPACITY RETENTION RATIO (%) |
|---|---|---|---|---|
| EXAMPLE 1-1 | Si | EC + DMC | 1,1,2,2,3,3-hexafluoropropane-1,3-disulfonimide lithium | 60.5 |

TABLE 1-continued

Battery shape: coin type
Maximum charging voltage: 4.20 V

| | ANODE ACTIVE MATERIAL | SOLVENT | CYCLIC IMIDE SALT | DISCHARGE CAPACITY RETENTION RATIO (%) |
|---|---|---|---|---|
| EXAMPLE 1-2 | | CIEC + DMC | 1,1,2,2,3,3-hexafluoropropane-1,3-disulfonimide lithium | 79.4 |
| EXAMPLE 1-3 | | FEC + DMC | 1,1,2,2,3,3-hexafluoropropane-1,3-disulfonimide lithium | 87.8 |
| EXAMPLE 1-4 | | | 2,2,3,3,4,4-hexafluoroglutarimide lithium | 88.6 |
| EXAMPLE 1-5 | | | lithium ortho-sulphobenzimide | 87.2 |
| COMPARATIVE EXAMPLE 1-1 | Si | EC + DMC | NOT INCLUDED | 47.0 |
| COMPARATIVE EXAMPLE 1-2 | | CIEC + DMC | | 68.4 |
| COMPARATIVE EXAMPLE 1-3 | | FEC + DMC | | 75.6 |

EC: ethylene carbonate
DMC: dimethyl carbonate,
CIEC: 4-chloro-1,3-dioxolane-2-one
FEC: 4-fluoro-1,3-dioxolane-2-one It was obvious from Table 1 that in Examples 1-1 through 1-5 in which the cyclic imide salt was used, a higher discharge capacity retention ratio was obtained, compared to Comparative Examples 1-1 through 1-3 in which the cyclic imide salt was not used. Moreover, in Examples 1-2 through 1-5 in which 4-chloro-1,3-dioxolane-2-one or 4-fluoro-1,3-dioxolane-2-one was used, more specifically in Examples 1-3 through 1-5 in which 4-fluoro-1,3-dioxolane-2-one was used, a high effect was observed.

In other words, it was found out that when the electrolytic solution included the cyclic imide salt, the cycle characteristics could be improved, and the cyclic carbonate derivative having a halogen atom was more preferably included in the electrolytic solution.

Examples 2-1 to 2-5, 3-1 to 3-5

As Examples 2-1 through 2-5, coin-type secondary batteries were formed as in the case of Examples 1-1 through 1-5, except that tin was used as an anode active material, and the anode active material layer 52B made of tin with a thickness of 5 μm was formed on the anode current collector 52A made of copper foil with a thickness of 15 μm by vapor deposition. At that time, the filling amounts of the cathode active material and the anode active material were adjusted so that the open circuit voltage at the time of full charge became 4.20 V, and the precipitation of lithium metal on the anode 52 during charge was prevented, thereby the capacity of the anode 52 was represented by a capacity component by insertion and extraction of lithium.

As Examples 3-1 through 3-5, coin-type secondary batteries were formed as in the case of Examples 1-1 through 1-5, except that CoSnC-containing material powder including indium and titanium was used as an anode active material, and 94 parts by weight of the CoSnC-contianing material powder, 3 parts by weight of graphite as an electrical conductor and 3 parts by weight of polyvinylidene fluoride as a binder were dispersed in N-methyl-2-pyrrolidone as a solvent to form a mixture, and the mixture was uniformly applied to the anode current collector 52A made of copper foil with a thickness of 15 μm, and was dried so as to form the anode active material layer 52B with a thickness of 70 μm. At that time, the filling amounts of the cathode active material and the anode active material were adjusted so that the open circuit voltage at the time of full charge became 4.20 V, and the precipitation of lithium metal on the anode 52 during charge was prevented, thereby the capacity of anode 52 was represented by a capacity component by insertion and extraction of lithium.

Figure 6:
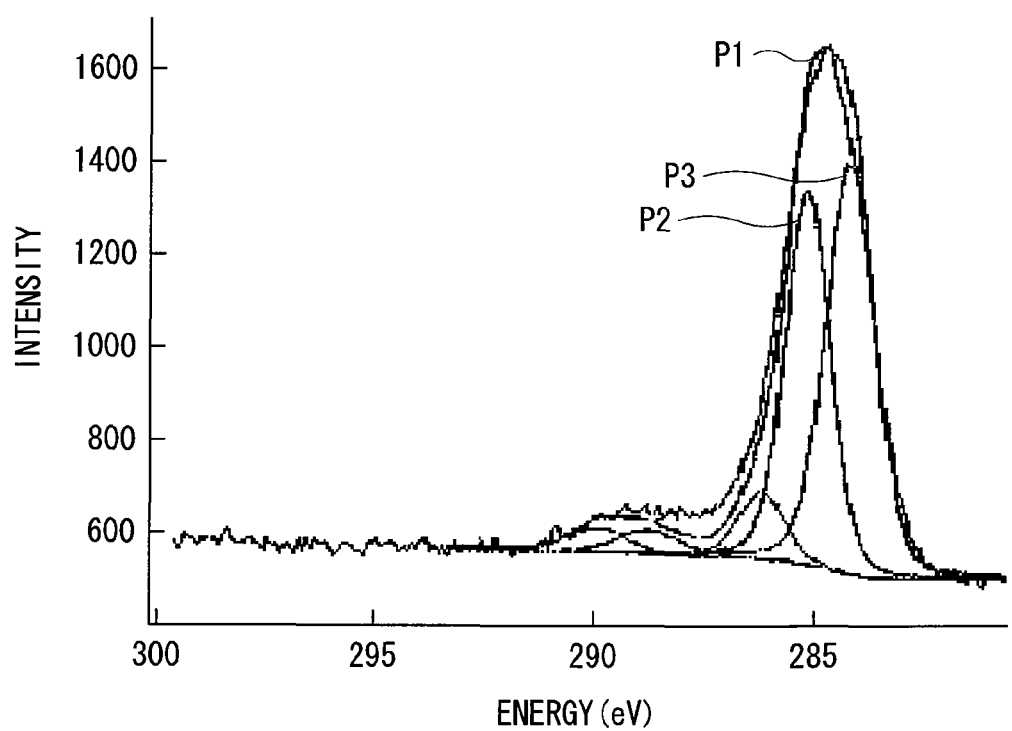
FIG. 6 is an illustration showing an example of peaks obtained by X-ray photoelectron spectroscopy relating to a CoSnC-containing material formed in an example.

The CoSnC-containing material powder was synthesized through mixing tin-cobalt-indium-titanium alloy powder and carbon powder, and inducing a mechanochemical reaction between them. When the composition of the obtained CoSnC-containing material was analyzed, the tin content was 48.0 wt %, the cobalt content was 23.0 wt %, and the indium content was 5.0 wt %, the titanium content was 2.0 wt %, the carbon content was 20.0 wt %, and the ratio of cobalt to the total of tin and cobalt Co/(Sn+Co) was 32 wt %. The carbon content was measured by a carbon/sulfur analyzer, and the contents of tin, cobalt indium and titanium were measured by ICP (Inductively Coupled Plasma) emission spectrometry. Moreover, when X-ray diffraction was performed on the obtained CoSnC-containing material, a diffraction peak having a broad half-width in which the diffraction angle 2θ was 1.0° or more was observed within a range of the diffraction angle 2θ=20° to 50°. Further, when the XPS measurement was performed on the obtained CoSnC-containing material, the peak P1 shown in FIG. 6 was obtained. When the peak P1 was analyzed, a peak P2 of surface contamination carbon and a peak P3 of C1s in the CoSnC-containing material on a lower energy side than the peak P2 were obtained. The peak P3 was obtained in a region lower than 284.5 eV. In other words, it was confirmed that carbon included in the CoSnC-containing material was bonded to another element.

As Comparative Examples 2-1 through 2-3 and 3-1 through 3-3 relative to these examples, secondary batteries were formed as in the case of Examples 2-1 through 2-5 and 3-1 through 3-5, except that the cyclic imide salt was not added, more specifically the same electrolytic solutions as those used in Comparative Examples 1-1 through 1-3 were used.

The discharge capacity retention ratios in the 50th cycle of the obtained secondary batteries of Examples 2-1 through 2-5 and 3-1 through 3-5 and Comparative Examples 2-1 through 2-3 and 3-3 were determined as in the case of Examples 1-1 through 1-5. At that time, the secondary batteries were charged under condition that a maximum voltage was 4.2 V. The results are shown in Tables 2 and 3. Numbers separated by slashes in parentheses in the anode active material section indicate the contents of elements (wt %) in the order in which the elements appear.

TABLE 2

Battery shape: coin type
Maximum charging voltage: 4.20 V

| | ANODE ACTIVE MATERIAL | SOLVENT | CYCLIC IMIDE SALT | DISCHARGE CAPACITY RETENTION RATIO (%) |
|---|---|---|---|---|
| EXAMPLE 2-1 | Sn | EC + DMC | 1,1,2,2,3,3-hexafluoropropane-1,3-disulfonimide lithium | 72.2 |
| EXAMPLE 2-2 | | CIEC + DMC | 1,1,2,2,3,3-hexafluoropropane-1,3-disulfonimide lithium | 81.5 |
| EXAMPLE 2-3 | | FEC + DMC | 1,1,2,2,3,3-hexafluoropropane-1,3-disulfonimide lithium | 90.1 |
| EXAMPLE 2-4 | | | 2,2,3,3,4,4-hexafluoroglutarimide lithium | 90.9 |
| EXAMPLE 2-5 | | | lithium ortho-sulphobenzimide | 89.5 |
| COMPARATIVE EXAMPLE 2-1 | Sn | EC + DMC | NOT INCLUDED | 53.3 |
| COMPARATIVE EXAMPLE 2-2 | | CIEC + DMC | | 69.8 |
| COMPARATIVE EXAMPLE 2-3 | | FEC + DMC | | 77.1 |

EC: ethylene carbonate
DMC: dimethyl carbonate,
CIEC: 4-chloro-1,3-dioxolane-2-one
FEC: 4-fluoro-1,3-dioxolane-2-one

TABLE 3

Battery shape: coin type
Maximum charging voltage: 4.20 V

| | ANODE ACTIVE MATERIAL (WT %) | SOLVENT | CYCLIC IMIDE SALT | DISCHARGE CAPACITY RETENTION RATIO (%) |
|---|---|---|---|---|
| EXAMPLE 3-1 | Sn—Co—In—Ti—C (48/23/5/2/20) | EC + DMC | 1,1,2,2,3,3-hexafluoropropane-1,3-disulfonimide lithium | 77.8 |
| EXAMPLE 3-2 | | CIEC + DMC | 1,1,2,2,3,3-hexafluoropropane-1,3-disulfonimide lithium | 85.7 |
| EXAMPLE 3-3 | | FEC + DMC | 1,1,2,2,3,3-hexafluoropropane-1,3-disulfonimide lithium | 94.7 |
| EXAMPLE 3-4 | | | 2,2,3,3,4,4-hexafluoroglutarimide lithium | 95.5 |
| EXAMPLE 3-5 | | | lithium ortho-sulphobenzimide | 94.1 |
| COMPARATIVE EXAMPLE 3-1 | Sn—Co—In—Ti—C (48/23/5/2/20) | EC + DMC | NOT INCLUDED | 57.5 |
| COMPARATIVE EXAMPLE 3-2 | | CIEC + DMC | | 71.9 |
| COMPARATIVE EXAMPLE 3-3 | | FEC + DMC | | 79.5 |

EC: ethylene carbonate
DMC: dimethyl carbonate,
CIEC: 4-chloro-1,3-dioxolane-2-one
FEC: 4-fluoro-1,3-dioxolane-2-one It was obvious from Tables 2 and 3 that as in the case of Examples 1-1 through 1-5, in Examples 2-1 and 3-1, Examples 2-2 and 3-2, Examples 2-3 through 2-5 and 3-3 through 3-5 in which the cyclic imide salt was used, a higher discharge capacity retention ratio was obtained, compared to Comparative Examples 2-1 and 3-1, Comparative Examples 2-2 and 3-2 and Comparative Examples 2-3 and 3-3 in which the cyclic imide salt was not used. Moreover, in Examples 2-2 through 2-5 and 3-2 through 3-5 in which 4-chloro-1,3-dioxolane-2-one or 4-fluoro-1,3-dioxolane-2-one was used, more specifically in Examples 2-3 through 2-5 and 3-3 through 3-5 in which 4-fluoro-1,3-dioxolane-2-one was used, a high effect was observed.

In other words, it was found out that even in the case where another anode active material was used, when the cyclic imide salt was included in the electrolytic solution, the cycle characteristics could be improved, and the cyclic carbonate derivative having a halogen atom was more preferably included.

Examples 4-1 to 4-4

Coin type lithium-ion secondary batteries were formed as in the case of Example 1-1, except that graphite was used as an anode active material, and 97 parts by weight of graphite and 3 parts by weight polyvinylidene fluoride as a binder were mixed to form a mixture, and N-methyl-2-pyrrolidone was added to the mixture, and the mixture was uniformly applied to the anode current collector 52A made of copper foil with a thickness of 15 μm, and was dried so as to form the anode active material layer 52B with a thickness of 70 μm. At that time, the cathode active material was lithium-manganese-cobalt-nickel complex oxide (LiMn$_{0.3}$Co$_{0.2}$Ni$_{0.5}$O$_2$). Moreover, the filling amounts of the cathode active material and the anode active material were adjusted so that the open circuit voltage at the time of full charge became 4.60 V in Example 4-1, 4.50 V in Example 4-2, 4.35 V in Example 4-3 and 4.25 V in Example 4-4. Further, the precipitation of lithium metal on the anode 52 during charge was prevented so that the capacity of the anode 22 was represented by a capacity component by insertion and extraction of lithium.

As Comparative Examples 4-1 through 4-4 relative to Examples 4-1 through 4-4, secondary batteries were formed as in the case of Examples 4-1 through 4-4, except that the cyclic imide salt was not added. The open circuit voltage at the time of full charge was 4.60 V in Comparative Example 4-1, 4.50 V in Comparative Example 4-2, 4.35 V in Comparative Example 4-3 and 4.25 V in Comparative Example 4-4.

Moreover, as Comparative Examples 4-5 and 4-6, secondary batteries were formed as in the case of Examples 4-1 through 4-4, except that the filling amounts of the cathode active material and the anode active material were adjusted so that the open circuit voltage at the time of full charge became 4.20 V. At that time, in Comparative Example 4-6, the cyclic imide salt was added to the electrolytic solution, and in Comparative Example 4-5, the cyclic imide salt was not added.

The discharge capacity retention ratios in the 50th cycle of the obtained secondary batteries of Examples 4-1 through 4-4 and Comparative Examples 4-1 through 4-6 were determined as in the case of Examples 1-1 through 1-5. At that time, the secondary batteries were charged under condition that the maximum charging voltage was 4.60 V in Example 4-1 and Comparative Example 4-1, 4.50 V in Example 4-2 and Comparative Example 4-2, 4.35 V in Example 4-3 and Comparative Example 4-3, 4.25 V in Example 4-4 and Comparative Example 4-4 and 4.20 V in Comparative Examples 4-5 and 4-6. The results are shown in Table 4 and FIG. 7.

TABLE 4

Battery shape: coin type

| | ANODE ACTIVE MATERIAL | MAXIMUM CHARGING VOLTAGE (V) | SOLVENT | CYCLIC IMIDE SALT | DISCHARGE CAPACITY RETENTION RATIO (%) |
|---|---|---|---|---|---|
| EXAMPLE 4-1 | GRAPHITE | 4.60 | EC + DMC | 1,1,2,2,3,3-hexafluoropropane-1,3-disulfonimide lithium | 81.8 |
| EXAMPLE 4-2 | | 4.50 | | | 92.8 |
| EXAMPLE 4-3 | | 4.35 | | | 95.4 |
| EXAMPLE 4-4 | | 4.25 | | | 97.0 |
| COMPARATIVE EXAMPLE 4-1 | GRAPHITE | 4.60 | EC + DMC | NOT INCLUDED | 77.8 |
| COMPARATIVE EXAMPLE 4-2 | | 4.50 | | | 88.2 |
| COMPARATIVE EXAMPLE 4-3 | | 4.35 | | | 93.3 |
| COMPARATIVE EXAMPLE 4-4 | | 4.25 | | | 96.6 |
| COMPARATIVE EXAMPLE 4-5 | | 4.20 | | | 97.3 |
| COMPARATIVE EXAMPLE 4-6 | | 4.20 | | 1,1,2,2,3,3-hexafluoropropane-1,3-disulfonimide lithium | 97.5 |

EC: ethylene carbonate
DMC: dimethyl carbonate

Figure 7:
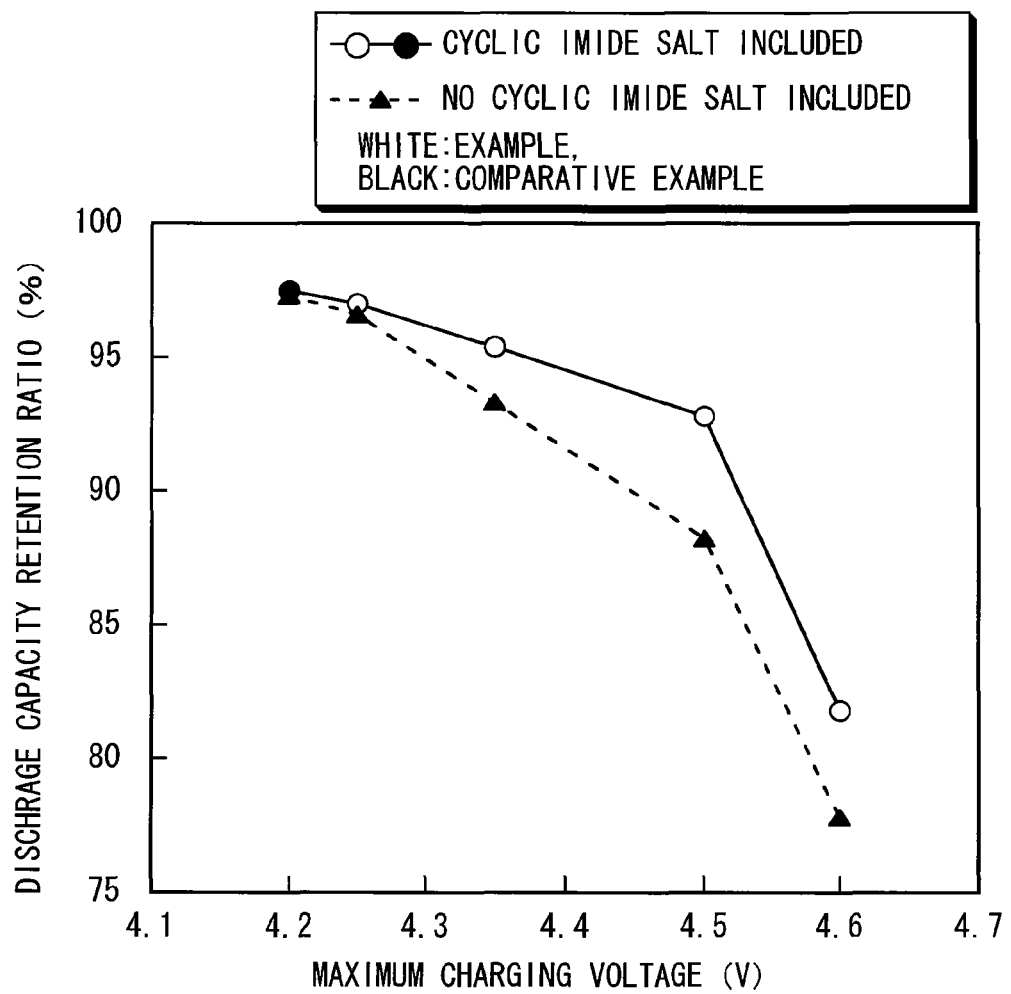
FIG. 7 is a plot showing a relationship between a maximum charging voltage and a discharge capacity retention ratio.

It was obvious from Table 4 and FIG. 7 that in Examples 4-1 through 4-4 in which the cyclic imide salt was included in the electrolytic solution, a higher discharge capacity retention ratio was obtained, compared to Comparative Examples 4-1 through 4-4 in which the cyclic imide salt was not included. Moreover, in Comparative Examples 4-5 and 4-6, the effect of adding the cyclic imide salt was low; however, in Examples 4-1 through 4-4 in which the charging voltage was 4.25 V or more, a high effect was obtained.

In other words, it was found out that even in the case where the open circuit voltage at the time of full charge was high, when the cyclic imide salt was included in the electrolytic solution, the cycle characteristics could be improved.

Examples 5-1 to 5-4

Coin type lithium-ion secondary batteries were formed as in the case of Examples 1-2 through 1-5, except that graphite was used as an anode active material, and 97 parts by weight of graphite and 3 parts by weight of polyvinylidene fluoride as a binder were mixed to form a mixture, and N-methyl-2-pyrrolidone was added to the mixture, and the mixture was uniformly applied to the anode current collector 52A made of copper foil with a thickness of 15 μm, and was dried to form the anode active material layer 52B with a thickness of 70 μm. At that time, the cathode active material was lithium-manganese-cobalt-nickel complex oxide (LiMn$_{0.3}$Co$_{0.2}$Ni$_{0.5}$O$_2$). Moreover, the filling amounts of the cathode active material and the anode active material were adjusted so that the open circuit voltage at the time of full charge became 4.50 V. Further, the precipitation of lithium metal on the anode 52 during charge was prevented so that the capacity of the anode 22 was represented by a capacity component by insertion and extraction of lithium.

As comparative Examples 5-1 and 5-2 relative to Examples 5-1 through 5-4, secondary batteries were formed as in the case of Examples 5-1 through 5-4, except that the cyclic imide salt was not added, that is, the same electrolytic solutions as those used in Comparative Examples 1-2 and 1-3 were used.

The discharge capacity retention ratios in the 50th cycle of the obtained secondary batteries of Examples 5-1 through 5-4 and Comparative Examples 5-1 and 5-2 were determined as in the case of Examples 1-1 through 1-5. At that time, the secondary batteries were charged under condition that the maximum charging voltage was 4.50 V. The results are shown in Table 5 together with the results of Example 4-2 and Comparative Example 4-2.

was used, and more specifically, in Examples 5-2 through 5-4 in which 4-fluoro-1,3-dioxolane-2-one was used, a high effect was observed.

In other words, it was found out that even in the case where the open circuit voltage at the time of full charge was high, the cyclic carbonate derivative having a halogen atom was preferably included in addition to the cyclic imide salt.

Examples 6-1, 6-2, 7-1, 7-2, 8-1, 8-2, 9-1, 9-2

Secondary batteries were formed as in the case of Examples 1-3, 2-3, 3-3 and 4-2, except that the content of 1,1,2,2,3,3-hexafluoropropane-1,3-disulfonimide lithium in the electrolytic solution was 10 wt % or 0.1 wt %.

TABLE 5

Battery shape: coin type
Maximum charging voltage: 4.50 V

| | ANODE ACTIVE MATERIAL | SOLVENT | CYCLIC IMIDE SALT | DISCHARGE CAPACITY RETENTION RATIO (%) |
|---|---|---|---|---|
| EXAMPLE 4-2 | GRAPHITE | EC + DMC | 1,1,2,2,3,3-hexafluoropropane-1,3-disulfonimide lithium | 92.8 |
| EXAMPLE 5-1 | | CIEC + DMC | 1,1,2,2,3,3-hexafluoropropane-1,3-disulfonimide lithium | 93.2 |
| EXAMPLE 5-2 | | FEC + DMC | 1,1,2,2,3,3-hexafluoropropane-1,3-disulfonimide lithium | 97.1 |
| EXAMPLE 5-3 | | | 2,2,3,3,4,4-hexafluoroglutarimide lithium | 97.9 |
| EXAMPLE 5-4 | | | lithium ortho-sulphobenzimide | 96.1 |
| COMPARATIVE EXAMPLE 4-2 | GRAPHITE | EC + DMC | NOT INCLUDED | 88.2 |
| COMPARATIVE EXAMPLE 5-1 | | CIEC + DMC | | 90.5 |
| COMPARATIVE EXAMPLE 5-2 | | FEC + DMC | | 92.3 |

EC: ethylene carbonate
DMC: dimethyl carbonate,
CIEC: 4-chloro-1,3-dioxolane-2-one
FEC: 4-fluoro-1,3-dioxolane-2-one It was obvious from Table 5 that in Examples 5-1 and 5-2 through 5-4 in which the cyclic imide salt was used, a higher discharge capacity retention ratio was obtained, compared to Examples 5-1 and 5-2 in which the cyclic imide salt was not used. Moreover, in Examples 5-1 through 5-4 in which 4-chloro-1,3-dioxolane-2-one or 4-fluoro-1,3-dioxolane-2-one was used, a higher discharge capacity retention ratio was obtained, compared to Example 4-2 in which neither of them The discharge capacity retention ratios in the 50th cycle of the secondary batteries were determined as in the case of Examples 1-1 through 1-5. At that time, the secondary batteries were charged under condition that the maximum charging voltage was 4.50 V in Examples 9-1 and 9-2, and 4.20 V in other examples. The results are shown in Tables 6 through 9 together with the results of Comparative Examples 1-3, 2-3, 3-3 and 4-2.

TABLE 6

Battery shape: coin type
Maximum charging voltage: 4.20 V

| | ANODE ACTIVE MATERIAL | SOLVENT | CYCLIC IMIDE SALT KIND | CONTENT (WT %) | DISCHARGE CAPACITY RETENTION RATIO (%) |
|---|---|---|---|---|---|
| EXAMPLE 6-1 | Si | FEC + DMC | 1,1,2,2,3,3-hexafluoropropane-1,3-disulfonimide lithium | 10 | 76.3 |
| EXAMPLE 1-3 | | | | 1.0 | 87.8 |
| EXAMPLE 6-2 | | | | 0.1 | 75.9 |
| COMPARATIVE EXAMPLE 1-3 | Si | FEC + DMC | NOT INCLUDED | 0 | 75.6 |

DMC: dimethyl carbonate
FEC: 4-fluoro-1,3-dioxolane-2-one

TABLE 7

Battery shape: coin type
Maximum charging voltage: 4.20 V

| | ANODE | | CYCLIC IMIDE SALT | | DISCHARGE CAPACITY |
| --- | --- | --- | --- | --- | --- |
| | ACTIVE MATERIAL | SOLVENT | KIND | CONTENT (WT %) | RETENTION RATIO (%) |
| EXAMPLE 7-1 | Sn | FEC + DMC | 1,1,2,2,3,3-hexafluoropropane-1,3-disulfonimide lithium | 10 | 77.8 |
| EXAMPLE 2-3 | | | | 1.0 | 90.1 |
| EXAMPLE 7-2 | | | | 0.1 | 77.2 |
| COMPARATIVE EXAMPLE 2-3 | Sn | FEC + DMC | NOT INCLUDED | 0 | 77.1 |

DMC: dimethyl carbonate
FEC: 4-fluoro-1,3-dioxolane-2-one

TABLE 8

Battery shape: coin type
Maximum charging voltage: 4.20 V

| | ANODE | | CYCLIC IMIDE SALT | | DISCHARGE CAPACITY |
| --- | --- | --- | --- | --- | --- |
| | ACTIVE MATERIAL | SOLVENT | KIND | CONTENT (WT %) | RETENTION RATIO (%) |
| EXAMPLE 8-1 | Sn—Co—In—Ti—C (48/23/5/2/20) | FEC + DMC | 1,1,2,2,3,3-hexafluoropropane-1,3-disulfonimide lithium | 10 | 80.2 |
| EXAMPLE 3-3 | | | | 1.0 | 94.7 |
| EXAMPLE 8-2 | | | | 0.1 | 79.8 |
| COMPARATIVE EXAMPLE 3-3 | Sn—Co—In—Ti—C (48/23/5/2/20) | FEC + DMC | NOT INCLUDED | 0 | 79.5 |

DMC: dimethyl carbonate
FEC: 4-fluoro-1,3-dioxolane-2-one

TABLE 9

Battery shape: coin type
Maximum charging voltage: 4.50 V

| | ANODE | | CYCLIC IMIDE SALT | | DISCHARGE CAPACITY |
| --- | --- | --- | --- | --- | --- |
| | ACTIVE MATERIAL | SOLVENT | KIND | CONTENT (WT %) | RETENTION RATIO (%) |
| EXAMPLE 9-1 | GRAPHITE | EC + DMC | 1,1,2,2,3,3-hexafluoropropane-1,3-disulfonimide lithium | 10 | 89.1 |
| EXAMPLE 4-2 | | | | 1.0 | 92.8 |
| EXAMPLE 9-2 | | | | 0.1 | 88.7 |
| COMPARATIVE EXAMPLE 4-2 | GRAPHITE | EC + DMC | NOT INCLUDED | 0 | 88.2 |

EC: ethlene carbonate
DMC: dimethyl carbonate

It was obvious from Tables 6 through 9 that there was a tendency that as the content of 1,1,2,2,3,3-hexafluoropropane-1,3-disulfonimide lithium in the electrolytic solution increased, the discharge capacity retention ratio increased to a maximum value, then decreased.

In other words, it was found out that the content of the cyclic imide salt in the electrolytic solution was preferably within a range from 0.1 wt % to 10 wt % inclusive.

Examples 10-1 to 10-8, 11-1 to 11-8

As Examples 10-1 through 10-4, secondary batteries were formed as in the case of Example 1-1, except that in addition to ethylene carbonate and dimethyl carbonate, 1,3-dioxol-2-one (VC) shown in Chemical Formula 3(1), 4-vinyl-1,3-dioxolane-2-one (VEC) shown in Chemical Formula 3(2), 1,3-propane sultone (PS) shown in Chemical Formula 4(1) or 1,3-propene sultone (PRS) shown in Chemical Formula 4(2) was used as a solvent. The specific composition of the solvent was ethylene carbonate:dimethyl carbonate:1,3-dioxol-2-one=40:42:2 (weight ratio) in Example 10-1, ethylene carbonate:dimethyl carbonate:4-vinyl-1,3-dioxolane-2-one=40:42:2 (weight ratio) in Example 10-2, ethylene carbonate:dimethyl carbonate:1,3-propane sultone=40:42:2 (weight ratio) in Example 10-3 and ethylene carbonate:dimethyl carbonate:1,3-propene sultone=40:42:2 (weight ratio) in Example 10-4.

As examples 10-5 through 10-8, secondary batteries were formed as in the case of Example 1-3, except that in addition to 4-fluoro-1,3-dioxolane-2-one and dimethyl carbonate, 1,3-dioxol-2-one, 4-vinyl-1,3-dioxolane-2-one, 1,3-propane sultone or 1,3-propene sultone was used as a solvent. The specific composition of the solvent was 4-fluoro-1,3-dioxolane-2-one:dimethyl carbonate:1,3-dioxol-2-one=41:42:1 (weight ratio) in Example 10-5, 4-fluoro-1,3-dioxolane-2-one:dimethyl carbonate:4-vinyl-1,3-dioxolane-2-one=41:42:1 (weight ratio) in Example 10-6, 4-fluoro-1,3-dioxolane-2-one:dimethyl carbonate:1,3-propane sultone=41:42:1 (weight ratio) in Example 10-7, and 4-fluoro-1,3-dioxolane-2-one:dimethyl carbonate:1,3-propene sultone=41:42:1 (weight ratio) in Example 10-8.

As Examples 11-1 through 11-4, secondary batteries were formed as in the case of Example 3-1, except that in addition to ethylene carbonate and dimethyl carbonate, 1,3-dioxol-2-one, 4-vinyl-1,3-dioxolane-2-one, 1,3-propane sultone or 1,3-propene sultone was used as a solvent. The specific composition of the solvent was ethylene carbonate:dimethyl carbonate:1,3-dioxol-2-one=40:42:2 (weight ratio) in Example 11-1, ethylene carbonate:dimethyl carbonate:4-vinyl-1,3-dioxolane-2-one=40:42:2 (weight ratio) in Example 11-2, ethylene carbonate:dimethyl carbonate:1,3-propane sultone=40:42:2 (weight ratio) in Example 11-3, and ethylene carbonate:dimethyl carbonate:1,3-propene sultone=40:42:2 (weight ratio) in Example 11-4.

As Examples 11-5 through 11-8, secondary batteries were formed as in the case of Example 3-3, except that in addition to the 4-fluoro-1,3-dioxolane-2-one and dimethyl carbonate, 1,3-dioxol-2-one, 4-vinyl-1,3-dioxolane-2-one, 1,3-propane sultone or 1,3-propene sultone was used as a solvent. The specific composition of the solvent was 4-fluoro-1,3-dioxolane-2-one:dimethyl carbonate:1,3-dioxol-2-one=41:42:1 (weight ratio) in Example 11-5, 4-fluoro-1,3-dioxolane-2-one:dimethyl carbonate:4-vinyl-1,3-dioxolane-2-one=41:42:1 (weight ratio) in Example 11-6, 4-fluoro-1,3-dioxolane-2-one:dimethyl carbonate:1,3-propane sultone=41:42:1 (weight ratio) in Example 11-7, and 4-fluoro-1,3-dioxolane-2-one:dimethyl carbonate:1,3-propene sultone=41:42:1 (weight ratio) in Example 11-8.

As Comparative Examples 10-1 through 10-8, and 11-1 through 11-8 relative to Examples 10-1 through 10-8 and 11-1 through 11-8, secondary batteries were formed as in the case of Examples 10-1 through 10-8 and 11-1 through 11-8, except that the cyclic imide salt was not added.

The discharge capacity retention ratios in the 50th cycle of the obtained secondary batteries were determined as in the case of Examples 1-1 through 1-5. At that time, the secondary batteries were charged under condition that the maximum charging voltage was 4.20 V. The results are shown in Tables 10 and 11 together with the results of Examples 1-1, 1-3, 3-1 and 3-3 and Comparative Examples 1-1, 1-3, 3-1 and 3-3.

TABLE 10

Battery shape: coin type
Maximum charging voltage: 4.20 V

| | ANODE ACTIVE MATERIAL | SOLVENT | CYCLIC IMIDE SALT | DISCHARGE CAPACITY RETENTION RATIO (%) |
|---|---|---|---|---|
| EXAMPLE 1-1 | Si | EC + DMC | 1,1,2,2,3,3-hexafluoropropane-1,3-disulfonimide lithium | 60.5 |
| EXAMPLE 10-1 | | EC + DMC + VC | | 67.2 |
| EXAMPLE 10-2 | | EC + DMC + VEC | | 67.8 |
| EXAMPLE 10-3 | | EC + DMC + PS | | 63.2 |
| EXAMPLE 10-4 | | EC + DMC + PRS | | 65.3 |
| EXAMPLE 1-3 | Si | FEC + DMC | 1,1,2,2,3,3-hexafluoropropane-1,3-disulfonimide lithium | 87.8 |
| EXAMPLE 10-5 | | FEC + DMC + VC | | 90.1 |
| EXAMPLE 10-6 | | FEC + DMC + VEC | | 90.3 |
| EXAMPLE 10-7 | | FEC + DMC + PS | | 88.7 |
| EXAMPLE 10-8 | | FEC + DMC + PRS | | 89.1 |
| COMPARATIVE EXAMPLE 1-1 | Si | EC + DMC | NOT INCLUDED | 47.0 |
| COMPARATIVE EXAMPLE 10-1 | | EC + DMC + VC | | 48.0 |
| COMPARATIVE EXAMPLE 10-2 | | EC + DMC + VEC | | 48.8 |
| COMPARATIVE EXAMPLE 10-3 | | EC + DMC + PS | | 47.6 |
| COMPARATIVE EXAMPLE 10-4 | | EC + DMC + PRS | | 47.9 |
| COMPARATIVE EXAMPLE 1-3 | Si | FEC + DMC | NOT INCLUDED | 75.6 |
| COMPARATIVE EXAMPLE 10-5 | | FEC + DMC + VC | | 76.6 |
| COMPARATIVE EXAMPLE 10-6 | | FEC + DMC + VEC | | 76.9 |
| COMPARATIVE EXAMPLE 10-7 | | FEC + DMC + PS | | 75.9 |
| COMPARATIVE EXAMPLE 10-8 | | FEC + DMC + PRS | | 76.4 |

EC: ethylene carbonate
DMC: dimethyl carbonate
FEC: 4-fluoro-1,3-dioxolane-2-one
VC: 1,3-dioxol-2-one
VEC: 4-vinyl-1,3-dioxolane-2-one
PS: 1,3-propane sultone
PRS: 1,3-propene sultone

TABLE 11

Battery shape: coin type
Maximum charging voltage: 4.20 V

| | ANODE ACTIVE MATERIAL (WT %) | SOLVENT | CYCLIC IMIDE SALT | DISCHARGE CAPACITY RETENTION RATIO (%) |
|---|---|---|---|---|
| EXAMPLE 3-1 | Sn—Co—In—Ti—C (48/23/5/2/20) | EC + DMC | 1,1,2,2,3,3-hexafluoropropane-1,3-disulfonimide lithium | 77.8 |
| EXAMPLE 11-1 | | EC + DMC + VC | | 79.8 |
| EXAMPLE 11-2 | | EC + DMC + VEC | | 80.0 |
| EXAMPLE 11-3 | | EC + DMC + PS | | 78.0 |
| EXAMPLE 11-4 | | EC + DMC + PRS | | 78.3 |
| EXAMPLE 3-3 | Sn—Co—In—Ti—C (48/23/5/2/20) | EC + DMC | 1,1,2,2,3,3-hexafluoropropane-1,3-disulfonimide lithium | 94.7 |
| EXAMPLE 11-5 | | EC + DMC + VC | | 96.0 |
| EXAMPLE 11-6 | | EC + DMC + VEC | | 96.1 |
| EXAMPLE 11-7 | | EC + DMC + PS | | 95.2 |
| EXAMPLE 11-8 | | EC + DMC + PRS | | 95.7 |
| COMPARATIVE EXAMPLE 3-1 | Sn—Co—In—Ti—C (48/23/5/2/20) | EC + DMC | NOT INCLUDED | 57.5 |
| COMPARATIVE EXAMPLE 11-1 | | EC + DMC + VC | | 59.6 |
| COMPARATIVE EXAMPLE 11-2 | | EC + DMC + VEC | | 60.0 |
| COMPARATIVE EXAMPLE 11-3 | | EC + DMC + PS | | 58.0 |
| COMPARATIVE EXAMPLE 11-4 | | EC + DMC + PRS | | 58.4 |
| COMPARATIVE EXAMPLE 3-3 | Sn—Co—In—Ti—C (48/23/5/2/20) | FEC + DMC | NOT INCLUDED | 79.5 |
| COMPARATIVE EXAMPLE 11-5 | | FEC + DMC + VC | | 83.0 |
| COMPARATIVE EXAMPLE 11-6 | | FEC + DMC + VEC | | 83.7 |
| COMPARATIVE EXAMPLE 11-7 | | FEC + DMC + PS | | 80.0 |
| COMPARATIVE EXAMPLE 11-8 | | FEC + DMC + PRS | | 80.8 |

EC: ethylene carbonate
DMC: dimethyl carbonate
FEC: 4-fluoro-1,3-dioxolane-2-one
VC: 1,3-dioxol-2-one
VEC: 4-vinyl-1,3-dioxolane-2-one
PS: 1,3-propane sultone
PRS: 1,3-propene sultone It was obvious from Tables 10 and 11 that as in the case of Examples 1-1, 1-3, 3-1 and 3-3, in Examples 10-1 through 10-8 and 11-1 through 11-8 in which the cyclic imide salt was used, a higher capacity retention ratio was obtained, compared to Comaprative Examples 10-1 through 10-8 and 11-1 through 11-8 in which the cyclic imide salt was not used. Moreover, in Examples 10-1 through 10-4, 10-5 through 10-8, 11-1 through 11-4 and 11-5 through 11-8 in which 1,3-dioxol-2-one, 4-vinyl-1,3-dioxolane-2-one, 1,3-propane sultone or 1,3-propene sultone was used, a higher discharge capacity retention ratio was obtained, compared to Examples 1-1, 1-3, 3-1 and 3-3 in which they were not used.

In other words, it was found out that when a cyclic carbonate having an unsaturated bond or a sultone was used, the cycle characteristics could be further improved.

Examples 12-1-1 and 12-1-2 to 12-27-1 and 12-27-2

Cylindrical type secondary batteries as shown in FIGS. 1 and 2 were formed. At first, lithium carbonate ($Li_2CO_3$) and cobalt carbonate ($CoCO_3$) were mixed at a molar ratio of 0.5:1, and the mixture was fired in air at 890° C. for 5 hours to obtain lithium cobalt complex oxide ($LiCoO_2$). When the X-ray diffraction was conducted on the obtained lithium cobalt complex oxide, the diffraction pattern of the obtained $LiCoO_2$ closely matched a peak of $LiCoO_2$ listed in the JCPDS (Joint Committee of Powder Diffraction Standard) file. Next, the lithium cobalt complex oxide was pulverized into a powder form with an average particle diameter of 10 μm so as to form a cathode active material.

Next, 95 parts by weight of $CiCoO_2$ and 5 parts by weight of $Li_2CO_3$ were mixed to form a mixture, and 91 parts by weigth of the mixture, 6 parts by weight of artificial graphite (KS-15, Lonza) as an electrical conductor and 3 parts by weight of polyvinylidene fluoride were mixed to prepare a mixture, and then the mixture was dispersed in N-methyl-2-pyrrolidone as a solvent to form cathode mixture slurry. Next, after the cathode mixture slurry was uniformly applied to both sides of the cathode current collector 21A made of strip-shaped aluminum foil with a thickness of 20 μm, and was dried, the cathode mixture layer 21B was formed through compression molding so as to form the cathode 21. After that, the cathode lead 25 made of aluminum was attached to one end of the cathode current collector 21A.

An anode active material including tin as a first element was synthesized through the use of a mechanochemical reaction, and the composition of the anode active material was changed as shown in Tables 12 through 17 in Examples 12-1-1 and 12-1-2 through 12-27-1 and 12-27-2. More specifically, in Examples 12-1-1 and 12-1-2 through 12-21-1 and 12-21-2, a second element was changed to cobalt, iron, magnesium, titanium, vanadium, chromium, manganese, nickel, copper, zinc, gallium, zirconium, niobium, molybdenum, silver, indium, cerium, hafnium, tantalum, tungsten or bismuth, and a third element was carbon. In Examples 12-22-1 and 12-22-2 through 12-24-1 and 12-24-2, the second element was cobalt, and the third element was changed to boron, aluminum or phosphorus. In Examples 12-25-1 and 12-25-2 through 12-27-1 and 12-27-2, the second element was cobalt, and the third element was carbon, and another element was added in addition to them.

The compositions of the obtained anode active material powders were analyzed. The carbon content was measured by a carbon/sulfur analyzer, and the contents of other elements were measured by ICP emission spectrometry. The obtained results are shown in parantheses in the anode active material section of Tables 12 through 17. Numbers separated by slashes in parentheses indicate the contents of elements (wt %) in the order in which the elements appear.

After 80 parts by weight of the obtained anode active material power, 14 parts by weight of artificial graphite (KS-15, Lonza) and 1 part by weight of acetylene black as electrical conductors and 5 parts by weight of polyvinylidene fluoride as a binder were mixed to form a mixture, and the mixture was dispersed in N-methyl-2-pyrrolidone as a solvent to form anode mixture slurry, the anode mixture slurry was applied to the anode current collector 22A, and was dried to form the anode active material layer 22B, thereby the anode 22 was formed. At that time, the filling amounts of the cathode active material and the anode active material were adjusted so that the open circuit voltage at the time of full charge became 4.20 V, and the precipitation of lithium metal on the anode 22 during charge was prevented, thereby the capacity of the anode 22 was represented by a capacity component by insertion and extraction of lithium. Next, the anode lead 26 made of nickel was attached to one end of the anode current collector 22A.

After the cathode 21 and the anode 22 were formed, the separator 23 made of polyethylene with a thickness of 25 μm was prepared, and the anode 22, the separator 23, the cathode 21 and separator 23 were laminated in this order to form a laminate, and the laminate was spirally wound several times, and an outermost part of the spirally wound laminate was secured with an adhesive tape, thereby the spirally wound electrode body 20 was formed.

After the spirally wound electrode body 20 was formed, the spirally wound electrode body 20 was sandwiched between a pair of insulating plates 12 and 13, and the anode lead 26 was welded to the battery can 11, and the cathode lead 25 was welded to the safety valve mechanism 15, and then the spirally wound electrode body 20 was contained in the battery can 11 made of nickel-plated iron. After that, the electrolytic solution was injected into the battery can 11 by a decompression method, thereby cylindrical type secondary batteries with a diameter of 18 mm and a height of 65 mm were formed. As the electrolytic solution, a mixture including ethylene carbonate and dimethyl carbonate as solvents and $LiPF_6$ and 1,1,2,2,3,3-hexafluoropropane-1,3-disulfonimide lithium shown in Chemical Formula 6(1) which was a cyclic imide salt as electrolyte salts at a weight ratio of ethylene carbonate:dimethyl carbonate:$LiPF_6$:1,1,2,2,3,3 hexafluoropropane-1,3-disulfonimide lithium=40:37.4:7.6:15, or a mixture including 4-fluoro-1,3-dioxolane-2-one, ethylene carbonate and dimethyl carbonate as solvents and $LiPF_6$ and 1,1,2,2,3,3-hexafluoropropane-1,3-disulfonimide lithium which was a cyclic imide salt as electrolyte salts at a weight ratio of 4-fluoro-1,3-dioxolane-2-one:ethylene carbonate:dimethyl carbonate:$LiPF_6$:1,1,2,2,3,3-hexafluoropropane-1,3-disulfonimide lithium=20:20:37.4:7.6:15 was used.

As comparative examples relative to the examples, secondary batteries were formed as in the case of the examples, except that 1,1,2,2,3,3-hexafluoropropane-1,3-disulfonimide lithium was not used. More specifically, the compositions of the electrolytic solutions in the comparative examples were as shown in Tables 12 through 17.

The cycle characteristics at 25° C. and 50° C. of the obtained secondary batteries of the examples and the comparative examples were measured. The results are shown in Tables 12 through 17. As a charge-discharge cycle, at 25° C. or 50° C., the secondary batteries were charged at a constant current of 2500 mA and a constant voltage until reaching a maximum voltage of 4.2 V, and then the secondary batteries were discharged at a constant current of 2000 mA until reaching a final voltage of 2.6 V. The charge-discharge cycle was repeated 150 times, and the discharge capacity retention ratio (%) in the 150th cycle in the case where the discharge capacity in the first cycle was 100 was determined as the cycle characteristics.

TABLE 12

Battery shape: cylindrical type
Maximum charging voltage: 4.20 V

| ANODE ACTIVE MATERIAL (WT %) | COMPOSITION OF ELECTROLYTIC SOLUTION (WT %) | | | | DISCHARGE CAPACITY RETENTION RATIO (%) | |
|---|---|---|---|---|---|---|
| | FEC | EC | DMC | $LiPF_6$ | CHEMICAL FORMULA 6(1) | 25° C. | 50° C. |

| | ANODE ACTIVE MATERIAL (WT %) | FEC | EC | DMC | $LiPF_6$ | CHEMICAL FORMULA 6(1) | 25° C. | 50° C. |
|---|---|---|---|---|---|---|---|---|
| EXAMPLE 12-1-1 | Sn—Co—C | — | 40 | 37.4 | 7.6 | 15 | 61 | 55 |
| EXAMPLE 12-1-2 | (50/29.4/19.6) | 20 | 20 | 37.4 | 7.6 | 15 | 90 | 88 |
| COMPARATIVE EXAMPLE 12-1-1 | | — | 40 | 52.4 | 7.6 | — | 60 | 52 |
| COMPARATIVE EXAMPLE 12-1-2 | | 20 | 20 | 52.4 | 7.6 | — | 90 | 84 |
| EXAMPLE 12-2-1 | Sn—Fe—C | — | 40 | 37.4 | 7.6 | 15 | 58 | 54 |
| EXAMPLE 12-2-2 | (50/29.4/19.6) | 20 | 20 | 37.4 | 7.6 | 15 | 80 | 78 |
| COMPARATIVE EXAMPLE 12-2-1 | | — | 40 | 52.4 | 7.6 | — | 50 | 42 |
| COMPARATIVE EXAMPLE 12-2-2 | | 20 | 20 | 52.4 | 7.6 | — | 78 | 71 |
| EXAMPLE 12-3-1 | Sn—Mg—C | — | 40 | 37.4 | 7.6 | 15 | 52 | 47 |

TABLE 12-continued

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 12-3-2 | (50/29.4/19.6) | 20 | 20 | 37.4 | 7.6 | 15 | 82 | 79 |
| COMPARATIVE EXAMPLE 12-3-1 | | — | 40 | 52.4 | 7.6 | — | 51 | 43 |
| COMPARATIVE EXAMPLE 12-3-2 | | 20 | 20 | 52.4 | 7.6 | — | 80 | 74 |
| EXAMPLE 12-4-1 | Sn—Ti—C | — | 40 | 37.4 | 7.6 | 15 | 65 | 56 |
| EXAMPLE 12-4-2 | (50/29.4/19.6) | 20 | 20 | 37.4 | 7.6 | 15 | 90 | 87 |
| COMPARATIVE EXAMPLE 12-4-1 | | — | 40 | 52.4 | 7.6 | — | 60 | 52 |
| COMPARATIVE EXAMPLE 12-4-2 | | 20 | 20 | 52.4 | 7.6 | — | 90 | 84 |
| EXAMPLE 12-5-1 | Sn—V—C | — | 40 | 37.4 | 7.6 | 15 | 54 | 46 |
| EXAMPLE 12-5-2 | (50/29.4/19.6) | 20 | 20 | 37.4 | 7.6 | 15 | 79 | 75 |
| COMPARATIVE EXAMPLE 12-5-1 | | — | 40 | 52.4 | 7.6 | — | 50 | 42 |
| COMPARATIVE EXAMPLE 12-5-2 | | 20 | 20 | 52.4 | 7.6 | — | 78 | 72 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium

TABLE 13

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 12-6-1 | Sn—Cr—C | — | 40 | 37.4 | 7.6 | 15 | 56 | 46 |
| EXAMPLE 12-6-2 | (50/29.4/19.6) | 20 | 20 | 37.4 | 7.6 | 15 | 80 | 78 |
| COMPARATIVE EXAMPLE 12-6-1 | | — | 40 | 52.4 | 7.6 | — | 52 | 44 |
| COMPARATIVE EXAMPLE 12-6-2 | | 20 | 20 | 52.4 | 7.6 | — | 78 | 71 |
| EXAMPLE 12-7-1 | Sn—Mn—C | — | 40 | 37.4 | 7.6 | 15 | 51 | 47 |
| EXAMPLE 12-7-2 | (50/29.4/19.6) | 20 | 20 | 37.4 | 7.6 | 15 | 76 | 74 |
| COMPARATIVE EXAMPLE 12-7-1 | | — | 40 | 52.4 | 7.6 | — | 49 | 42 |
| COMPARATIVE EXAMPLE 12-7-2 | | 20 | 20 | 52.4 | 7.6 | — | 75 | 69 |
| EXAMPLE 12-8-1 | Sn—Ni—C | — | 40 | 37.4 | 7.6 | 15 | 54 | 46 |
| EXAMPLE 12-8-2 | (50/29.4/19.6) | 20 | 20 | 37.4 | 7.6 | 15 | 80 | 77 |
| COMPARATIVE EXAMPLE 12-8-1 | | — | 40 | 52.4 | 7.6 | — | 52 | 43 |
| COMPARATIVE EXAMPLE 12-8-2 | | 20 | 20 | 52.4 | 7.6 | — | 79 | 73 |
| EXAMPLE 12-9-1 | Sn—Cu—C | — | 40 | 37.4 | 7.6 | 15 | 56 | 49 |
| EXAMPLE 12-9-2 | (50/29.4/19.6) | 20 | 20 | 37.4 | 7.6 | 15 | 85 | 81 |
| COMPARATIVE EXAMPLE 12-9-1 | | — | 40 | 52.4 | 7.6 | — | 54 | 46 |
| COMPARATIVE EXAMPLE 12-9-2 | | 20 | 20 | 52.4 | 7.6 | — | 84 | 78 |
| EXAMPLE 12-10-1 | Sn—Zn—C | — | 40 | 37.4 | 7.6 | 15 | 53 | 49 |
| EXAMPLE 12-10-2 | (50/29.4/19.6) | 20 | 20 | 37.4 | 7.6 | 15 | 78 | 75 |

TABLE 13-continued

Battery shape: cylindrical type
Maximum charging voltage: 4.20 V

| ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|
| | FEC | EC | DMC | LiPF$_6$ | CHEMICAL FORMULA 6(1) | 25° C. | 50° C. |
| COMPARATIVE EXAMPLE 12-10-1 | — | 40 | 52.4 | 7.6 | — | 51 | 43 |
| COMPARATIVE EXAMPLE 12-10-2 | 20 | 20 | 52.4 | 7.6 | — | 77 | 71 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium

TABLE 14

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 12-11-1 | Sn—Ga—C | — | 40 | 37.4 | 7.6 | 15 | 52 | 48 |
| EXAMPLE 12-11-2 | (50/29.4/19.6) | 20 | 20 | 37.4 | 7.6 | 15 | 78 | 74 |
| COMPARATIVE EXAMPLE 12-11-1 | | — | 40 | 52.4 | 7.6 | — | 50 | 42 |
| COMPARATIVE EXAMPLE 12-11-2 | | 20 | 20 | 52.4 | 7.6 | — | 77 | 71 |
| EXAMPLE 12-12-1 | Sn—Zr—C | — | 40 | 37.4 | 7.6 | 15 | 53 | 48 |
| EXAMPLE 12-12-2 | (50/29.4/19.6) | 20 | 20 | 37.4 | 7.6 | 15 | 80 | 78 |
| COMPARATIVE EXAMPLE 12-12-1 | | — | 40 | 52.4 | 7.6 | — | 52 | 43 |
| COMPARATIVE EXAMPLE 12-12-2 | | 20 | 20 | 52.4 | 7.6 | — | 78 | 72 |
| EXAMPLE 12-13-1 | Sn—Nb—C | — | 40 | 37.4 | 7.6 | 15 | 54 | 49 |
| EXAMPLE 12-13-2 | (50/29.4/19.6) | 20 | 20 | 37.4 | 7.6 | 15 | 80 | 78 |
| COMPARATIVE EXAMPLE 12-13-1 | | — | 40 | 52.4 | 7.6 | — | 52 | 44 |
| COMPARATIVE EXAMPLE 12-13-2 | | 20 | 20 | 52.4 | 7.6 | — | 78 | 71 |
| EXAMPLE 12-14-1 | Sn—Mo—C | — | 40 | 37.4 | 7.6 | 15 | 53 | 48 |
| EXAMPLE 12-14-2 | (50/29.4/19.6) | 20 | 20 | 37.4 | 7.6 | 15 | 79 | 76 |
| COMPARATIVE EXAMPLE 12-14-1 | | — | 40 | 52.4 | 7.6 | — | 50 | 42 |
| COMPARATIVE EXAMPLE 12-14-2 | | 20 | 20 | 52.4 | 7.6 | — | 77 | 72 |
| EXAMPLE 12-15-1 | Sn—Ag—C | — | 40 | 37.4 | 7.6 | 15 | 54 | 49 |
| EXAMPLE 12-15-2 | (50/29.4/19.6) | 20 | 20 | 37.4 | 7.6 | 15 | 79 | 76 |
| COMPARATIVE EXAMPLE 12-15-1 | | — | 40 | 52.4 | 7.6 | — | 52 | 43 |
| COMPARATIVE EXAMPLE 12-15-2 | | 20 | 20 | 52.4 | 7.6 | — | 78 | 72 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium

TABLE 15

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 12-16-1 | Sn—In—C | — | 40 | 37.4 | 7.6 | 15 | 55 | 51 |
| EXAMPLE 12-16-2 | (50/29.4/19.6) | 20 | 20 | 37.4 | 7.6 | 15 | 87 | 85 |
| COMPARATIVE EXAMPLE 12-16-1 | | — | 40 | 52.4 | 7.6 | — | 55 | 46 |
| COMPARATIVE EXAMPLE 12-16-2 | | 20 | 20 | 52.4 | 7.6 | — | 85 | 79 |
| EXAMPLE 12-17-1 | Sn—Ce—C | — | 40 | 37.4 | 7.6 | 15 | 52 | 48 |
| EXAMPLE 12-17-2 | (50/29.4/19.6) | 20 | 20 | 37.4 | 7.6 | 15 | 79 | 75 |
| COMPARATIVE EXAMPLE 12-17-1 | | — | 40 | 52.4 | 7.6 | — | 49 | 42 |
| COMPARATIVE EXAMPLE 12-17-2 | | 20 | 20 | 52.4 | 7.6 | — | 77 | 71 |
| EXAMPLE 12-18-1 | Sn—Hf—C | — | 40 | 37.4 | 7.6 | 15 | 51 | 47 |
| EXAMPLE 12-18-2 | (50/29.4/19.6) | 20 | 20 | 37.4 | 7.6 | 15 | 78 | 74 |
| COMPARATIVE EXAMPLE 12-18-1 | | — | 40 | 52.4 | 7.6 | — | 50 | 42 |
| COMPARATIVE EXAMPLE 12-18-2 | | 20 | 20 | 52.4 | 7.6 | — | 76 | 70 |
| EXAMPLE 12-19-1 | Sn—Ta—C | — | 40 | 37.4 | 7.6 | 15 | 50 | 45 |
| EXAMPLE 12-19-2 | (50/29.4/19.6) | 20 | 20 | 37.4 | 7.6 | 15 | 77 | 73 |
| COMPARATIVE EXAMPLE 12-19-1 | | — | 40 | 52.4 | 7.6 | — | 48 | 41 |
| COMPARATIVE EXAMPLE 12-19-2 | | 20 | 20 | 52.4 | 7.6 | — | 76 | 70 |
| EXAMPLE 12-20-1 | Sn—W—C | — | 40 | 37.4 | 7.6 | 15 | 50 | 44 |
| EXAMPLE 12-20-2 | (50/29.4/19.6) | 20 | 20 | 37.4 | 7.6 | 15 | 77 | 73 |
| COMPARATIVE EXAMPLE 12-20-1 | | — | 40 | 52.4 | 7.6 | — | 48 | 40 |
| COMPARATIVE EXAMPLE 12-20-2 | | 20 | 20 | 52.4 | 7.6 | — | 75 | 70 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium

TABLE 16

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 12-21-1 | Sn—Bi—C | — | 40 | 37.4 | 7.6 | 15 | 51 | 46 |
| EXAMPLE 12-21-2 | (50/29.4/19.6) | 20 | 20 | 37.4 | 7.6 | 15 | 77 | 74 |
| COMPARATIVE EXAMPLE 12-21-1 | | — | 40 | 52.4 | 7.6 | — | 49 | 41 |
| COMPARATIVE EXAMPLE 12-21-2 | | 20 | 20 | 52.4 | 7.6 | — | 76 | 71 |

TABLE 16-continued

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 12-22-1 | Sn—Co—B | 20 | 20 | 37.4 | 7.6 | 15 | 72 | 67 |
| COMPARATIVE EXAMPLE 12-22-1 | (50/29.4/19.6) | 20 | 20 | 52.4 | 7.6 | — | 71 | 64 |
| EXAMPLE 12-23-1 | Sn—Co—Al | 20 | 20 | 37.4 | 7.6 | 15 | 75 | 73 |
| COMPARATIVE EXAMPLE 12-23-1 | (50/29.4/19.6) | 20 | 20 | 52.4 | 7.6 | — | 73 | 67 |
| EXAMPLE 12-24-1 | Sn—Co—P | 20 | 20 | 37.4 | 7.6 | 15 | 75 | 75 |
| COMPARATIVE EXAMPLE 12-24-1 | (50/29.4/19.6) | 20 | 20 | 52.4 | 7.6 | — | 74 | 68 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium

TABLE 17

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 12-25-1 | Sn—Co—In—C | — | 40 | 37.4 | 7.6 | 15 | 67 | 61 |
| EXAMPLE 12-25-2 | (50/24.4/5/19.6) | 20 | 20 | 37.4 | 7.6 | 15 | 94 | 91 |
| COMPARATIVE EXAMPLE 12-25-1 | | — | 40 | 52.4 | 7.6 | — | 64 | 56 |
| COMPARATIVE EXAMPLE 12-25-2 | | 20 | 20 | 52.4 | 7.6 | — | 92 | 86 |
| EXAMPLE 12-26-1 | Sn—Co—In—Ti—C | — | 40 | 37.4 | 7.6 | 15 | 74 | 73 |
| EXAMPLE 12-26-2 | (49/23.4/5/2/19.6) | 20 | 20 | 37.4 | 7.6 | 15 | 95 | 92 |
| COMPARATIVE EXAMPLE 12-26-1 | | — | 40 | 52.4 | 7.6 | — | 70 | 62 |
| COMPARATIVE EXAMPLE 12-26-2 | | 20 | 20 | 52.4 | 7.6 | — | 94 | 88 |
| EXAMPLE 12-27-1 | Sn—Si—Co—C | — | 40 | 37.4 | 7.6 | 15 | 60 | 55 |
| EXAMPLE 12-27-2 | (48/3.9/27.5/19.6) | 20 | 20 | 37.4 | 7.6 | 15 | 86 | 83 |
| COMPARATIVE EXAMPLE 12-27-1 | | — | 40 | 52.4 | 7.6 | — | 55 | 46 |
| COMPARATIVE EXAMPLE 12-27-2 | | 20 | 20 | 52.4 | 7.6 | — | 85 | 79 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium It was obvious from Tables 12 through 17 that in each example, the discharge capacity retention ratio could be improved, compared to each comparative example in which the cyclic imide salt was not used, and in particular, a higher effect was observed at 50° C. Moreover, when 4-fluoro-1,3-dioxolane-2-one was used as a solvent, higher characteristics could be obtained. In other words, it was found out that when the cyclic imide salt was included in the electrolytic solution, even in the case where an anode material including tin was used as an anode active material, the cycle characteristics could be improved, and in particular, the cycle characteristics under high temperature conditions could be effectively improved. Further, it was found out that when 4-fluoro-1,3-dioxolane-2-one was used as a solvent, a higher effect could be obtained.

Examples 13-1 to 13-6

Secondary batteries were formed as in the case of Example 12-1-2, except that the composition of the SnCoC-containing material was changed. The compositions of formed CoSnC-containing materials of Examples 13-1 through 13-6 were analyzed as in the case of Example 5-1-2. The results are shown in Tables 18 and 19. Moreover, when X-ray diffraction was performed on the CoSnC-containing materials of Examples 13-1 through 13-6, a diffraction peak having a broad half-width in which the diffraction angle 2θ was 1.0° or more was observed within a range of the diffraction angle 2θ=20° to 50°. Further, when the XPS measurement was performed on the CoSnC-containing materials, the peak P1 shown in FIG. 6 was obtained. When the peak P1 was analyzed, a peak P2 of surface contamination carbon and a peak P3 of C1s in the SnCoC-containing material on a lower energy side than the peak P2 were obtained. The peak P3 was obtained in a region lower than 284.5 eV. In other words, it was confirmed that carbon included in the SnCoC-containing material was bonded to another element.

The cycle characteristics of the secondary batteries of Examples 13-1 through 13-6 were measured as in the case of Example 12-1-2. The results are shown in Tables 18 and 19 together with the result of Example 12-1-2. In Table 19, the discharge capacity in the first cycle at 25° C. is also shown.

TABLE 18

Battery shape: cylindrical type
Maximum charging voltage: 4.20 V

| | ANODE ACTIVE MATERIAL | | | | DISCHARGE CAPACITY RETENTION RATIO (%) | |
|---|---|---|---|---|---|---|
| | COMPOSITION (WT %) | | | Co / (Sn + Co) (WT %) | | |
| | Sn | Co | C | | 25° C. | 50° C. |
| EXAMPLE 13-1 | 56.1 | 33.0 | 9.9 | 37 | 79 | 81 |
| EXAMPLE 12-1-2 | 50.0 | 29.4 | 19.6 | | 90 | 88 |
| EXAMPLE 13-1 | 43.7 | 25.6 | 29.7 | | 81 | 81 |

TABLE 19

Battery shape: cylindrical type
Maximum charging voltage: 4.20 V

| | ANODE ACTIVE MATERIAL | | | | DISCHARGE CAPACITY (mAh) | DISCHARGE CAPACITY RETENTION RATIO (%) | |
|---|---|---|---|---|---|---|---|
| | COMPOSITION (WT %) | | | Co / (Sn + Co) | | | |
| | Sn | Co | C | (WT %) | | 25° C. | 50° C. |
| EXAMPLE 13-3 | 55.4 | 23.8 | 19.8 | 30 | 3480 | 82 | 81 |
| EXAMPLE 13-4 | 53.1 | 26.1 | 19.8 | 33 | 3420 | 85 | 84 |
| EXAMPLE 12-1-2 | 50.0 | 29.4 | 19.6 | 37 | 3350 | 90 | 88 |
| EXAMPLE 13-5 | 31.7 | 47.5 | 19.8 | 60 | 2990 | 92 | 91 |
| EXAMPLE 13-6 | 23.8 | 55.4 | 19.8 | 70 | 2860 | 93 | 92 |

As shown in Table 18, there was a tendency that as the carbon content increased, the discharge capacity retention ratio increased to a maximum value, then decreased. Moreover, as shown in Table 19, there was a tendency that as the ratio of cobalt to the total of tin and cobalt Co/(Sn+Co) increased, the discharge capacity retention ratio was improved, but the discharge capacity decreased. In other words, it was found out that a SnCoC-containing material in which the carbon content was within a range from 9.9 wt % to 29.7 wt % inclusive, and the ratio of cobalt to the total of tin and cobalt Co/(Sn+Co) was within a range from 30 wt % to 70 wt % inclusive was preferably used, because a high capacity could be obtained, and superior cycle characteristics could be obtained.

Examples 14-1 to 14-7

Secondary batteries were formed as in the case of Example 12-1-2, except that the content of 1,1,2,2,3,3-hexafluoropropane-1,3-disulfonimide lithium in the electrolytic solution was changed as shown in Table 20. The composition of each electrolytic solution was as shown in Table 20.

TABLE 20

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 14-1 | Sn—Co—C | 20 | 20 | 29.6 | 0 | 30.4 | 90 | 85 |
| EXAMPLE 14-2 | (50/29.4/19.6) | 20 | 20 | 44.8 | 0 | 15.2 | 90 | 85 |
| EXAMPLE 14-3 | | 20 | 20 | 40.4 | 9.0 | 10.6 | 91 | 87 |
| EXAMPLE 14-4 | | 20 | 20 | 40.4 | 10.6 | 9.0 | 91 | 92 |
| EXAMPLE 14-5 | | 20 | 20 | 37.4 | 15.0 | 7.6 | 91 | 90 |
| EXAMPLE 14-6 | | 20 | 20 | 44.7 | 15.0 | 0.3 | 91 | 88 |
| EXAMPLE 14-7 | | 20 | 20 | 44.8 | 15.1 | 0.1 | 90 | 87 |
| COMPARATIVE EXAMPLE 14-1 | Sn—Co—C (50/29.4/19.6) | 20 | 20 | 44.8 | 15.2 | — | 90 | 84 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium As Comparative Example 14-1 relative to Examples 14-1 through 14-7, a secondary battery was formed as in the case of Examples 14-1 through 14-7, except that 1,1,2,2,3,3-hexafluoropropane-1,3-disulfonimide lithium was not added to the electrolytic solution. The composition of the electrolytic solution was as shown in Table 20.

The cycle characteristics of the obtained secondary batteries of Examples 14-1 through 14-7 and Comparative Example 14-1 were determined as in the case of Example 12-1-2. The results are shown in Table 20.

It was obvious from Table 20 that there was a tendency that as the content of 1,1,2,2,3,3-hexafluoropropane-1,3-disulfonimide lithium in the electrolytic solution increased, the discharge capacity retention ratio increased to a maximum value, then decreased. Moreover, in Examples 14-3 through 14-7 in which in addition to the cyclic imide salt, LiPF$_6$ was mixed, the discharge capacity retention ratio has a higher value, compared to Comparative Example 14-1 in which LiPF$_6$ was not mixed.

In other words, it was found out that the content of the cyclic imide salt in the electrolytic solution was preferably within a range from 0.1 wt % to 31 wt % inclusive, and more preferably within a range from 0.2 wt % to 15 wt % inclusive. Moreover, it was found out that in addition to the cyclic imide salt, LiPF$_6$ was preferably mixed.

Examples 15-1-1, 15-1-2, 15-1-3 and 15-1-4 through 15-27-1, 15-27-2, 15-27-3 and 15-27-4

Secondary batteries were formed as in the case of Examples 12-1-2 through 12-27-2, except that in addition to 4-fluoro-1,3-dioxolane-2-one, ethylene carbonate and dimethyl carbonate, 1,3-dioxol-2-one shown in Chemical Formula 3(1), 4-vinyl-1,3-dioxolane-2-one shown in Chemical Formula 3(2), 1,3-propane sultone shown in Chemical Formula 4(1) or 1,3-propene sultone shown in Chemical Formula 4(2) was used as a solvent. The composition of each electrolytic solution was as shown in Tables 21 through 25.

The cycle characteristics of the obtained secondary batteries of the examples were determined as in the case of Examples 12-1-2 through 12-27-2. The results are shown in Table 21 through 25.

TABLE 21

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | | | | DISCHARGE CAPACITY RETENTION RATIO (%) | |
|---|---|---|---|---|---|---|---|---|---|---|---|
| | | FEC | EC | VC | VEC | PS | PRS | DMC | LiPF$_6$ | CHEMICAL FORMULA 6(1) | 25° C. | 50° C. |
| EXAMPLE 12-1-2 | Sn—Co—C | 20 | 20 | — | — | — | — | 37.4 | 7.6 | 15 | 90 | 88 |
| EXAMPLE 15-1-1 | (50/29.4/19.6) | 20 | 18 | 2 | — | — | — | 37.4 | 7.6 | 15 | 92 | 93 |
| EXAMPLE 15-1-2 | | 20 | 18 | — | 2 | — | — | 37.4 | 7.6 | 15 | 92 | 95 |
| EXAMPLE 15-1-3 | | 20 | 18 | — | — | 2 | — | 37.4 | 7.6 | 15 | 90 | 90 |
| EXAMPLE 15-1-4 | | 20 | 18 | — | — | — | 2 | 37.4 | 7.6 | 15 | 90 | 91 |
| EXAMPLE 12-2-2 | Sn—Fe—C | 20 | 20 | — | — | — | — | 37.4 | 7.6 | 15 | 80 | 78 |
| EXAMPLE 15-2-1 | (50/29.4/19.6) | 20 | 18 | 2 | — | — | — | 37.4 | 7.6 | 15 | 87 | 90 |
| EXAMPLE 15-2-2 | | 20 | 18 | — | 2 | — | — | 37.4 | 7.6 | 15 | 86 | 90 |
| EXAMPLE 15-2-3 | | 20 | 18 | — | — | 2 | — | 37. | 7.6 | 15 | 86 | 86 |
| EXAMPLE 15-2-4 | | 20 | 18 | — | — | — | 2 | 37.4 | 7.6 | 15 | 86 | 87 |
| EXAMPLE 12-3-2 | Sn—Mg—C | 20 | 20 | — | — | — | — | 37.4 | 7.6 | 15 | 82 | 79 |
| EXAMPLE 15-3-1 | (50/29.4/19.6) | 20 | 18 | 2 | — | — | — | 37.4 | 7.6 | 15 | 83 | 86 |
| EXAMPLE 15-3-2 | | 20 | 18 | — | 2 | — | — | 37.4 | 7.6 | 15 | 83 | 86 |

TABLE 21-continued

Battery shape: cylindrical type  
Maximum charging voltage: 4.20 V

| | ANODE ACTIVE MATERIAL (WT %) | COMPOSITION OF ELECTROLYTIC SOLUTION (WT %) | | | | | | | | CHEMICAL FORMULA 6(1) | DISCHARGE CAPACITY RETENTION RATIO (%) | |
|---|---|---|---|---|---|---|---|---|---|---|---|---|
| | | FEC | EC | VC | VEC | PS | PRS | DMC | LiPF$_6$ | | 25° C. | 50° C. |
| EXAMPLE 15-3-3 | | 20 | 18 | — | — | 2 | — | 37.4 | 7.6 | 15 | 82 | 83 |
| EXAMPLE 15-3-4 | | 20 | 18 | — | — | — | 2 | 37.4 | 7.6 | 15 | 82 | 85 |
| EXAMPLE 12-4-2 | Sn—Ti—C | 20 | 20 | — | — | — | — | 37.4 | 7.6 | 15 | 90 | 87 |
| EXAMPLE 15-4-1 | (50/29.4/19.6) | 20 | 18 | 2 | — | — | — | 37.4 | 7.6 | 15 | 90 | 92 |
| EXAMPLE 15-4-2 | | 20 | 18 | — | 2 | — | — | 37.4 | 7.6 | 15 | 90 | 91 |
| EXAMPLE 15-4-3 | | 20 | 18 | — | — | 2 | — | 37.4 | 7.6 | 15 | 90 | 90 |
| EXAMPLE 15-4-4 | | 20 | 18 | — | — | — | 2 | 37.4 | 7.6 | 15 | 90 | 90 |
| EXAMPLE 12-5-2 | Sn—V—C | 20 | 20 | — | — | — | — | 37.4 | 7.6 | 15 | 79 | 75 |
| EXAMPLE 15-5-1 | (50/29.4/19.6) | 20 | 18 | 2 | — | — | — | 37.4 | 7.6 | 15 | 80 | 82 |
| EXAMPLE 15-5-2 | | 20 | 18 | — | 2 | — | — | 37.4 | 7.6 | 15 | 80 | 82 |
| EXAMPLE 15-5-3 | | 20 | 18 | — | — | 2 | — | 37.4 | 7.6 | 15 | 79 | 77 |
| EXAMPLE 15-5-4 | | 20 | 18 | — | — | — | 2 | 37.4 | 7.6 | 15 | 79 | 79 |

FEC: 4-fluoro-1,3-dioxolane-2-one  
EC: ethylene carbonate  
DMC: dimethyl carbonate  
VC: 1,3-dioxol-2-one  
VEC: 4-vinyl-1,3-dioxolane-2-one  
PS: 1,3-propane sultone  
PRS: 1,3-propene sultone  
CHEMICAL FORMULA 6(1): 1,1,2,2,3,3-hexafluoropropane-1,3-disulfonimide lithium

TABLE 22

Battery shape: cylindrical type  
Maximum charging voltage: 4.20 V

| | ANODE ACTIVE MATERIAL (WT %) | COMPOSITION OF ELECTROLYTIC SOLUTION (WT %) | | | | | | | | CHEMICAL FORMULA 6(1) | DISCHARGE CAPACITY RETENTION RATIO (%) | |
|---|---|---|---|---|---|---|---|---|---|---|---|---|
| | | FEC | EC | VC | VEC | PS | PRS | DMC | LiPF$_6$ | | 25° C. | 50° C. |
| EXAMPLE 12-6-2 | Sn—Cr—C | 20 | 20 | — | — | — | — | 37.4 | 7.6 | 15 | 80 | 78 |
| EXAMPLE 15-6-1 | (50/29.4/19.6) | 20 | 18 | 2 | — | — | — | 37.4 | 7.6 | 15 | 82 | 90 |
| EXAMPLE 15-6-2 | | 20 | 18 | — | 2 | — | — | 37.4 | 7.6 | 15 | 82 | 91 |
| EXAMPLE 15-6-3 | | 20 | 18 | — | — | 2 | — | 37.4 | 7.6 | 15 | 80 | 88 |
| EXAMPLE 15-6-4 | | 20 | 18 | — | — | — | 2 | 37.4 | 7.6 | 15 | 80 | 87 |
| EXAMPLE 12-7-2 | Sn—Mn—C | 20 | 20 | — | — | — | — | 37.4 | 7.6 | 15 | 76 | 74 |
| EXAMPLE 15-7-1 | (50/29.4/19.6) | 20 | 18 | 2 | — | — | — | 37.4 | 7.6 | 15 | 77 | 80 |
| EXAMPLE 15-7-2 | | 20 | 18 | — | 2 | — | — | 37.4 | 7.6 | 15 | 77 | 80 |
| EXAMPLE 15-7-3 | | 20 | 18 | — | — | 2 | — | 37.4 | 7.6 | 15 | 76 | 77 |
| EXAMPLE 15-7-4 | | 20 | 18 | — | — | — | 2 | 37.4 | 7.6 | 15 | 76 | 77 |
| EXAMPLE 12-8-2 | Sn—Ni—C | 20 | 20 | — | — | — | — | 37.4 | 7.6 | 15 | 80 | 77 |
| EXAMPLE 15-8-1 | (50/29.4/19.6) | 20 | 18 | 2 | — | — | — | 37.4 | 7.6 | 15 | 81 | 84 |
| EXAMPLE 15-8-2 | | 20 | 18 | — | 2 | — | — | 37.4 | 7.6 | 15 | 81 | 84 |
| EXAMPLE 15-8-3 | | 20 | 18 | — | — | 2 | — | 37.4 | 7.6 | 15 | 80 | 79 |
| EXAMPLE 15-8-4 | | 20 | 18 | — | — | — | 2 | 37.4 | 7.6 | 15 | 80 | 81 |
| EXAMPLE 12-9-2 | Sn—Cu—C | 20 | 20 | — | — | — | — | 37.4 | 7.6 | 15 | 85 | 81 |
| EXAMPLE 15-9-1 | (50/29.4/19.6) | 20 | 18 | 2 | — | — | — | 37.4 | 7.6 | 15 | 86 | 88 |
| EXAMPLE 15-9-2 | | 20 | 18 | — | 2 | — | — | 37.4 | 7.6 | 15 | 86 | 88 |
| EXAMPLE 15-9-3 | | 20 | 18 | — | — | 2 | — | 37.4 | 7.6 | 15 | 85 | 83 |
| EXAMPLE 15-9-4 | | 20 | 18 | — | — | — | 2 | 37.4 | 7.6 | 15 | 85 | 85 |
| EXAMPLE 12-10-2 | Sn—Zn—C | 20 | 20 | — | — | — | — | 37.4 | 7.6 | 15 | 78 | 75 |
| EXAMPLE 15-10-1 | (50/29.4/19.6) | 20 | 18 | 2 | — | — | — | 37.4 | 7.6 | 15 | 80 | 83 |

TABLE 22-continued

Battery shape: cylindrical type  
Maximum charging voltage: 4.20 V

| | ANODE ACTIVE MATERIAL (WT %) | COMPOSITION OF ELECTROLYTIC SOLUTION (WT %) | | | | | | | | DISCHARGE CAPACITY RETENTION RATIO (%) | |
|---|---|---|---|---|---|---|---|---|---|---|---|
| | | FEC | EC | VC | VEC | PS | PRS | DMC | $LiPF_6$ | CHEMICAL FORMULA 6(1) | 25° C. | 50° C. |
| EXAMPLE 15-10-2 | | 20 | 18 | — | 2 | — | — | 37.4 | 7.6 | 15 | 80 | 83 |
| EXAMPLE 15-10-3 | | 20 | 18 | — | — | 2 | — | 37.4 | 7.6 | 15 | 78 | 77 |
| EXAMPLE 15-10-4 | | 20 | 18 | — | — | — | 2 | 37.4 | 7.6 | 15 | 78 | 79 |

FEC: 4-fluoro-1,3-dioxolane-2-one  
EC: ethylene carbonate  
DMC: dimethyl carbonate  
VC: 1,3-dioxol-2-one  
VEC: 4-vinyl-1,3-dioxolane-2-one  
PS: 1,3-propane sultone  
PRS: 1,3-propene sultone  
CHEMICAL FORMULA 6(1): 1,1,2,2,3,3-hexafluoropropane-1,3-disulfonimide lithium

TABLE 23

Battery shape: cylindrical type  
Maximum charging voltage: 4.20 V

| | ANODE ACTIVE MATERIAL (WT %) | COMPOSITION OF ELECTROLYTIC SOLUTION (WT %) | | | | | | | | DISCHARGE CAPACITY RETENTION RATIO (%) | |
|---|---|---|---|---|---|---|---|---|---|---|---|
| | | FEC | EC | VC | VEC | PS | PRS | DMC | $LiPF_6$ | CHEMICAL FORMULA 6(1) | 25° C. | 50° C. |
| EXAMPLE 12-11-2 | Sn—Ga—C | 20 | 20 | — | — | — | — | 37.4 | 7.6 | 15 | 78 | 74 |
| EXAMPLE 15-11-1 | (50/29.4/19.6) | 20 | 18 | 2 | — | — | — | 37.4 | 7.6 | 15 | 79 | 80 |
| EXAMPLE 15-11-2 | | 20 | 18 | — | 2 | — | — | 37.4 | 7.6 | 15 | 80 | 80 |
| EXAMPLE 15-11-3 | | 20 | 18 | — | — | 2 | — | 37.4 | 7.6 | 15 | 78 | 76 |
| EXAMPLE 15-11-4 | | 20 | 18 | — | — | — | 2 | 37.4 | 7.6 | 15 | 78 | 78 |
| EXAMPLE 12-12-2 | Sn—Zr—C | 20 | 20 | — | — | — | — | 37.4 | 7.6 | 15 | 80 | 78 |
| EXAMPLE 15-12-1 | (50/29.4/19.6) | 20 | 18 | 2 | — | — | — | 37.4 | 7.6 | 15 | 82 | 90 |
| EXAMPLE 15-12-2 | | 20 | 18 | — | 2 | — | — | 37.4 | 7.6 | 15 | 82 | 90 |
| EXAMPLE 15-12-3 | | 20 | 18 | — | — | 2 | — | 37.4 | 7.6 | 15 | 80 | 88 |
| EXAMPLE 15-12-4 | | 20 | 18 | — | — | — | 2 | 37.4 | 7.6 | 15 | 80 | 87 |
| EXAMPLE 12-13-2 | Sn—Nb—C | 20 | 20 | — | — | — | — | 37.4 | 7.6 | 15 | 80 | 78 |
| EXAMPLE 15-13-1 | (50/29.4/19.6) | 20 | 18 | 2 | — | — | — | 37.4 | 7.6 | 15 | 81 | 84 |
| EXAMPLE 15-13-2 | | 20 | 18 | — | 2 | — | — | 37.4 | 7.6 | 15 | 81 | 84 |
| EXAMPLE 15-13-3 | | 20 | 18 | — | — | 2 | — | 37.4 | 7.6 | 15 | 80 | 80 |
| EXAMPLE 15-13-4 | | 20 | 18 | — | — | — | 2 | 37.4 | 7.6 | 15 | 80 | 81 |
| EXAMPLE 12-14-2 | Sn—Mo—C | 20 | 20 | — | — | — | — | 37.4 | 7.6 | 15 | 79 | 76 |
| EXAMPLE 15-14-1 | (50/29.4/19.6) | 20 | 18 | 2 | — | — | — | 37.4 | 7.6 | 15 | 80 | 82 |
| EXAMPLE 15-14-2 | | 20 | 18 | — | 2 | — | — | 37.4 | 7.6 | 15 | 80 | 82 |
| EXAMPLE 15-14-3 | | 20 | 18 | — | — | 2 | — | 37.4 | 7.6 | 15 | 79 | 78 |
| EXAMPLE 15-14-4 | | 20 | 18 | — | — | — | 2 | 37.4 | 7.6 | 15 | 79 | 79 |
| EXAMPLE 12-15-2 | Sn—Ag—C | 20 | 20 | — | — | — | — | 37.4 | 7.6 | 15 | 79 | 76 |
| EXAMPLE 15-15-1 | (50/29.4/19.6) | 20 | 18 | 2 | — | — | — | 37.4 | 7.6 | 15 | 80 | 82 |
| EXAMPLE 15-15-2 | | 20 | 18 | — | 2 | — | — | 37.4 | 7.6 | 15 | 80 | 82 |
| EXAMPLE 15-15-3 | | 20 | 18 | — | — | 2 | — | 37.4 | 7.6 | 15 | 79 | 78 |
| EXAMPLE 15-15-4 | | 20 | 18 | — | — | — | 2 | 37.4 | 7.6 | 15 | 79 | 79 |

FEC: 4-fluoro-1,3-dioxolane-2-one  
EC: ethylene carbonate  
DMC: dimethyl carbonate  
VC: 1,3-dioxol-2-one  
VEC: 4-vinyl-1,3-dioxolane-2-one  
PS: 1,3-propane sultone  
PRS: 1,3-propene sultone  
CHEMICAL FORMULA 6(1): 1,1,2,2,3,3-hexafluoropropane-1,3-disulfonimide lithium

TABLE 24

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | | | | | DISCHARGE CAPACITY RETENTION RATIO (%) | |
|---|---|---|---|---|---|---|---|---|---|---|---|---|
| | | FEC | EC | VC | VEC | PS | PRS | DMC | $LiPF_6$ | CHEMICAL FORMULA 6(1) | 25° C. | 50° C. |
| EXAMPLE 12-16-2 | Sn—In—C | 20 | 20 | — | — | — | — | 37.4 | 7.6 | 15 | 87 | 85 |
| EXAMPLE 15-16-1 | (50/29.4/19.6) | 20 | 18 | 2 | — | — | — | 37.4 | 7.6 | 15 | 88 | 90 |
| EXAMPLE 15-16-2 | | 20 | 18 | — | 2 | — | — | 37.4 | 7.6 | 15 | 88 | 90 |
| EXAMPLE 15-16-3 | | 20 | 18 | — | — | 2 | — | 37.4 | 7.6 | 15 | 87 | 87 |
| EXAMPLE 15-16-4 | | 20 | 18 | — | — | — | 2 | 37.4 | 7.6 | 15 | 87 | 88 |
| EXAMPLE 12-17-2 | Sn—Ce—C | 20 | 20 | — | — | — | — | 37.4 | 7.6 | 15 | 79 | 75 |
| EXAMPLE 15-17-1 | (50/29.4/19.6) | 20 | 18 | 2 | — | — | — | 37.4 | 7.6 | 15 | 80 | 80 |
| EXAMPLE 15-17-2 | | 20 | 18 | — | 2 | — | — | 37.4 | 7.6 | 15 | 80 | 80 |
| EXAMPLE 15-17-3 | | 20 | 18 | — | — | 2 | — | 37.4 | 7.6 | 15 | 79 | 77 |
| EXAMPLE 15-17-4 | | 20 | 18 | — | — | — | 2 | 37.4 | 7.6 | 15 | 79 | 78 |
| EXAMPLE 12-18-2 | Sn—Hf—C | 20 | 20 | — | — | — | — | 37.4 | 7.6 | 15 | 78 | 74 |
| EXAMPLE 15-18-1 | (50/29.4/19.6) | 20 | 18 | 2 | — | — | — | 37.4 | 7.6 | 15 | 79 | 80 |
| EXAMPLE 15-18-2 | | 20 | 18 | — | 2 | — | — | 37.4 | 7.6 | 15 | 79 | 80 |
| EXAMPLE 15-18-3 | | 20 | 18 | — | — | 2 | — | 37.4 | 7.6 | 15 | 78 | 76 |
| EXAMPLE 15-18-4 | | 20 | 18 | — | — | — | 2 | 37.4 | 7.6 | 15 | 78 | 78 |
| EXAMPLE 12-19-2 | Sn—Ta—C | 20 | 20 | — | — | — | — | 37.4 | 7.6 | 15 | 77 | 73 |
| EXAMPLE 15-19-1 | (50/29.4/19.6) | 20 | 18 | 2 | — | — | — | 37.4 | 7.6 | 15 | 78 | 79 |
| EXAMPLE 15-19-2 | | 20 | 18 | — | 2 | — | — | 37.4 | 7.6 | 15 | 78 | 79 |
| EXAMPLE 15-19-3 | | 20 | 18 | — | — | 2 | — | 37.4 | 7.6 | 15 | 77 | 78 |
| EXAMPLE 15-19-4 | | 20 | 18 | — | — | — | 2 | 37.4 | 7.6 | 15 | 77 | 76 |
| EXAMPLE 12-20-2 | Sn—W—C | 20 | 20 | — | — | — | — | 37.4 | 7.6 | 15 | 77 | 73 |
| EXAMPLE 15-20-1 | (50/29.4/19.6) | 20 | 18 | 2 | — | — | — | 37.4 | 7.6 | 15 | 78 | 79 |
| EXAMPLE 15-20-2 | | 20 | 18 | — | 2 | — | — | 37.4 | 7.6 | 15 | 78 | 79 |
| EXAMPLE 15-20-3 | | 20 | 18 | — | — | 2 | — | 37.4 | 7.6 | 15 | 77 | 75 |
| EXAMPLE 15-20-4 | | 20 | 18 | — | — | — | 2 | 37.4 | 7.6 | 15 | 77 | 76 |

FEC: 4-fluoro-1,3-dioxolane-2-one
EC: ethylene carbonate
DMC: dimethyl carbonate
VC: 1,3-dioxol-2-one
VEC: 4-vinyl-1,3-dioxolane-2-one
PS: 1,3-propane sultone
PRS: 1,3-propene sultone
CHEMICAL FORMULA 6(1): 1,1,2,2,3,3-hexafluoropropane-1,3-disulfonimide lithium

TABLE 25

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | | | | | DISCHARGE CAPACITY RETENTION RATIO (%) | |
|---|---|---|---|---|---|---|---|---|---|---|---|---|
| | | FEC | EC | VC | VEC | PS | PRS | DMC | $LiPF_6$ | CHEMICAL FORMULA 6(1) | 25° C. | 50° C. |
| EXAMPLE 12-21-2 | Sn—Bi—C | 20 | 20 | — | — | — | — | 37.4 | 7.6 | 15 | 77 | 74 |
| EXAMPLE 15-21-1 | (50/29.4/19.6) | 20 | 18 | 2 | — | — | — | 37.4 | 7.6 | 15 | 78 | 80 |
| EXAMPLE 15-21-2 | | 20 | 18 | — | 2 | — | — | 37.4 | 7.6 | 15 | 78 | 80 |
| EXAMPLE 15-21-3 | | 20 | 18 | — | — | 2 | — | 37.4 | 7.6 | 15 | 77 | 76 |
| EXAMPLE 15-21-4 | | 20 | 18 | — | — | — | 2 | 37.4 | 7.6 | 15 | 77 | 77 |
| EXAMPLE 12-25-2 | Sn—Co—In—C | 20 | 20 | — | — | — | — | 37.4 | 7.6 | 15 | 94 | 91 |
| EXAMPLE 15-25-1 | (50/24.4/5/19.6) | 20 | 18 | 2 | — | — | — | 37.4 | 7.6 | 15 | 95 | 96 |
| EXAMPLE 15-25-2 | | 20 | 18 | — | 2 | — | — | 37.4 | 7.6 | 15 | 94 | 96 |
| EXAMPLE 15-25-3 | | 20 | 18 | — | — | 2 | — | 37.4 | 7.6 | 15 | 94 | 93 |
| EXAMPLE 15-25-4 | | 20 | 18 | — | — | — | 2 | 37.4 | 7.6 | 15 | 94 | 93 |
| EXAMPLE 12-26-2 | Sn—Co—In—Ti—C | 20 | 20 | — | — | — | — | 37.4 | 7.6 | 15 | 95 | 92 |
| EXAMPLE 15-26-1 | (49/23.4/5/2/19.6) | 20 | 18 | 2 | — | — | — | 37.4 | 7.6 | 15 | 96 | 96 |
| EXAMPLE 15-26-2 | | 20 | 18 | — | 2 | — | — | 37.4 | 7.6 | 15 | 96 | 96 |
| EXAMPLE 15-26-3 | | 20 | 18 | — | — | 2 | — | 37.4 | 7.6 | 15 | 96 | 95 |
| EXAMPLE 15-26-4 | | 20 | 18 | — | — | — | 2 | 37.4 | 7.6 | 15 | 95 | 95 |
| EXAMPLE 12-27-2 | Sn—Si—Co—C | 20 | 20 | — | — | — | — | 37.4 | 7.6 | 15 | 86 | 83 |

TABLE 25-continued

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | | | | DISCHARGE CAPACITY RETENTION RATIO (%) | |
|---|---|---|---|---|---|---|---|---|---|---|---|
| | | FEC | EC | VC | VEC | PS | PRS | DMC | $LiPF_6$ | CHEMICAL FORMULA 6(1) | 25° C. | 50° C. |
| EXAMPLE 15-27-1 | (48/3.9/27.5/19.6) | 20 | 18 | 2 | — | — | — | 37.4 | 7.6 | 15 | 87 | 89 |
| EXAMPLE 15-27-2 | | 20 | 18 | — | 2 | — | — | 37.4 | 7.6 | 15 | 87 | 89 |
| EXAMPLE 15-27-3 | | 20 | 18 | — | — | 2 | — | 37.4 | 7.6 | 15 | 86 | 85 |
| EXAMPLE 15-27-4 | | 20 | 18 | — | — | — | 2 | 37.4 | 7.6 | 15 | 86 | 85 |

FEC: 4-fluoro-1,3-dioxolane-2-one
EC: ethylene carbonate
DMC: dimethyl carbonate
VC: 1,3-dioxol-2-one
VEC: 4-vinyl-1,3-dioxolane-2-one
PS: 1,3-propane sultone
PRS: 1,3-propene sultone
CHEMICAL FORMULA 6(1): 1,1,2,2,3,3-hexafluoropropane-1,3-disulfonimide lithium It was obvious from Tables 21 through 25 that when 1,3-dioxol-2-one, 4-vinyl-1,3-dioxolane-2-one, 1,3-propane sultone or 1,3-propene sultone was mixed, the discharge capacity retention ratio was improved, and in particular, a higher effect was observed at 50° C.

In other words, it was found out that when a cyclic carbonate having an unsaturated bond or a sultone was used as a solvent, the cycle characteristics could be further improved, and in particular, the cycle characteristics under high temperature conditions could be effectively improved.

Examples 16-1-1 to 16-1-8, 16-2-1 to 16-2-8, 17-1-1 to 17-1-8, 17-2-1 to 17-2-7

In Examples 16-1-1 through 16-1-8, secondary batteries were formed as in the case of Example 15-1-1, except that the content of 1,3-dioxol-2-one in the electrolytic solution was changed in a range from 0.05 wt % to 20 wt %. In Examples 16-2-1 through 16-2-8, secondary batteries were formed as in the case of Example 15-1-2, except that the content of 4-vinyl-1,3-dioxolane-2-one in the electrolytic solution was changed in a range from 0.05 wt % to 20 wt %. In Examples 17-1-1 through 17-1-8, secondary batteries were formed as in the case of Example 15-1-3, except that the content of 1,3-propane sultone in the electrolytic solution was changed in a range from 0.01 wt % to 5 wt %. In Examples 17-2-1 through 17-2-7, secondary batteries were formed as in the case of Example 15-1-4, except that the content of 1,3-propene sultone in the electrolytic solution was changed in a range from 0.05 wt % to 5 wt %. The composition of each electrolytic solution was as shown in Tables 26 and 27.

The cycle characteristics of the obtained secondary batteries of the examples were determined as in the case of Examples 15-1-1 through 15-1-4. The results are shown in Tables 26 and 27 together with the result of Example 12-1-2.

TABLE 26

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | | | DISCHARGE CAPACITY RETENTION RATIO (%) | |
|---|---|---|---|---|---|---|---|---|---|---|
| | | FEC | EC | VC | VEC | DMC | $LiPF_6$ | CHEMICAL FORMULA 6(1) | 25° C. | 50° C. |
| EXAMPLE 16-1-1 | Sn—Co—C | 20 | — | 20 | — | 37.4 | 7.6 | 15 | 92 | 86 |
| EXAMPLE 16-1-2 | (50/29.4/19.6) | 20 | 10 | 10 | — | 37.4 | 7.6 | 15 | 92 | 93 |
| EXAMPLE 16-1-3 | | 20 | 12 | 5 | — | 37.4 | 7.6 | 15 | 93 | 94 |
| EXAMPLE 16-1-4 | | 20 | 15 | 5 | — | 37.4 | 7.6 | 15 | 93 | 96 |
| EXAMPLE 15-1-1 | | 20 | 18 | 2 | — | 37.4 | 7.6 | 15 | 92 | 93 |
| EXAMPLE 16-1-5 | | 20 | 19 | 1 | — | 37.4 | 7.6 | 15 | 92 | 93 |
| EXAMPLE 16-1-6 | | 20 | 19.5 | 0.5 | — | 37.4 | 7.6 | 15 | 92 | 92 |
| EXAMPLE 16-1-7 | | 20 | 19.9 | 0.1 | — | 37.4 | 7.6 | 15 | 91 | 91 |
| EXAMPLE 16-1-8 | | 20 | 19.95 | 0.05 | — | 37.4 | 7.6 | 15 | 90 | 90 |
| EXAMPLE 16-2-1 | Sn—Co—C | 20 | — | — | 20 | 37.4 | 7.6 | 15 | 92 | 87 |
| EXAMPLE 16-2-2 | (50/29.4/19.6) | 20 | 10 | — | 10 | 37.4 | 7.6 | 15 | 92 | 94 |
| EXAMPLE 16-2-3 | | 20 | 12 | — | 8 | 37.4 | 7.6 | 15 | 93 | 95 |
| EXAMPLE 16-2-4 | | 20 | 15 | — | 5 | 37.4 | 7.6 | 15 | 93 | 97 |
| EXAMPLE 15-1-2 | | 20 | 18 | — | 2 | 34.7 | 7.6 | 15 | 92 | 95 |
| EXAMPLE 16-2-5 | | 20 | 19 | — | 1 | 37.4 | 7.6 | 15 | 92 | 94 |
| EXAMPLE 16-2-6 | | 20 | 19.5 | — | 0.5 | 37.4 | 7.6 | 15 | 92 | 93 |
| EXAMPLE 16-2-7 | | 20 | 19.9 | — | 0.1 | 37.4 | 7.6 | 15 | 92 | 91 |

TABLE 26-continued

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | | CHEMICAL FORMULA 6(1) | DISCHARGE CAPACITY RETENTION RATIO (%) | |
|---|---|---|---|---|---|---|---|---|---|---|
| | | FEC | EC | VC | VEC | DMC | LiPF$_6$ | | 25° C. | 50° C. |
| EXAMPLE 16-2-8 | | 20 | 19.95 | — | 0.05 | 37.4 | 7.6 | 15 | 90 | 90 |
| EXAMPLE 12-1-2 | | 20 | 20 | — | — | 37.4 | 7.6 | 15 | 90 | 88 |

FEC: 4-fluoro-1,3-dioxolane-2-one
EC: ethylene carbonate
DMC: dimethyl carbonate
VC: 1,3-dioxol-2-one
VEC: 4-vinyl-1,3-dioxolane-2-one
CHEMICAL FORMULA 6(1): 1,1,2,2,3,3-hexafluoropropane-1,3-disulfonimide lithium

TABLE 27

Battery shape: cylindrical type
Maximum charging voltage: 4.20 V

| | ANODE ACTIVE MATERIAL (WT %) | COMPOSITION OF ELECTROLYTIC SOLUTION (WT %) | | | | | | CHEMICAL FORMULA 6(1) | DISCHARGE CAPACITY RETENTION RATIO (%) | |
|---|---|---|---|---|---|---|---|---|---|---|
| | | FEC | EC | PS | PRS | DMC | LiPF$_6$ | | 25° C. | 50° C. |
| EXAMPLE 17-1-1 | Sn—Co—C | 20 | 15 | 5 | — | 37.4 | 7.6 | 15 | 90 | 89 |
| EXAMPLE 17-1-2 | (50/29.4/19.6) | 20 | 17 | 3 | — | 37.4 | 7.6 | 15 | 90 | 90 |
| EXAMPLE 15-1-3 | | 20 | 18 | 2 | — | 37.4 | 7.6 | 15 | 90 | 90 |
| EXAMPLE 17-1-3 | | 20 | 19 | 1 | — | 37.4 | 7.6 | 15 | 91 | 91 |
| EXAMPLE 17-1-4 | | 20 | 19.5 | 0.5 | — | 37.4 | 7.6 | 15 | 91 | 91 |
| EXAMPLE 17-1-5 | | 20 | 19.7 | 0.3 | — | 37.4 | 7.6 | 15 | 91 | 91 |
| EXAMPLE 17-1-6 | | 20 | 19.9 | 0.1 | — | 37.4 | 7.6 | 15 | 91 | 91 |
| EXAMPLE 17-1-7 | | 20 | 19.95 | 0.05 | — | 37.4 | 7.6 | 15 | 90 | 91 |
| EXAMPLE 17-1-8 | | 20 | 19.99 | 0.01 | — | 37.4 | 7.6 | 15 | 90 | 89 |
| EXAMPLE 17-2-1 | Sn—Co—C | 20 | 15 | — | 5 | 37.4 | 7.6 | 15 | 90 | 89 |
| EXAMPLE 17-2-2 | (50/29..4/19.6) | 20 | 17 | — | 3 | 37.4 | 7.6 | 15 | 90 | 90 |
| EXAMPLE 15-1-4 | | 20 | 18 | — | 2 | 37.4 | 7.6 | 15 | 90 | 91 |
| EXAMPLE 17-2-3 | | 20 | 19 | — | 1 | 37.4 | 7.6 | 15 | 92 | 92 |
| EXAMPLE 17-2-4 | | 20 | 19.5 | — | 0.5 | 37.4 | 7.6 | 15 | 91 | 91 |
| EXAMPLE 17-2-5 | | 20 | 19.7 | — | 0.3 | 37.4 | 7.6 | 15 | 91 | 91 |
| EXAMPLE 17-2-6 | | 20 | 19.9 | — | 0.1 | 37.4 | 7.6 | 15 | 90 | 90 |
| EXAMPLE 17-2-7 | | 20 | 19.99 | — | 0.05 | 37.4 | 7.6 | 15 | 90 | 89 |
| EXAMPLE 12-1-2 | Sn—Co—C (50/29.4/19.6) | 20 | 20 | — | — | 37.4 | 7.6 | 15 | 90 | 88 |

FEC: 4-fluoro-1,3-dioxolane-2-one
EC: ethylene carbonate
DMC: dimethyl carbonate
PS: 1,3-propane sultone
PRS: 1,3-propene sultone
CHEMICAL FORMULA 6(1): 1,1,2,2,3,3-hexafluoropropane-1,3-disulfonimide lithium It was obvious from Tables 26 and 27 that there was a tendency that as the content of 1,3-dioxol-2-one, 4-vinyl-1,3-dioxolane-2-one, 1,3-propane sultone or 1,3-propene sultone in the electrolytic solution increased, the discharge capacity retention ratio increased to a maximum value, then decreased.

In other words, it was found out that the content of the cyclic carbonate having an unsaturated bond in the electrolytic solution was preferably within a range from 0.05 wt % to 20 wt % inclusive. Moreover, the content of the sultone in the electrolytic solution was preferably within a range from 0.01 wt % to 5 wt % inclusive.

Example 18-1

A secondary battery shown in FIGS. 3 and 4 was formed. At first, the cathode 33 and the anode 34 were formed as in the case of Example 12-1-1, and the cathode lead 31 and the anode lead 32 were attached. As an anode active material, the same SnCoC-containing material as that used in Example 12-1-1 was used.

Next, as a high molecular weight compound, a mixture of a copolymer of vinylidene fluoride and hexafluoropropylene with a weight-average molecular weight of 700,000 (A) and a copolymer of vinylidene fluoride and hexafluoropropylene with a weight-average molecular weight of 310,000 (B) at a weight ratio of (A):(B)=9:1 was prepared. The ratio of hexafluoropropylene in the copolymer was 7 wt %. After that, the high molecular weight compound and an electrolytic solution were mixed with a mixed solvent to form a precursor solution. As the electrolytic solution, an electrolytic solution formed through mixing a mixture of 4-fluoro-1,3 dioxolane-2-one and ethylene carbonate as the solvent and $LiPF_6$ and 1,1,2,2,3,3-hexafluoropropane-1,3-disulfonimide lithium which was a cyclic imide salt as electrolyte salts was used. The composition of the electrolytic solution was as shown in Table 28.

Next, after the formed precursor solution was applied to the cathode 33 and the anode 34 through the use of a bar coater, the mixed solvent was volatilized to form the gel electrolyte layer 36. After that, the cathode 33 and the anode 34 were laminated with the separator 35 made of polyethylene (E16MMS, Tonen Chemical) with a thickness of 16 μm in between to form a laminate, and the laminate was flatly wound to form the spirally wound electrode body 30.

Next, the spirally wound electrode body 30 was vacuum sealed in the package members 40 made of a laminate film so as to obtain the secondary battery.

As Comparative Example 18-1 relative to Example 18-1, a secondary battery was formed as in the case of Example 18-1, except that the cyclic imide salt was not used as the electrolyte salt.

The cycle characteristics of the secondary batteries of Example 18-1 and Comparative Example 18-1 at 25° C. and 50° C. were measured. The results are shown in Table 18. As a charge-discharge cycle, in an environment of 25° C. or 50° C., the secondary batteries were charged at a constant current of 830 mA and a constant voltage until reaching a maximum voltage of 4.2 V, and then the secondary batteries were discharged at a constant current of 660 mA until reaching a final voltage of 2.6 V. The charge-discharge cycle was repeated 150 times, and the discharge capacity retention ratio (%) in the 150th cycle in the case where the discharge capacity in the first cycle was 100 was determined as the cycle characteristics.

TABLE 28

Battery shape: laminate film type
Maximum charging voltage: 4.20 V

| | ANODE ACTIVE MATERIAL (WT %) | COMPOSITION OF ELECTROLYTIC SOLUTION (WT %) | | | | DISCHARGE CAPACITY RETENTION RATIO (%) | |
|---|---|---|---|---|---|---|---|
| | | FEC | EC | $LiPF_6$ | CHEMICAL FORMULA 6(1) | 25° C. | 50° C. |
| EXAMPLE 18-1 | Sn—Co—C (50/29.4/19.6) | 43.2 | 43.2 | 4.6 | 9.0 | 92 | 91 |
| COMPARATIVE EXAMPLE 18-1 | | 45.45 | 45.45 | 9.1 | — | 92 | 86 |

FEC: 4-fluoro-1,3-dioxolane-2-one
EC: ethylene carbonate
CHEMICAL FORMULA 6(1): 1,1,2,2,3,3-hexafluoropropane-1,3-disulfonimide lithium As shown in Table 28, in the example, as in the case of the above-described other examples, the discharge capacity retention ratio could be improved at 50° C., compared to the comparative example. In other words, it was found out that even if the high molecular weight compound held the electrolytic solution, the same effect could be obtained.

Example 19-1

A secondary battery was formed as in the case of Example 12-1-2, except that a hollow prismatic-shaped battery can made of aluminum was used. At that time, as the electrolytic solution, an electrolytic solution formed through mixing $LiPF_6$ and 1,1,2,2,3,3-hexafluoropropane-1,3-disulfonimide lithium which was a cyclic imide salt as electrolyte salts with a solvent including a mixture of 4-fluoro-1,3-dioxolane-2-one, ethylene carbonate and dimethyl carbonate as a solvent was used. The composition of the electrolytic solution was as shown in Table 29. As the anode active material, the same SnCoC-containing material as that used in Example 12-1-1 was used.

TABLE 29

Battery shape: hollow prismatic shape
Maximum charging voltage: 4.20 V

| | ANODE ACTIVE MATERIAL (WT %) | COMPOSITION OF ELECTROLYTIC SOLUTION (WT %) | | | | | DISCHARGE CAPACITY RETENTION RATIO (%) | |
|---|---|---|---|---|---|---|---|---|
| | | FEC | EC | DMC | LiPF$_6$ | CHEMICAL FORMULA 6(1) | 25° C. | 50° C. |
| EXAMPLE 19-1 | Sn—Co—C (50/29.4/19.6) | 20 | 20 | 37.4 | 7.6 | 15 | 90 | 88 |
| COMPARATIVE EXAMPLE 19-1 | | 20 | 20 | 44.8 | 15.2 | — | 90 | 84 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium As Comparative Example 19-1 relative to Example 19-1, a secondary battery was formed as in the case of Example 19-1, except that the cyclic imide salt was not used as the electrolyte salt. The composition of the electrolytic solution was as shown in Table 29.

The cycle characteristics of the secondary batteries of Example 19-1 and Comparative Example 19-1 were determined as in the case of Example 12-1-1. The results are shown in Table 29.

As shown in Table 29, in Example 19-1, the same results as those in Example 12-1-1 were obtained. In other words, it was found out that even the shape of the battery can was changed, the same effect could be obtained.

Examples 20-1 to 20-9

Batteries in which the capacity of the anode 22 was represented by a capacity component by precipitation and dissolution of lithium, that is, so-called lithium metal secondary batteries were formed. At that time, the batteries shown in FIG. 1 were formed.

At first, lithium carbonate (Li$_2$CO$_3$) and cobalt carbonate (CoCO$_3$) were mixed at a ratio of Li$_2$CO$_3$:CoCO$_3$ of 0.5:1 (molar ratio), and the mixture was fired in air at 900° C. for 5 hours to obtain lithium cobalt complex oxide (LiCoO$_2$). Next, 91 parts by weight of lithium cobalt complex oxide and 6 parts by weight of graphite as an electrical conductor and 3 parts by weight of polyvinylidene fluoride as a binder were mixed to prepare a cathode mixture. Then, the cathode mixture was dispersed in N-methyl-2-pyrrolidone as a solvent to form cathode mixture slurry. Next, after the cathode mixture slurry was uniformly applied to both sides of the cathode current collector 21A made of strip-shaped aluminum foil with a thickness of 20 μm, and was dried, the cathode mixture layer 21B was formed through compression molding by a roller press so as to form the cathode 21. After that, the cathode lead 25 made of aluminum was attached to one end of the cathode current collector 21A.

Moreover, lithium metal foil with a thickness of 30 μm was attached to the anode current collector 22A made of strip-shaped copper foil with a thickness of 10 μm to form the anode active material layer 22B, thereby the anode 22 was formed.

After the cathode 21 and the anode 22 were formed, the separator 23 made of a microporous polyethylene film with a thickness of 25 μm was prepared, and the anode 22, the separator 23, the cathode 21 and separator 23 were laminated in this order to form a laminate, and the laminate was spirally wound several times to form the spirally wound electrode body 20.

After the spirally wound electrode body 20 was formed, the spirally wound electrode body 20 was sandwiched between a pair of insulating plates 12 and 13, and the anode lead 26 was welded to the battery can 11, and the cathode lead 25 was welded to the safety valve mechanism 15, and then the spirally wound electrode body 20 was contained in the battery can 11 made of nickel-plated iron. After that, the electrolytic solution was injected into the battery can 11 by a decompression method.

As the electrolytic solution, an electrolytic solution formed through dissolving an electrolyte salt at a concentration of 1.0 mol/kg in a solvent including a mixture of a cyclic carbonate derivative having a halogen atom and dimethyl carbonate at a volume ratio of the cyclic carbonate derivative:dimethyl carbonate=30:70 was used. At that time, the cyclic carbonate derivative was 4-fluoro-1,3-dioxolane-2-one in Examples 20-1 through 20-5,4-chloro-1,3-dioxolane-2-one in Example 20-6,4-bromo-1,3 dioxolane-2-one (BrEC) in Example 20-7,4-fluoro-4-methyl-1,3-dioxolane-2-one (FPC) in Example 20-8 and 4-chloro-4-methyl-1,3-dioxolane-2-one (ClPC) in Example 20-9. As the electrolyte salt, 1,1,2,2-tetrafluoroethane-1,3-disulfonimide lithium [1,2-perfluoroethanedisulfonylimide lithium] shown in Chemical Formula 6(4) was used in Example 20-1. In Example 20-2, LiPF$_6$ and 1,1,2,2-tetrafluoroethane-1,3-disulfonimide lithium shown in Chemical Formula 6(4) were used, and the concentrations of LiPF$_6$ and 1,1,2,2-tetrafluoroethane-1,3-disulfonimide lithium in the electrolytic solution were 0.8 mol/kg and 0.2 mol/kg, respectively. In Examples 20-3 and 20-6 through 20-9, LiPF$_6$ and 1,1,2,2,3,3-hexafluoropropane-1,3-disulfonimide lithium [1,3-perfluoropropanedisulfonylimide lithium] shown in Chemical Formula 6(1) were used, and the concentrations of LiPF$_6$ and 1,1,2,2,3,3-hexafluoropropane-1,3-disulfonimide lithium in the electrolytic solution were 0.8 mol/kg and 0.2 mol/kg, respectively. In Example 20-4, LiPF$_6$ and 1,1,2,2,3,3,4,4-octafluorobutyl-1,3-disulfonimide lithium [1,4-perfluorobutanedisulfonylimide lithium] shown in Chemical Formula 6(6) were used, and the concentrations of LiPF$_6$ and 1,1,2,2,3,3,4,4-octafluorobutyl-1,3-disulfonimide lithium in the electrolytic solution were 0.8 mol/kg and 0.2 mol/kg, respectively. In Example 20-5, LiPF$_6$ and 2,2,3,3,4,4-hexafluoroglutarimide lithium [perfluoroheptanediacidimide lithium] shown in Chemical Formula 6(2) were used, and the concentrations of $LiPF_6$ and 2,2,3,3,4,4-hexafluoroglutarimide lithium in the electrolytic solution were 0.8 mol/kg and 0.2 mol/kg, respectively.

After the electrolytic solution was injected into the battery can 11, the battery cover 14 was caulked to the battery can 11 by the gasket 17 of which the surface is coated with asphalt, thereby cylindrical type secondary batteries with a diameter of 14 mm and a height of 65 mm of Examples 20-1 through 20-9 were obtained.

As Comparative Examples 20-1 and 20-2 relative to Examples 20-1 through 20-9, secondary batteries were formed as in the case of Examples 20-1 through 20-9, except that an electrolytic solution forming through dissolving $LiPF_6$ at a concentration of 0.8 mol/kg and 1,1,2,2-tetrafluoroethane-1,3-disulfonimide lithium shown in Chemical Formula 6(4) at a concentration of 0.2 mol/kg as electrolyte salts in a solvent including a mixture of ethylene carbonate and dimethyl carbonate at a volume ratio of ethylene carbonate:dimethyl carbonate=30:70, or an electrolytic solution forming through dissolving $LiPF_6$ at a concentration of 1.0 mol/kg as an electrolyte salt in a solvent including a mixture of 4-fluoro-1,3-dioxolane-2-one and dimethyl carbonate at a volume ratio of 4-fluoro-1,3-dioxolane-2-one:dimethyl carbonate=30:70 was used.

Moreover, as Comparative Examples 20-3 through 20-6, secondary batteries were formed as in the case of Examples 20-1 through 20-9, except that artificial graphite was used as an anode material, and the composition of the electrolytic solution was changed. At that time, the anode was formed through the following steps. After 90 parts by weight of artificial graphite powder and 10 parts by weight of polyvinylidene fluoride as a binder were mixed to form a mixture, N-methyl-2-pyrrolidone as a solvent was added to the mixture. Next, the mixture was uniformly applied to both sides of the anode current collector 22A made of strip-shaped copper foil with a thickness of 15 μm, and dried, and then the anode active material layer 22B was formed through compression molding by a roller press so as to form the anode 22. Further, as the electrolytic solution, an electrolytic solution formed through dissolving $LiPF_6$ at a concentration of 1.0 mol/kg as an electrolyte salt in a solvent including a mixture of ethylene carbonate and dimethyl carbonate at a volume ratio of ethylene carbonate:dimethyl carbonate=30:70, an electrolytic solution formed through dissolving $LiPF_6$ at a concentration of 0.8 mol/kg and 1,1,2,2-tetrafluoroethane-1,3-disulfonimide lithium shown in Chemical Formula 6(4) at a concentration of 0.2 mol/kg as electrolyte salts in a solvent including a mixture of ethylene carbonate and dimethyl carbonate at a volume ratio of ethylene carbonate:dimethyl carbonate=30:70, an electrolytic solution formed through dissolving $LiPF_6$ at a concentration of 1.0 mol/kg as an electrolyte salt in a solvent including a mixture of 4-fluoro-1,3-dioxolane-2-one and dimethyl carbonate at a volume ratio of 4-fluoro-1,3-dioxolane-2-one:dimethyl carbonate=30:70, or an electrolytic solution formed through dissolving $LiPF_6$ at a concentration of 0.8 mol/kg and 1,1,2,2-tetrafluoroethane-1,3-disulfonimide lithium shown in Chemical Formula 6(4) at a concentration of 0.2 mol/kg as electrolyte salts in a solvent including a mixture of 4-fluoro-1,3-dioxolane-2-one and dimethyl carbonate at a volume ratio of 4-fluoro-1,3-dioxolane-2-one:dimethyl carbonate=30:70 was used. The area density ratio between the cathode 21 and the anode 22 was designed so that the capacity of the anode 22 was represented by a capacity component by insertion and extraction of lithium.

The cycle characteristics of the obtained secondary batteries of Examples 20-1 through 20-9 and Comparative Examples 20-1 through 20-6 were determined through the following steps.

As a charge-discharge cycle, after the secondary batteries were charged at a constant current of 100 mA until the battery voltage reached 4.2 V, the secondary batteries were charged at a constant voltage of 4.2 V until the current reached 1 mA, and then the secondary batteries were discharged at a constant current of 300 mA until the battery voltage reached 3.0 V. The charge-discharge cycle was repeated, and the cycle characteristics were determined as the capacity retention ratio in the 100th cycle to the initial discharge capacity (the discharge capacity in the first cycle), that is, (discharge capacity in the 100th cycle/initial discharge capacity)×100(%). The obtained results are shown in Table 30.

TABLE 30

Battery shape: cylindrical type
Maximum charging voltage: 4.20 V

| | ANODE ACTIVE MATERIAL | SOLVENT | ELECTROLYTE SALT | DISCHARGE CAPACITY RETENTION RATIO (%) |
|---|---|---|---|---|
| EXAMPLE 20-1 | LITHIUM METAL | FEC + DMC | CHEMICAL FORMULA 6(4) | 60 |
| EXAMPLE 20-2 | | FEC + DMC | $LiPF_6$ + CHEMICAL FORMULA 6(4) | 65 |
| EXAMPLE 20-3 | | FEC + DMC | $LiPF_6$ + CHEMICAL FORMULA 6(1) | 68 |
| EXAMPLE 20-4 | | FEC + DMC | $LiPF_6$ + CHEMICAL FORMULA 6(6) | 62 |
| EXAMPLE 20-5 | | FEC + DMC | $LiPF_6$ + CHEMICAL FORMULA 6(2) | 60 |
| EXAMPLE 20-6 | | CIEC + DMC | $LiPF_6$ + CHEMICAL FORMULA 6(1) | 64 |
| EXAMPLE 20-7 | | BrEC + DMC | $LiPF_6$ + CHEMICAL FORMULA 6(1) | 60 |
| EXAMPLE 20-8 | | FPC + DMC | $LiPF_6$ + CHEMICAL FORMULA 6(1) | 62 |
| EXAMPLE 20-9 | | CIPC + DMC | $LiPF_6$ + CHEMICAL FORMULA 6(1) | 60 |

TABLE 30-continued

Battery shape: cylindrical type
Maximum charging voltage: 4.20 V

| | ANODE ACTIVE MATERIAL | SOLVENT | ELECTROLYTE SALT | DISCHARGE CAPACITY RETENTION RATIO (%) |
|---|---|---|---|---|
| COMPARATIVE EXAMPLE 20-1 | LITHIUM METAL | EC + DMC | LiPF$_6$ + CHEMICAL FORMULA 6(4) | 40 |
| COMPARATIVE EXAMPLE 20-2 | | FEC + DMC | LiPF$_6$ | 53 |
| COMPARATIVE EXAMPLE 20-3 | CARBON | EC + DMC | LiPF$_6$ | 91 |
| COMPARATIVE EXAMPLE 20-4 | | EC + DMC | LiPF$_6$ + CHEMICAL FORMULA 6(4) | 94 |
| COMPARATIVE EXAMPLE 20-5 | | FEC + DMC | LiPF$_6$ | 89 |
| COMPARATIVE EXAMPLE 20-6 | | FEC + DMC | LiPF$_6$ + CHEMICAL FORMULA 6(4) | 92 |

FEC: 4-fluoro-1,3-dioxolane-2-one
ClEC: 4-chloro-1,3-dioxolane-2-one
BrEC: 4-bromo-1,3-dioxolane-2-one
FPC: 4-fluoro-4-methyl-1,3-dioxolane-2-one
ClPC: 4-chloro-4-methyl-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium
CHEMICAL FORMULA 6(2): 2,2,3,3,4,4-hexafluoroglutarimide lithium
CHEMICAL FORMULA 6(4): 1,1,2,2-tetrafluoroethane-1,3-disulfonimide lithium
CHEMICAL FORMULA 6(6): 1,1,2,2,3,3,4,4-octafluorobutyl-1,3-disulfonimide lithium It was obvious from Table 30 that in Example 20-2 in which 4-fluoro-1,3-dioxolane-2-one and 1,1,2,2-tetrafluoroethane-1,3-disulfonimide lithium were used, the discharge capacity retention ratio was remarkably improved, compared to Comparative Example 20-1 in which 4-fluoro-1,3-dioxolane-2-one was not used or Comparative Example 20-2 in which 1,1,2,2-tetrafluoroethane-1,3-disulfonimide lithium was not used. Moreover, in Examples 20-3 through 20-9 in which another cyclic carbonate derivative having a halogen atom instead of 4-fluoro-1,3-dioxolane-2-one and another cyclic imide salt instead of 1,1,2,2-tetrafluoroethane-1,3-disulfonimide lithium were used, a high discharge capacity retention ratio was obtained in a like manner. Further, in Example 20-2 in which another metal salt was added, the discharge capacity retention ratio was improved more than in Example 20-1 in which only the cyclic imide salt was used. In addition, in Comparative Examples 20-3 through 20-6 in which artificial graphite was used as the anode material, even though the cyclic carbonate derivative having a halogen atom and the cyclic imide salt were mixed, the discharge capacity retention ratio was not improved.

In other words, it was found out that in the case where lithium metal was used as the anode active material, when the cyclic carbonate derivative having a halogen atom and the cyclic imide salt were used, the cycle characteristics could be improved, and another light metal salt was preferably mixed in addition to the cyclic imide salt.

Examples 21-1 to 21-4

Secondary batteries were formed as in the case of Example 20-3, except that the content of 4-fluoro-1,3-dioxolane-2-one in the solvent was 1 vol %, 5 vol %, 20 vol % or 50 vol %. At that time, in Example 21-1, the solvent was formed through mixing 4-fluoro-1,3-dioxolane-2-one and dimethyl carbonate at a volume ratio of 4-fluoro-1,3-dioxolane-2-one:dimethyl carbonate=50:50. In Examples 21-2, 21-3 and 21-4, the solvent was formed through mixing 4-fluoro-1,3-dioxolane-2-one, ethylene carbonate and dimethyl carbonate at a volume ratio of 4-fluoro-1,3-dioxolane-2-one:ethylene carbonate:dimethyl carbonate=20:10:70, 5:25:70, and 1:29:70, respectively.

The cycle characteristics of the obtained secondary batteries of Examples 21-1 through 21-4 were measured as in the case of Examples 20-1 through 20-9. The results are shown in Table 31 together with the result of Example 20-3.

TABLE 31

Battery shape: cylindrical type
Maximum charging voltage: 4.20 V

| | ANODE ACTIVE MATERIAL | SOLVENT | | | ELECTROLYTE SALT | DISCHARGE CAPACITY RETENTION RATIO (%) |
|---|---|---|---|---|---|---|
| | | FEC | EC | DMC | | |
| EXAMPLE 21-1 | LITHIUM METAL | 50 | 0 | 50 | LiPF$_6$ + CHEMICAL FORMULA 6(1) | 62 |
| EXAMPLE 20-3 | | 30 | 0 | 70 | | 68 |

TABLE 31-continued

Battery shape: cylindrical type
Maximum charging voltage: 4.20 V

| ANODE ACTIVE MATERIAL | SOLVENT | | | ELECTROLYTE SALT | DISCHARGE CAPACITY RETENTION RATIO (%) |
|---|---|---|---|---|---|
| | FEC | EC | DMC | | |
| EXAMPLE 21-2 | 20 | 10 | 70 | | 65 |
| EXAMPLE 21-3 | 5 | 25 | 70 | | 60 |
| EXAMPLE 21-4 | 1 | 29 | 70 | | 57 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium It was obvious from Table 31 that there was a tendency that as the content of 4-fluoro-1,3-dioxolane-2-one increased, the discharge capacity retention ratio increased to a maximum value, then decreased.

In other words, it was found out that the content of the cyclic carbonate derivative having a halogen atom in the solvent was preferably 50 vol % or less.

Examples 22-1 to 22-4

Secondary batteries were formed as in the case of Example 20-2, except that an electrolytic solution formed through further dissolving $LiBF_4$ or $LiB(OCOCF_3)_4$ as an electrolyte salt at a concentration of 0.2 mol/kg was used. At that time, the cyclic carbonate derivative having a halogen atom was 4-fluoro-1,3-dioxolane-2-one in Examples 22-1 and 22-2, and 4-chloro-1,3-dioxolane-2-one in Examples 22-3 and 22-4.

The cycle characteristics of the secondary batteries of Examples 22-11 through 22-4 were measured as in the case of Examples 20-1 through 20-9. The results are shown in Table 32 together with the result of Example 20-2.

It was obvious from Table 32 that in Examples 22-1 through 22-4 in which $LiBF_4$ or $LiB(OCOCF_3)_4$ was further mixed, the discharge capacity retention ratio was improved, compared to Example 20-2 in which neither of them was mixed.

In other words, it was found out that in addition to the cyclic imide salt, $LiPF_6$ and another light metal salt were more preferably mixed.

Examples 23-1 to 23-20

Secondary batteries were formed as in the case of Example 20-3, except that as a solvent, in addition to 4-fluoro-1,3-dioxolane-2-one and dimethyl carbonate, 1,3-dioxol-2-one shown in Chemical Formula 3(1), 4-vinyl-1,3-dioxolane-2-one shown in Chemical Formula 3(2), 1,3-propane sultone shown in Chemical Formula 4(1) or 1,3-propene sultone shown in Chemical Formula 4(2) was used. The composition of the solvent was changed as shown in Table 33.

The obtained secondary batteries of the examples were charged and discharged at 25° C. and 50° C. under the same charge-discharge conditions as those in Example 20-3, and the cycle characteristics in the 100th cycle of the secondary batteries were determined. The results are shown in Table 33.

TABLE 32

Battery shape: cylindrical type
Maximum charging voltage: 4.20 V

| | ANODE ACTIVE MATERIAL | SOLVENT | ELECTROLYTE SALT | DISCHARGE CAPACITY RETENTION RATIO (%) |
|---|---|---|---|---|
| EXAMPLE 20-2 | LITHIUM METAL | FEC + DMC | $LiPF_6$ + CHEMICAL FORMULA 6(4) | 65 |
| EXAMPLE 22-1 | | | $LiPF_6$ + CHEMICAL FORMULA 6(4) + $LiBF_4$ | 72 |
| EXAMPLE 22-2 | | | $LiPF_6$ + CHEMICAL FORMULA 6(4) + $LiB(OCOCF_3)_4$ | 74 |
| EXAMPLE 22-3 | | CIEC + DMC | $LiPF_6$ + CHEMICAL FORMULA 6(4) + $LiBF_4$ | 71 |
| EXAMPLE 22-4 | | | $LiPF_6$ + CHEMICAL FORMULA 6(4) + $LiB(OCOCF_3)_4$ | 70 |

FEC: 4-fluoro-1,3-dioxolane-2-one
CIEC: 4-chloro-1,3-dioxolane-2-one
DMC: dimethyl carbonate
CHEMICAL FORMULA 6(4): 1,1,2,2-tetrafluoroethane-1,3-disulfonimide lithium

TABLE 33

Battery shape: cylindrical type
Maximum charging voltage: 4.20 V

| | ANODE ACTIVE MATERIAL | SOLVENT (WT %) | | | | | | ELECTROLYTE SALT | DISCHARGE CAPACITY RETENTION RATIO (%) | |
|---|---|---|---|---|---|---|---|---|---|---|
| | | FEC | DMC | VC | VEC | PS | PRS | | 25° C. | 50° C. |
| EXAMPLE 20-3 | LITHIUM | 30 | 70 | — | — | — | — | LiPF$_6$ + CHEMICAL | 68 | 65 |
| EXAMPLE 23-1 | METAL | 30 | 69.95 | 0.05 | — | — | — | FORMULA 6(1) | 68 | 66 |
| EXAMPLE 23-2 | | 30 | 69.9 | 0.1 | — | — | — | | 69 | 69 |
| EXAMPLE 23-3 | | 30 | 68 | 2 | — | — | — | | 70 | 72 |
| EXAMPLE 23-4 | | 30 | 60 | 10 | — | — | — | | 70 | 70 |
| EXAMPLE 23-5 | | 30 | 50 | 20 | — | — | — | | 68 | 68 |
| EXAMPLE 23-6 | | 30 | 69.95 | — | 0.05 | — | — | | 68 | 67 |
| EXAMPLE 23-7 | | 30 | 69.9 | — | 0.1 | — | — | | 69 | 70 |
| EXAMPLE 23-8 | | 30 | 68 | — | 2 | — | — | | 70 | 73 |
| EXAMPLE 23-9 | | 30 | 60 | — | 10 | — | — | | 70 | 71 |
| EXAMPLE 23-10 | | 30 | 50 | — | 20 | — | — | | 68 | 69 |
| EXAMPLE 23-11 | | 30 | 69.99 | — | — | 0.01 | — | | 68 | 66 |
| EXAMPLE 23-12 | | 30 | 69.95 | — | — | 0.05 | — | | 68 | 68 |
| EXAMPLE 23-13 | | 30 | 69 | — | — | 1 | — | | 69 | 70 |
| EXAMPLE 23-14 | | 30 | 67 | — | — | 3 | — | | 69 | 68 |
| EXAMPLE 23-15 | | 30 | 65 | — | — | 5 | — | | 68 | 66 |
| EXAMPLE 23-16 | | 30 | 69.99 | — | — | — | 0.01 | | 68 | 67 |
| EXAMPLE 23-17 | | 30 | 69.95 | — | — | — | 0.05 | | 68 | 69 |
| EXAMPLE 23-18 | | 30 | 69 | — | — | — | 1 | | 70 | 71 |
| EXAMPLE 23-19 | | 30 | 67 | — | — | — | 3 | | 69 | 69 |
| EXAMPLE 23-20 | | 30 | 65 | — | — | — | 5 | | 68 | 67 |

FEC: 4-fluoro-1,3-dioxolane-2-one
DMC: dimethyl carbonate
VC: 1,3-dioxol-2-one
VEC: 4-vinyl-1,3-dioxolane-2-one
PS: 1,3-propane sultone
PRS: 1,3-propene sultone
CHEMICAL FORMULA 6(1): 1,1,2,2,3,3-hexafluoropropane-1,3-disulfonimide lithium It was obvious from Table 33 that when 1,3-dioxol-2-one, 4-vinyl-1,3-dioxolane-2-one, 1,3-propane sultone or 1,3-propene sultone was mixed, the discharge capacity retention ratio was improved, and in particular, at 50° C., a higher effect was observed.

In other words, it was found out that when a cyclic carbonate having an unsaturated bond or a sultone was used as a solvent, the cycle characteristics could be further improved, and in particular, the cycle characteristics under high temperature conditions could be effectively improved.

Examples 24-1 to 24-5

Secondary batteries in which a capacity component by insertion and extraction of lithium and a capacity component by precipitation and dissolution of lithium metal were included, and which was represented by the sum of them were formed. At that time, the secondary batteries were formed as in the case of Examples 20-1 through 20-9, except that artificial graphite was used as an anode material, and the anode 22 was formed as in the case of Comparative Examples 20-3 through 20-6. Moreover, the filling amounts of the cathode material and the anode materials were designed so that the capacity of the anode 22 included a capacity component by insertion and extraction of lithium and a capacity component by precipitation and dissolution of lithium, and was represented by the sum of them. Further, as the electrolytic solution, an electrolytic solution formed through dissolving 1,1,2,2,3,3-hexafluoropropane-1,3-disulfonimide lithium shown in Chemical Formula 6(1) at a concentration of 0.2 mol/kg or LiPF$_6$ at a concentration of 0.8 mol/kg in a solvent including a mixture of 4-fluoro-1,3-dioxolane-2-one, ethylene carbonate and dimethyl carbonate at a ratio shown in Table 34 was used.

TABLE 34

Battery shape: cylindrical type
Maximum charging voltage: 4.20 V

| | ANODE ACTIVE MATERIAL (WT %) | SOLVENT (VOL %) | | | ELECTROLYTE SALT | DISCHARGE CAPACITY RETENTION RATIO (%) |
|---|---|---|---|---|---|---|
| | | FEC | EC | DMC | | |
| EXAMPLE 24-1 | LITHIUM | 50 | 0 | 50 | LiPF$_6$ + CHEMICAL | 80 |
| EXAMPLE 24-2 | METAL + CARBON | 30 | 0 | 70 | FORMULA 6(1) | 84 |
| EXAMPLE 24-3 | | 20 | 10 | 70 | | 82 |

TABLE 34-continued

Battery shape: cylindrical type
Maximum charging voltage: 4.20 V

| | ANODE ACTIVE MATERIAL | SOLVENT (VOL %) | | | ELECTROLYTE SALT | DISCHARGE CAPACITY RETENTION RATIO (%) |
|---|---|---|---|---|---|---|
| | (WT %) | FEC | EC | DMC | | |
| EXAMPLE 24-4 | | 5 | 25 | 70 | | 81 |
| EXAMPLE 24-5 | | 1 | 29 | 70 | | 77 |
| COMPARATIVE EXAMPLE 24-1 | LITHIUM METAL + CARBON | 0 | 30 | 70 | LiPF$_6$ + CHEMICAL FORMULA 6(1) | 68 |
| COMPARATIVE EXAMPLE 24-2 | | 30 | 0 | 70 | LiPF$_6$ | 74 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium As Comparative Example 24-1 relative to Examples 24-1 through 24-5, a secondary battery was formed as in the case of Examples 24-1 through 24-5, except that an electrolytic solution formed through dissolving 1,3-perfluoropropane-disulfonylimide lithium shown in Chemical Formula 6(1) at a concentration of 0.2 mol/kg or LiPF$_6$ at a concentration of 0.8 mol/kg as an electrolyte salt in a solvent including a mixture of ethylene carbonate and dimethyl carbonate at a volume ratio of ethylene carbonate:dimethyl carbonate=30:70 was used. Moreover, as Comparative Example 24-2, a secondary battery was formed as in the case of Examples 24-1 through 24-5, except that an electrolytic solution formed through dissolving LiPF$_6$ as an electrolyte salt at a concentration of 1.0 mol/kg in a solvent including a mixture of 4-fluoro-1,3-dioxolane-2-one and dimethyl carbonate at a volume ratio of 4-fluoro-1,3-dioxolane-2-one:dimethyl carbonate=30:70 was used.

The cycle characteristics of the obtained secondary batteries of Examples 24-1 through 24-5 and Comparative Examples 24-1 and 24-2 were measured as in the case of Examples 20-1 through 20-9. The results are shown in Table 34.

Moreover, in the secondary batteries of Examples 24-1 through 24-5 and Comparative Examples 24-1 and 24-2, the existence of lithium metal and lithium ions on the anode 22 was checked by visual inspection and $^7$Li nuclear magnetic resonance spectroscopy.

As the results by the $^7$Li nuclear magnetic resonance spectroscopy, in the secondary batteries of Examples 24-1 through 24-5 and Comparative Examples 24-1 and 24-2, a peak attributed to lithium metal was observed around 265 ppm in a full charge state, and a peak attributed to lithium ions was observed around 44 ppm. These peak positions are values relative to external standard lithium chloride. On the other hand, in a full discharge state, no peak attributed to lithium metal was observed. Moreover, lithium metal was observed only in a full charge state by visual inspection. In other words, it was confirmed that the capacity of the anode 22 included a capacity component by insertion and extraction of lithium and a capacity component by precipitation and dissolution of lithium, and was represented by the sum of them.

It was obvious from Table 34 that as in the case of Examples 20-1 through 20-9, in Examples 24-1 through 24-5 in which the cyclic carbonate derivative having a halogen atom and the cyclic imide salt were used, the discharge capacity retention ratio was improved, compared to Comparative Example 24-1 in which the cyclic carbonate derivative having a halogen atom was not used and Comparative Example 24-2 in which the cyclic imide salt was not used. Moreover, there was a tendency that as the content of the cyclic carbonate derivative having a halogen atom increased, the discharge capacity retention ratio increased to a maximum value, then decreased.

In other words, it was found out that in the secondary battery in which the capacity of the anode 22 included a capacity component by insertion and extraction of lithium and a capacity component by precipitation and dissolution of lithium, and was represented by the sum of them, when the cyclic carbonate derivative having a halogen atom and the cyclic imide salt were used, the cycle characteristics could be improved, and the content of the cyclic carbonate derivative having a halogen atom in the solvent was preferably 50 vol % or less.

Examples 25-1 to 25-20

Secondary batteries were formed as in the case of Example 24-2, except that in addition to 4-fluoro-1,3-dioxolane-2-one and dimethyl carbonate, 1,3-dioxol-2-one shown in Chemical Formula 3(1), 4-vinyl-1,3-dioxolane-2-one shown in Chemical Formula 3(2), 1,3-propane sultone shown in Chemical Formula 4(1) or 1,3-propene sultone shown in Chemical Formula 4(2) was used as a solvent. The composition of the solvent was changed as shown in Table 35.

The obtained secondary batteries of the examples were charged and discharged at 25° C. and 50° C. under the same charge-discharge conditions as those in Example 24-2, and the cycle characteristics in the 100th cycle were determined. The results are shown in Table 35.

TABLE 35

Battery shape: cylindrical type
Maximum charging voltage: 4.20 V

| | ANODE ACTIVE MATERIAL | SOLVENT (WT %) | | | | | | ELECTROLYTE SALT | DISCHARGE CAPACITY RETENTION RATIO (%) | |
|---|---|---|---|---|---|---|---|---|---|---|
| | | FEC | DMC | VC | VEC | PS | PRS | | 25° C. | 50° C. |
| EXAMPLE 24-2 | LITHIUM | 30 | 70 | — | — | — | — | LiPF$_6$ + CHEMICAL | 84 | 82 |
| EXAMPLE 25-1 | METAL + CARBON | 30 | 69.95 | 0.05 | — | — | — | FORMULA 6(1) | 84 | 83 |
| EXAMPLE 25-2 | | 30 | 69.9 | 0.1 | — | — | — | | 86 | 85 |
| EXAMPLE 25-3 | | 30 | 68 | 2 | — | — | — | | 87 | 88 |
| EXAMPLE 25-4 | | 30 | 60 | 10 | — | — | — | | 86 | 85 |
| EXAMPLE 25-5 | | 30 | 50 | 20 | — | — | — | | 84 | 84 |
| EXAMPLE 25-6 | | 30 | 69.95 | — | 0.05 | — | — | | 85 | 83 |
| EXAMPLE 25-7 | | 30 | 69.9 | — | 0.1 | — | — | | 87 | 86 |
| EXAMPLE 25-8 | | 30 | 68 | — | 2 | — | — | | 88 | 90 |
| EXAMPLE 25-9 | | 30 | 60 | — | 10 | — | — | | 86 | 87 |
| EXAMPLE 25-10 | | 30 | 50 | — | 20 | — | — | | 84 | 85 |
| EXAMPLE 25-11 | | 30 | 69.99 | — | — | 0.01 | — | | 84 | 83 |
| EXAMPLE 25-12 | | 30 | 69.95 | — | — | 0.05 | — | | 85 | 84 |
| EXAMPLE 25-13 | | 30 | 69 | — | — | 1 | — | | 86 | 86 |
| EXAMPLE 25-14 | | 30 | 67 | — | — | 3 | — | | 85 | 84 |
| EXAMPLE 25-15 | | 30 | 65 | — | — | 5 | — | | 84 | 83 |
| EXAMPLE 25-16 | | 30 | 69.99 | — | — | — | 0.01 | | 85 | 84 |
| EXAMPLE 25-17 | | 30 | 69.95 | — | — | — | 0.05 | | 86 | 86 |
| EXAMPLE 25-18 | | 30 | 69 | — | — | — | 1 | | 87 | 88 |
| EXAMPLE 25-19 | | 30 | 67 | — | — | — | 3 | | 85 | 86 |
| EXAMPLE 25-20 | | 30 | 65 | — | — | — | 5 | | 84 | 85 |

FEC: 4-fluoro-1,3-dioxolane-2-one
DMC: dimethyl carbonate
VC: 1,3-dioxol-2-one
VEC: 4-vinyl-1,3-dioxolane-2-one
PS: 1,3-propane sultone
PRS: 1,3-propene sultone
CHEMICAL FORMULA 6(1): 1,1,2,2,3,3-hexafluoropropane-1,3-disulfonimide lithium It was obvious from Table 35 that when 1,3-dioxol-2-one, 4-vinyl-1,3-dioxolane-2-one, 1,3-propane sultone or 1,3-propene sultone was mixed, the discharge capacity retention ratio was improved, and in particular, a higher effect was observed at 50° C.

In other words, it was found out that when a cyclic carbonate having an unsaturated bond or a sultone was used as a solvent, the cycle characteristics could be further improved, and in particular, the cycle characteristics under high temperature conditions could be effectively improved.

Examples 26-1 to 26-4, 27-1 to 27-4

Batteries in which the capacity of the anode 22 was represented by precipitation and dissolution of lithium, that is, lithium metal secondary batteries were formed.

In Examples 26-1 through 26-4, the secondary batteries were formed through the following steps. At first, the cathode lead 31 and the anode lead 32 were attached to the cathode 33 and the anode 34 which were formed as in the case of Examples 20-1 through 20-9, and the cathode 33 and the anode 34 were laminated with the separator 35 in between to form a laminate. Next, the laminate was spirally wound, and was sandwiched between package members 40 made of a laminate film, and the electrolytic solution was injected and sealed, thereby the secondary batteries were formed. The laminate film included 30 μm-thick nylon, 40 μm-thick aluminum and 30 μm-thick cast polypropylene in order from outside so that the laminate film had a thickness of 100 μm in total. The cathode current collector 33A was made of strip-shaped aluminum foil with a thickness of 12 μm.

Moreover, in Examples 27-1 through 27-4, secondary batteries were formed as in the case of Examples 20-1 through 20-9, except that a hollow prismatic container measuring 30 mm wide×48 mm high×5 mm thick was used. The cathode current collector 33A was made of strip-shaped aluminum foil with a thickness of 12 μm.

In the examples, an electrolytic solution formed through dissolving 1,1,2,2-tetrafluoroethane-1,3-disulfonimide lithium shown in Chemical Formula 6(4) or 1,1,2,2,3,3-hexafluoropropane-1,3-disulfonimide lithium shown in Chemical Formula 6(1) at a concentration of 0.2 mol/kg and LiPF$_6$ at a concentration of 0.8 mol/kg in a solvent including a mixture of 4-fluoro-1,3-dioxolane-2-one as a cyclic carbonate derivative having a halogen atom and dimethyl carbonate at a volume ratio of 4-fluoro-1,3-dioxolane-2-one: dimethyl carbonate=30:70, or a solvent including a mixture of 4-chloro-1,3-dioxolane-2-one and dimethyl carbonate at a volume ratio of 4-chloro-1,3-dioxolane-2-one:dimethyl carbonate=50:50 was used.

As Comparative Examples 26-1, 26-2, 27-1 and 27-2 relative to the examples, secondary batteries were formed as in the case of Examples 26-1 through 26-4 and 27-1 through 27-4, except that an electrolytic solution formed through dissolving LiPF$_6$ at a concentration of 0.8 mol/kg and 1,1,2,2-tetrafluoroethane-1,3-disulfonimide lithium shown in Chemical Formula 6(4) at a concentration of 0.2 mol/kg as electrolyte salts in a solvent including a mixture of ethylene carbonate and dimethyl carbonate at a volume ratio of ethylene carbonate:dimethyl carbonate=30:70, or an electrolytic solution formed through dissolving LiPF$_6$ at a concentration of 1.0 mol/kg as an electrolyte salt in a solvent including a mixture of 4-fluoro-1,3-dioxolane-2-one and dimethyl carbonate at a volume ratio of 4-fluoro-1,3-dioxolane-2-one:dimethyl carbonate=30:70 was used.

The cycle characteristics of the obtained secondary batteries of Examples 26-1 through 26-4 and 27-1 through 27-4 and Comparative Examples 26-1, 26-2, 27-1 and 27-2 were measured as in the case of Examples 20-1 through 20-9. The results are shown in Tables 36 and 37.

TABLE 36

Battery shape: laminate type

| | ANODE ACTIVE MATERIAL | SOLVENT | ELECTROLYTE SALT | DISCHARGE CAPACITY RETENTION RATIO (%) |
|---|---|---|---|---|
| EXAMPLE 26-1 | LITHIUM METAL | FEC + DMC | $LiPF_6$ + CHEMICAL FORMULA 6(4) | 64 |
| EXAMPLE 26-2 | | CIEC + DMC | | 60 |
| EXAMPLE 26-3 | | FEC + DMC | $LiPF_6$ + CHEMICAL FORMULA 6(1) | 68 |
| EXAMPLE 26-4 | | CIEC + DMC | | 63 |
| COMPARATIVE EXAMPLE 26-1 | LITHIUM METAL | EC + DMC | $LiPF_6$ + CHEMICAL FORMULA 6(4) | 38 |
| COMPARATIVE EXAMPLE 26-2 | | FEC + DMC | $LiPF_6$ | 45 |

FEC: 4-fluoro-1,3-dioxolane-2-one
CIEC: 4-chloro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium
CHEMICAL FORMULA 6(4): 1,1,2,2-tetrafluoroethane-1,3-disulfonimide lithium

TABLE 37

Battery shape: hollow prismatic shape

| | ANODE ACTIVE MATERIAL | SOLVENT | ELECTROLYTE SALT | DISCHARGE CAPACITY RETENTION RATIO (%) |
|---|---|---|---|---|
| EXAMPLE 27-1 | LITHIUM METAL | FEC + DMC | $LiPF_6$ + CHEMICAL FORMULA 6(4) | 62 |
| EXAMPLE 27-2 | | CIEC + DMC | | 58 |
| EXAMPLE 27-3 | | FEC + DMC | $LiPF_6$ + CHEMICAL FORMULA 6(1) | 67 |
| EXAMPLE 27-4 | | CIEC + DMC | | 64 |
| COMPARATIVE EXAMPLE 27-1 | LITHIUM METAL | EC + DMC | $LiPF_6$ + CHEMICAL FORMULA 6(4) | 42 |
| COMPARATIVE EXAMPLE 27-2 | | FEC + DMC | $LiPF_6$ | 48 |

FEC: 4-fluoro-1,3-dioxolane-2-one
CIEC: 4-chloro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium
CHEMICAL FORMULA 6(4): 1,1,2,2-tetrafluoroethane-1,3-disulfonimide lithium It was obvious from Tables 36 and 37 that as in the case of Examples 20-1 through 20-9, in Examples 26-1 through 26-4 and 27-1 through 27-4 in which the cyclic carbonate derivative having a halogen atom and the cyclic imide salt were used, a higher capacity retention ratio was obtained, compared to Comparative Examples 26-1 and 27-1 in which the cyclic carbonate derivative having a halogen atom was not used and Comparative Examples 26-2 and 27-2 in which the cyclic imide salt was not used.

In other words, it was found out that even in the case where a package member with any other shape was used, when the cyclic carbonate derivative having a halogen atom and the cyclic imide salt were used, the cycle characteristics could be improved.

Examples 28-1 to 28-4, 29-1 to 29-4

Secondary batteries were formed as in the case of Examples 26-3 and 27-3, except that the content of the 4-fluoro-1,3-dioxolane-2-one in the solvent was changed to 1 vol %, 5 vol %, 20 vol % or 50 vol %, that is, the electrolytic solutions as those in Examples 21-1 through 21-4 were used.

The cycle characteristics of the obtained secondary batteries of Examples 28-1 through 28-4 and 29-1 though 29-4 were measured as in the case of Examples 20-1 through 20-9. The results are shown in Tables 38 and 39 together with the results of Examples 26-3 and 27-3.

TABLE 38

Battery shape: laminate type

| | ANODE ACTIVE MATERIAL | SOLVENT (VOL %) | | | ELECTROLYTE SALT | DISCHARGE CAPACITY RETENTION RATIO (%) |
|---|---|---|---|---|---|---|
| | | FEC | EC | DMC | | |
| EXAMPLE 28-1 | LITHIUM METAL | 50 | 0 | 50 | $LiPF_6$ + CHEMICAL FORMULA 6(1) | 65 |
| EXAMPLE 26-3 | | 30 | 0 | 70 | | 68 |
| EXAMPLE 28-2 | | 20 | 10 | 70 | | 67 |
| EXAMPLE 28-3 | | 5 | 25 | 70 | | 62 |
| EXAMPLE 28-4 | | 1 | 29 | 70 | | 61 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium

TABLE 39

Battery shape: hollow prismatic shape

| | ANODE ACTIVE MATERIAL | SOLVENT (VOL %) | | | ELECTROLYTE SALT | DISCHARGE CAPACITY RETENTION RATIO (%) |
|---|---|---|---|---|---|---|
| | | FEC | EC | DMC | | |
| EXAMPLE 29-1 | LITHIUM METAL | 50 | 0 | 50 | $LiPF_6$ + CHEMICAL FORMULA 6(1) | 64 |
| EXAMPLE 27-3 | | 30 | 0 | 70 | | 67 |
| EXAMPLE 29-2 | | 20 | 10 | 70 | | 66 |
| EXAMPLE 29-3 | | 5 | 25 | 70 | | 60 |
| EXAMPLE 29-4 | | 1 | 29 | 70 | | 59 |

FEC: 4-fluoro-1,3-dioxolane-2-one
EC: ethylene carbonate
DMC: dimethyl carbonate
CHEMICAL FORMULA 6(1): 1,1,2,2,3,3-hexafluoropropane-1,3-disulfonimide lithium It was obvious from Tables 38 and 39 that as in the case of Examples 21-1 through 21-4, there was a tendency that as the content of 4-fluoro-1,3-dioxolane-2-one increased, the discharge capacity retention ratio increased to a maximum value, then decreased.

In other words, it was found out that even in the case where another package member was used, the content of the cyclic carbonate derivative having a halogen atom in the solvent was preferably 50 vol % or less.

Examples 30-1 to 30-4, 31-1 to 31-4

Secondary batteries were formed as in the case of Examples 26-1 and 27-1, except that an electrolytic solution formed through further dissolving $LiBF_4$ or $LiB(OCOCF_3)_4$ as an electrolyte salt at a concentration of 0.2 mol/kg was used, that is, the same electrolytic solutions as those in Examples 22-1 through 22-4 were used.

The cycle characteristics of the obtained secondary batteries of Examples 30-1 through 30-4 and 31-1 through 31-4 were measured as in the case of Examples 20-1 through 20-9. The results are shown in Tables 40 and 41 together with the results of Examples 26-1 and 27-1.

TABLE 40

Battery shape: laminate type

| | ANODE ACTIVE MATERIAL | SOLVENT | ELECTROLYTE SALT | DISCHARGE CAPACITY RETENTION RATIO (%) |
|---|---|---|---|---|
| EXAMPLE 26-1 | LITHIUM METAL | FEC + DMC | $LiPF_6$ + CHEMICAL FORMULA 6(4) | 64 |
| EXAMPLE 30-1 | | | $LiPF_6$ + CHEMICAL FORMULA 6(4) + $LiBF_4$ | 68 |
| EXAMPLE 30-2 | | | $LiPF_6$ + CHEMICAL FORMULA 6(4) + $LiB(OCOCF_3)_4$ | 70 |
| EXAMPLE 30-3 | | CIEC + DMC | $LiPF_6$ + CHEMICAL FORMULA 6(4) + $LiBF_4$ | 65 |
| EXAMPLE 30-4 | | | $LiPF_6$ + CHEMICAL FORMULA 6(4) + $LiB(OCOCF_3)_4$ | 68 |

FEC: 4-fluoro-1,3-dioxolane-2-one
CIEC: 4-chloro-1,3-dioxolane-2-one
DMC: dimethyl carbonate
CHEMICAL FORMULA 6(4): 1,1,2,2-tetrafluoroethane-1,3-disulfonimide lithium

TABLE 41

Battery shape: hollow prismatic shape

| | ANODE ACTIVE MATERIAL | SOLVENT | ELECTROLYTE SALT | DISCHARGE CAPACITY RETENTION RATIO (%) |
|---|---|---|---|---|
| EXAMPLE 27-1 | LITHIUM METAL | FEC + DMC | LiPF$_6$ + CHEMICAL FORMULA 6(4) | 62 |
| EXAMPLE 31-1 | | | LiPF$_6$ + CHEMICAL FORMULA 6(4) + LiBF$_4$ | 69 |
| EXAMPLE 31-2 | | | LiPF$_6$ + CHEMICAL FORMULA 6(4) + LiB(OCOCF$_3$)$_4$ | 75 |
| EXAMPLE 31-3 | | CIEC + DMC | LiPF$_6$ + CHEMICAL FORMULA 6(4) + LiBF$_4$ | 66 |
| EXAMPLE 31-4 | | | LiPF$_6$ + CHEMICAL FORMULA 6(4) + LiB(OCOCF$_3$)$_4$ | 72 |

FEC: 4-fluoro-1,3-dioxolane-2-one
CIEC: 4-chloro-1,3-dioxolane-2-one
DMC: dimethyl carbonate
CHEMICAL FORMULA 6(4): 1,1,2,2-tetrafluoroethane-1,3-disulfonimide lithium It was obvious from Tables 40 and 41 that as in the case of Examples 22-1 through 22-4, in Examples 30-1 through 30-4 and 31-1 through 31-4 in which LiBF$_4$ or LiB(OCOCF$_3$)$_4$ was further mixed, the discharge capacity retention ratio was improved, compared to Examples 26-1 and 27-1 in which neither of them was mixed.

In other words, it was found out that even in the case where another package member was used, in addition to the cyclic imide salt, LiPF$_6$ and another light metal salt was more preferably mixed.

Although the present invention is described referring to the embodimenst and examples, the invention is not specifically limited to them, and is variously modified. For example, in the embodiments and the examples, the case where the electrolytic solution or the gel electrolyte in which a high molecular weigh compound holds the electrolytic solution is used is described; however, any other electrolyte may be used. Examples of the electrolyte include a mixture of an ionic conducting inorganic compound such as ionic conducting ceramic, ionic conducting glass or ionic crystal and an electrolytic solution, a mixture of another inorganic compound and an electrolytic solution and a mixture of the inorganic compound and a gel electrolyte.

Moreover, in the embodiments and the examples, the battery using lithium as an electrode reactant is described; however, the invention is applicable to the case where any other alkali metal such as sodium or potassium, alkali earth metal such as magnesium or calcium (Ca) or any other light metal such as aluminum is used. At this time, in the anode, the anode active material described in the above embodiments, for example, a material including tin or silicon as an element, or the like can be used in the same manner.

Further, in the embodiments and the examples, the cylindrical type secondary battery, the laminate film type secondary battery, the prismatic type secondary battery and the coin type secondary battery are described; however, the invention is applicable to a secondary battery with any other shape such as a button type, or a secondary battery with any other structure such as a laminate structure. In addition, the invention is applicable to not only the secondary batteries but also primary batteries.

It should be understood by those skilled in the art that various modifications, combinations, sub-combinations and alterations may occur depending on design requirements and other factors insofar as they are within the scope of the appended claims or the equivalents thereof.

What is claimed is:
1. A battery, comprising:
a cathode;
an anode; and
an electrolytic solution,
wherein,
an open circuit voltage per a pair of the cathode and the anode in a full charge state is 4.25 V or more, and
the electrolytic solution includes (i) at least one of 4-fluoro-1,3-dioxolane-2-one and 4-chloro-1,3-dioxolane-2-one, and (ii) a cyclic imide salt selected from the group consisting of compounds shown in Chemical Formulas 3(2) through 3(5):

[Chemical Formulas 3]

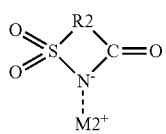

(2)

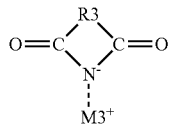

(3)

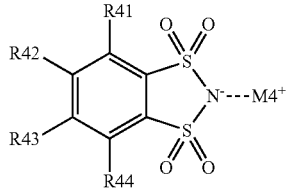

(4)

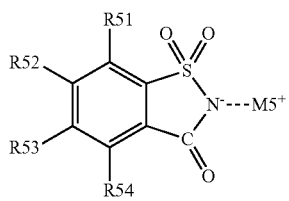

(5)

where (1) m, n, p, q and r are each an integer of 1 or more, (2) M2, M3, M4, M5 and M6 each represent an alkali metal, (3) R2 and R3 each represent a straight-chain or branched alkylene group having 2 to 5 carbon atoms or a group in which a part of hydrogen in the alkylene group is substituted with fluorine, and (4) R41, R42, R43, R44, R51, R52, R53, and R54 each represent hydrogen, an alkyl group having 1 to 4 carbon atoms or a group in which a part of hydrogen in the alkyl group is substituted with fluorine.

2. The battery according to claim 1, wherein the electrolytic solution further includes at least one kind selected from the group consisting of cyclic carbonates having an unsaturated bond and sultones.

3. A battery, comprising:
a cathode;
an anode; and
an electrolytic solution,
wherein,
lithium metal is used as an anode active material, and
the electrolytic solution includes (i) a cyclic carbonate derivative, in the amount of 0.1 to 10 wt %, (ii) at least one of cyclic carbonate derivative selected from 4-fluoro-1,3-dioxolane-2-one and 4-chloro-1,3-dioxolane-2-one, (iii) at least one salt represented by the formula $Li(C_pF_{2p+1}SO_2)(C_qF_{2q}SO_2)(C_rF_{2r+1}SO_2)$, where p, q and r are each an integer of 1 or more, (iv) at least a cyclic carbonate having an unsaturated bond or a cyclic carbonate having a sultone, and (v) at least one cyclic imide salt selected from the group consisting of compounds shown in Chemical Formulas 4(2) through 4(5) is included:

[Chemical Formulas 4]

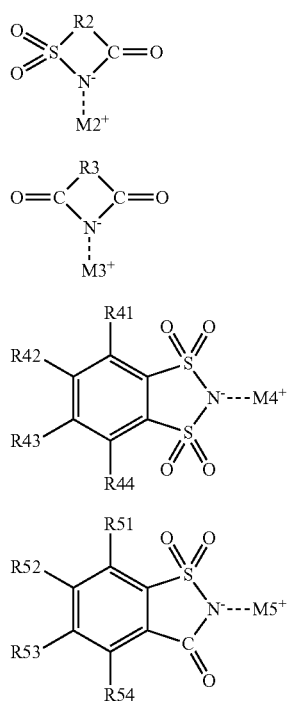

where (1) M2, M3, M4, M5 and M6 each represent an alkali metal, (2) R2 and R3 each represent a straight-chain or branched alkylene group having 2 to 5 carbon atoms or a group in which a part of hydrogen in the alkylene group is substituted with fluorine, and (3) R41, R42, R43, R44, R51, R52, R53, and R54 each represent hydrogen, an alkyl group having 1 to 4 carbon atoms or a group in which a part of hydrogen in the alkyl group is substituted with fluorine.

4. The battery according to claim 3, wherein the electrolytic solution further includes a cyclic carbonate having an unsaturated bond in an amount within the range of 0.05 wt % to 20 wt %.

5. The battery according to claim 3 wherein the electrolytic solution includes a cyclic carbonate having a sultone in an amount within the range of 0.01 wt % to 5 wt %, both inclusive.

6. A battery, comprising:
a cathode;
an anode;
an electrolytic solution,
wherein,
the capacity of the anode includes a capacity component by insertion and extraction of light metal and a capacity component by precipitation and dissolution of light metal, and is represented by the sum of them,
the electrolytic solution includes (i) at least one salt represented by the formula $LiC(C_pF_{2p+1}SO_2)(C_qF_{2q}SO_2)(C_rF_{2r+1}SO_2)$, where p, q and r are each an integer of 1 or more, (ii) at least one of a cyclic carbonate derivative selected from 4-fluoro-1,3-dioxolane-2-one and 4-chloro-1,3-dioxolane-2-one, and (iii) at least a cyclic carbonate having an unsaturated bond or a cyclic carbonate having a sultone.

7. The battery according to claim 6, wherein the electrolytic solution includes an imide salt selected from the group consisting of compounds shown in Chemical Formulas 5(2) through 5(5) is included:

[Chemical Formulas 5]

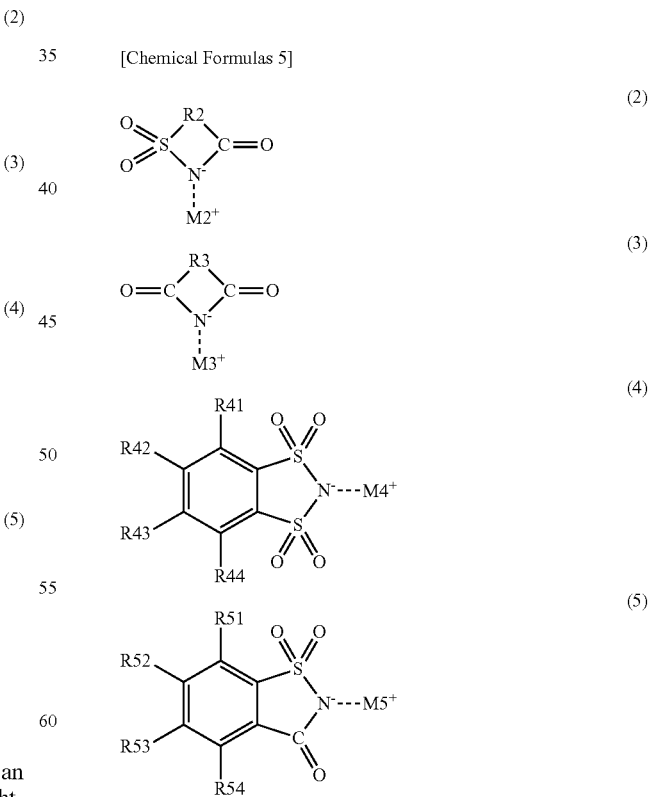

where (1) M2, M3, M4, M5 and M6 each represent alkali metal, (2) R2 and R3 each represent a straight-chain or branched alkylene group having 2 to 5 carbon atoms or a group in which a part of hydrogen in the alkylene group is substituted with fluorine, and (3) R41, R42, R43, R44, R51, R52, R53, and R54 each represent hydrogen, an alkyl group having 1 to 4 carbon atoms or a group in which a part of hydrogen in the alkyl group is substituted with fluorine.

8. The battery according to claim 6, wherein the electrolytic solution includes a cyclic carbonates having an unsaturated bond in an amount within the range of 0.05 wt % to 20 wt %, both inclusive.

9. The battery according to claim 6 wherein the electrolytic solution includes a cyclic carbonate having a sultone in an amount within the range of 0.01 wt % to 5 wt %, both inclusive.

10. A battery, comprising:
a cathode;
an anode; and
an electrolytic solution,
wherein,
the anode is capable of inserting and extracting an electrode reactant and the anode includes (i) a first element selected from a group consisting of tin, silicon and a mixture thereof, (ii) a second element selected from a group consisting of boron, carbon, aluminum, phosphorus and a mixture thereof and (iii) a third element selected from a group consisting of silicon, magnesium, titanium, vanadium, chromium, manganese, iron, cobalt, nickel, copper, zinc, gallium, zirconium, niobium, molybdenum, silver, indium, cerium, hafnium tantalum, tungsten and bismuth, and
the electrolytic solution includes (i) at least one of 4-fluoro-1,3-dioxolane-2-one and 4-chloro-1,3-dioxolane-2-one, and (ii) a cyclic imide salt selected from the group consisting of compounds shown in Chemical Formulas 2(2) through 2(5):

[Chemical Formulas 2]

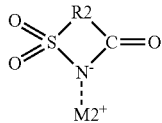
(2)

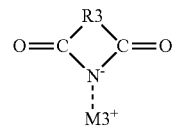
(3)

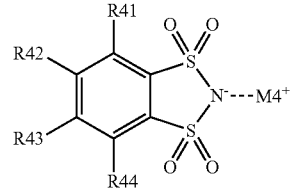
(4)

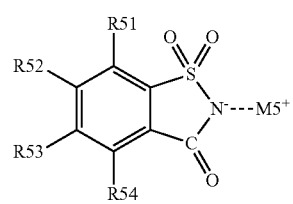
(5)

where (1) m, n, p, q and r are each an integer of 1 or more, (2) M2, M3, M4, M5 and M6 each represent an alkali metal, (3) R2 and R3 each represent a straight-chain or branched alkylene group having 2 to 5 carbon atoms or a group in which a part of hydrogen in the alkylene group is substituted with fluorine, and (4) R41, R42, R43, R44, R51, R52, R53, and R54 each represent hydrogen, an alkyl group having 1 to 4 carbon atoms or a group in which a part of hydrogen in the alkyl group is substituted with fluorine.

11. The battery according to claim 10, wherein
the electrolytic solution further includes at least one kind selected from the group consisting of cyclic carbonates having an unsaturated bond and sultones.

12. The battery according to claim 10, wherein the anode includes an anode material which includes at least one of tin (Sn) and silicon (si) as an element.

13. The battery according to claim 10 or claim 1, wherein the cyclic imide salt is present in the amount of 0.1 to 10 wt %.

* * * * *